United States Patent
Beadle et al.

[11] 3,784,798
[45] Jan. 8, 1974

[54] ADAPTIVE MACHINING

[75] Inventors: Bruce R. Beadle, Fond du Lac; John G. Bollinger, Madison, both of Wis.

[73] Assignee: Giddings & Lewis, Inc., Ford du Lac, Wis.

[22] Filed: July 3, 1972

[21] Appl. No.: 268,648

[30] Foreign Application Priority Data
Nov. 9, 1971    Great Britain.................... 51917/71

[52] U.S. Cl.......................... 235/151.11, 235/150.1
[51] Int. Cl....................... G05b 13/02, G06f 15/46
[58] Field of Search..................... 235/151.11, 150.1

[56] References Cited
UNITED STATES PATENTS

| | | | |
|---|---|---|---|
| 2,980,330 | 4/1961 | Ablow et al. ..................... | 235/150.1 |
| 3,548,172 | 12/1970 | Centner et al. ................. | 235/151.11 |
| 3,634,664 | 1/1972 | Valek............................. | 235/151.11 |
| 3,665,493 | 5/1972 | Glowzewski .................. | 235/151.11 |

*Primary Examiner*—Eugene G. Botz
*Attorney*—Wolfe, Hubbard, Leydig, Voit & Osann

[57] ABSTRACT

Methods and apparatus for adaptively controlling a machine tool to provide optimized instantaneous performance as unforeseen or unforeseeable changes in cutting conditions occur; —characterized by a continuous search out of and back into a permissible area defined by constraint boundaries in the cutter speed vs. feed rate (V vs. R) plane. The method and apparatus always adjust the cutter speed and feed rate to conditions of optimized economic operation (e.g., minimum cost or minimum time)—but subject to other limitations of the machine tool, the cutter and the workpiece material—because one such boundary defines the optimum values of cutter speeds and feeds representing minimum cost or minimum time per unit length of machining. The latter boundary is established by straightforward use of empirical contants, available in the literature or readily determined by known techniques, associated with the well known modified Taylor equation. By sensing machine tool variable and signaling actual values of a plurality of operating parameters, the output rate of the machine tool is increased until the economic restraint, or some other inherent limitation restraint, is reached. The corrective action to remove any constraint violation is based upon a grouping of the several signaled parameters according to the shapes of the respective boundary lines corresponding thereto in the V, R plane, so that the method steps for effecting correction of any constraint boundary violation are relatively few in number and may be carried out by novel apparatus which is simple and practical.

41 Claims, 85 Drawing Figures

GENERAL CASE:
$AV^\beta f^\alpha \le 1$
$A_1 V^{\beta-\alpha} R^\alpha \le 1$

ZONE 1: HIGH INITIAL WEAR RATE
ZONE 2: PROPORTIONAL WEAR RATE
ZONE 3: CATASTROPHIC FAILURE

TEST PART 1

LENGTH : 12.75"
WIDTH : 4"
DEPTH : .025"

TEST PART 2

LENGTH : 12.75"
WIDTH : 4"
DEPTH : .022"
GAPS : 1" LG. EVENLY SPACED

TEST PART 3

LENGTH : 12.75"
WIDTH : 2"-4" RAMP
DEPTH : .025"

TEST PART 4

LENGTH : 12.75"
WIDTH : 4"
DEPTH : .010"-.025" RAMP

NOTE:

MATERIAL FOR ALL PARTS C1045 STEEL
CUTTER ZP15M
INSERTS DMC 30 CARBIDE

TEST PART 1 WITH NEW INSERTS

TEST PART 1 WITH NEW INSERTS

TEST PART 1 WITH NEW INSERTS

TEST PART 1
WITH NEW INSERTS

TEST PART 1
WITH NEW INSERTS

TEST PART 1
WITH NEW INSERTS

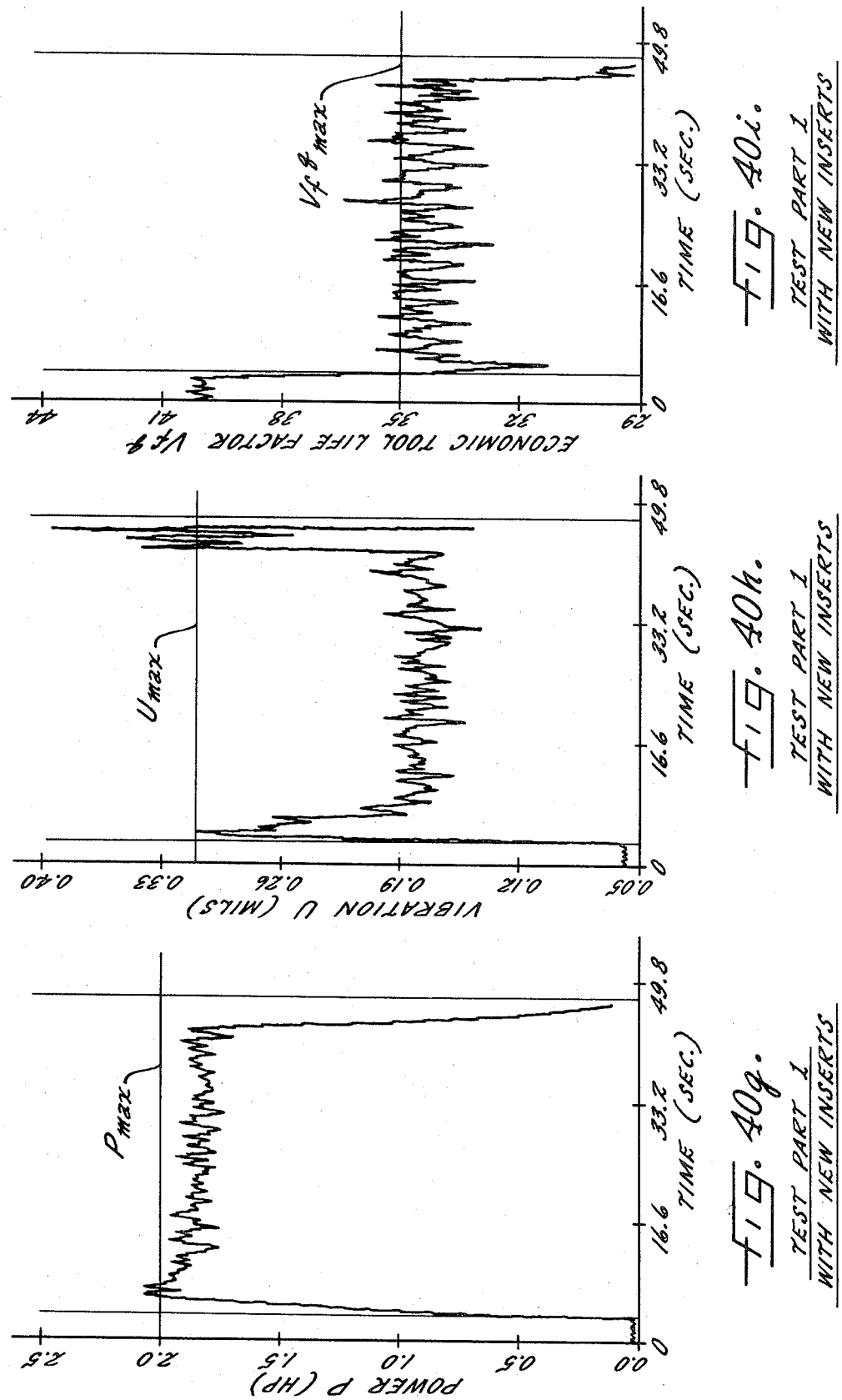

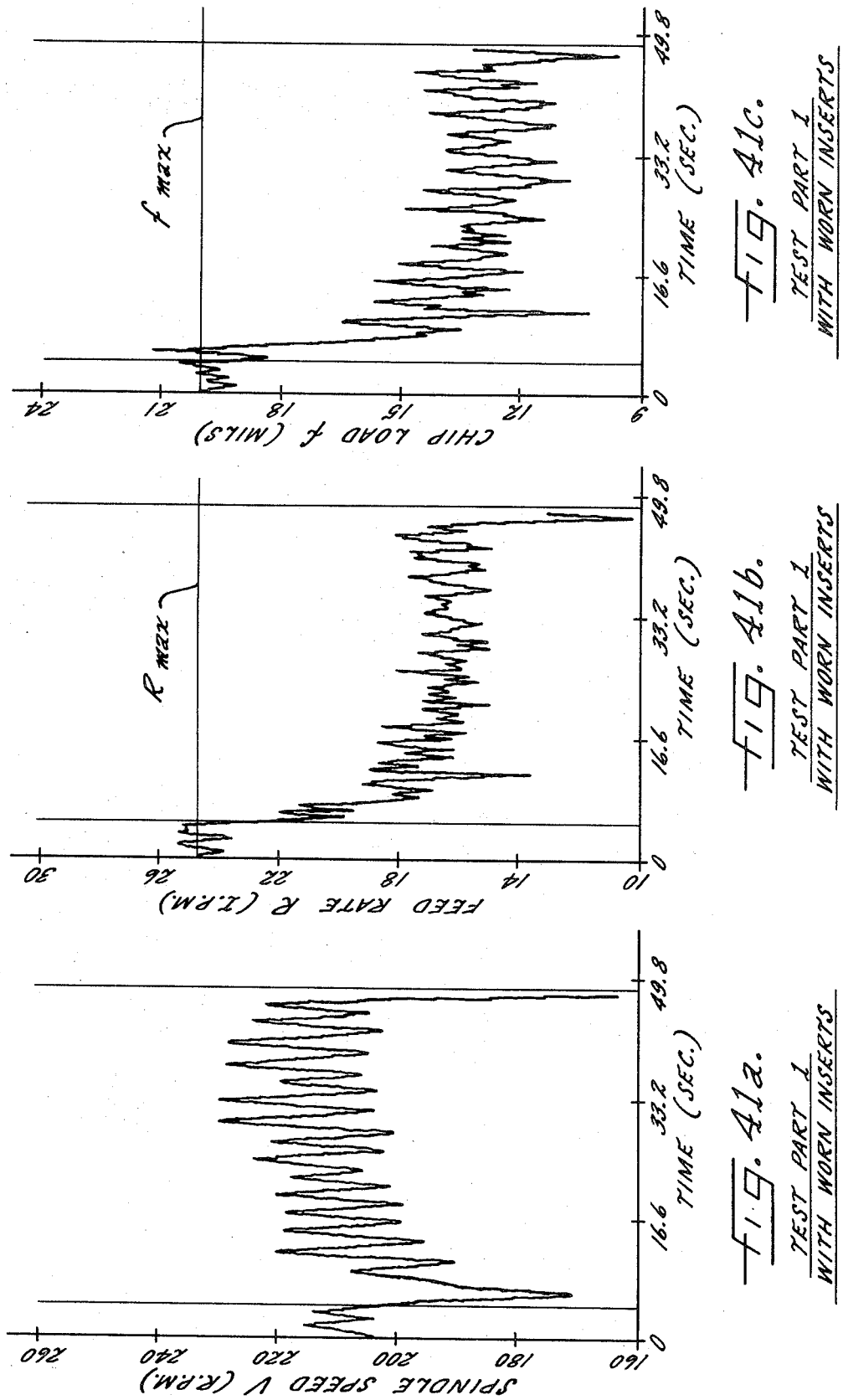

TEST PART 1
WITH WORN INSERTS

TEST PART 1
WITH WORN INSERTS

TEST PART 1
WITH WORN INSERTS

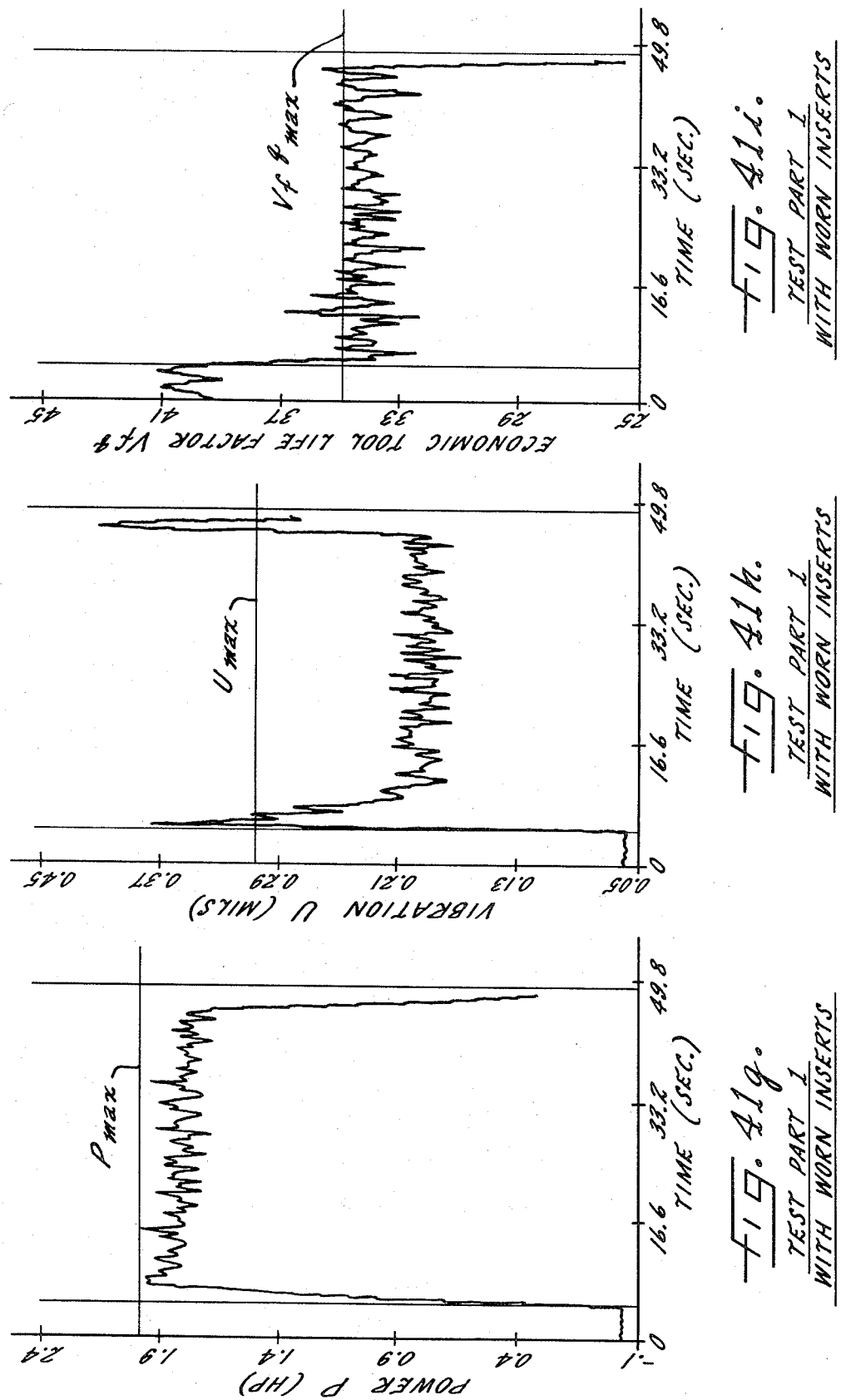

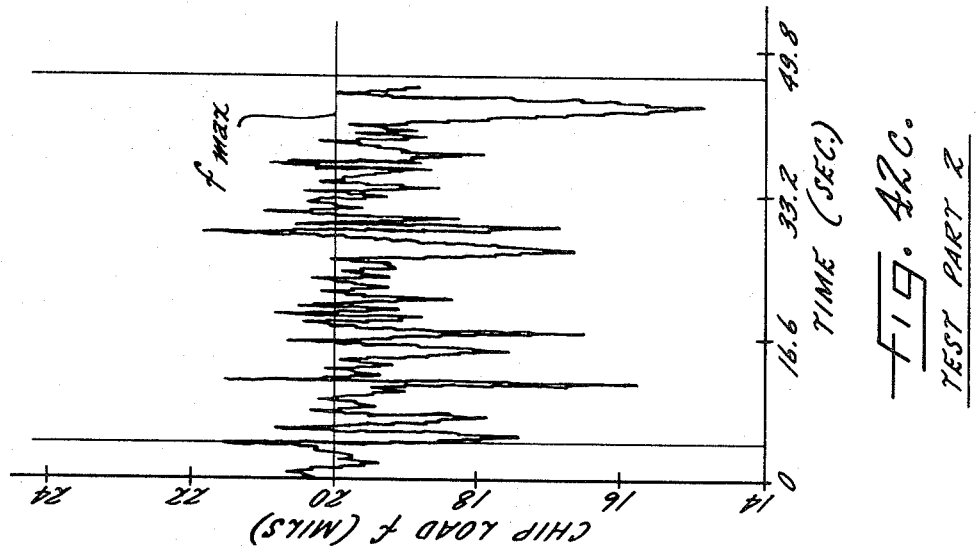
Fig. 42c. TEST PART 2
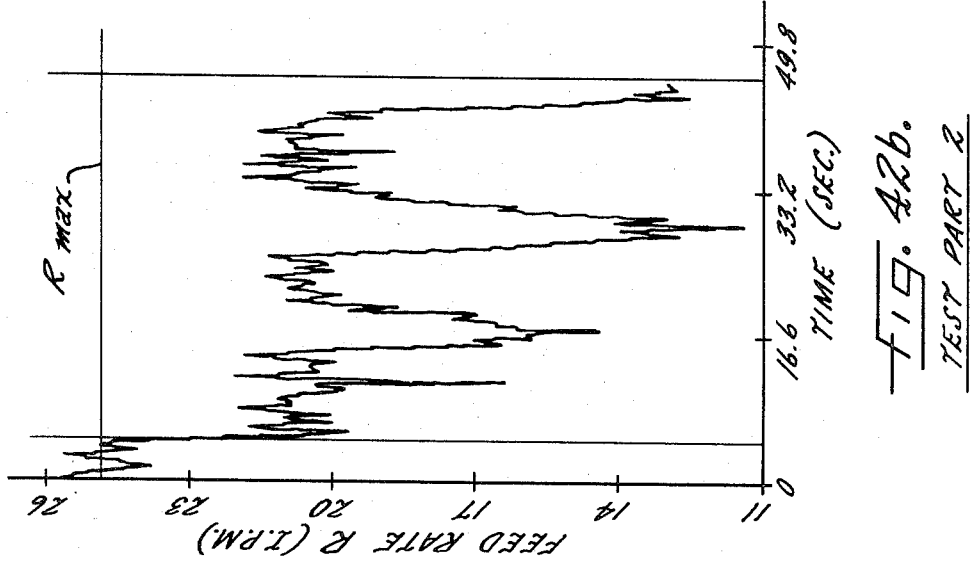
Fig. 42b. TEST PART 2
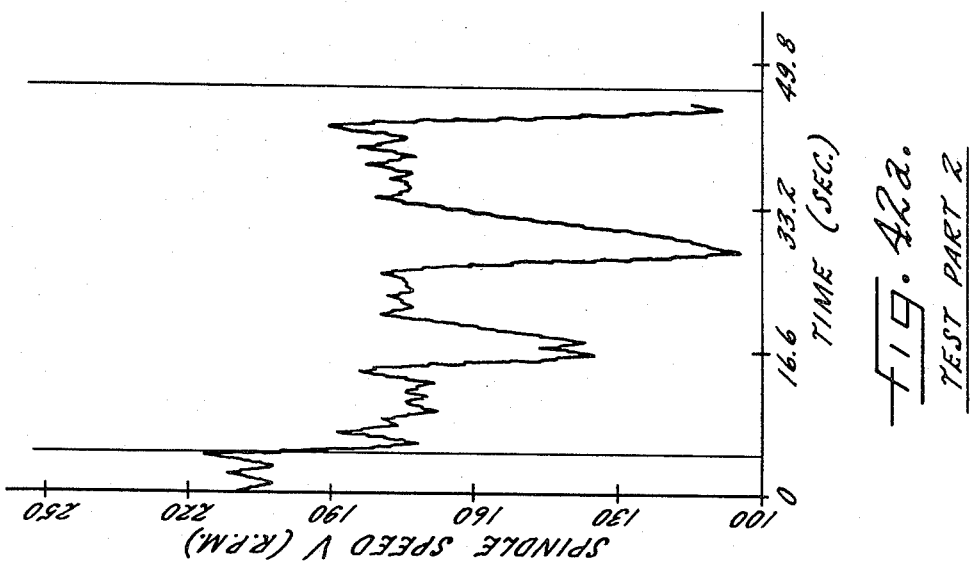
Fig. 42a. TEST PART 2

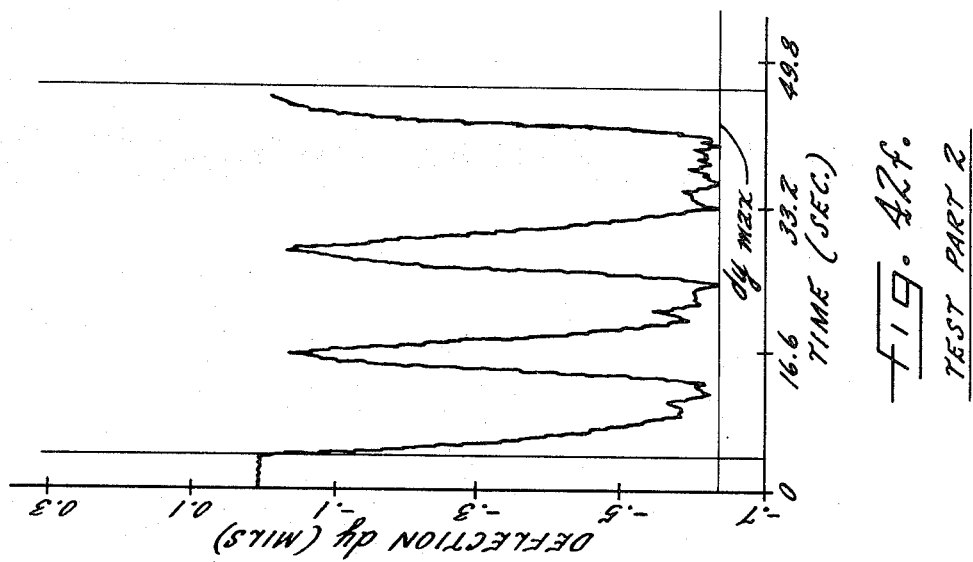
Fig. 42f. TEST PART 2
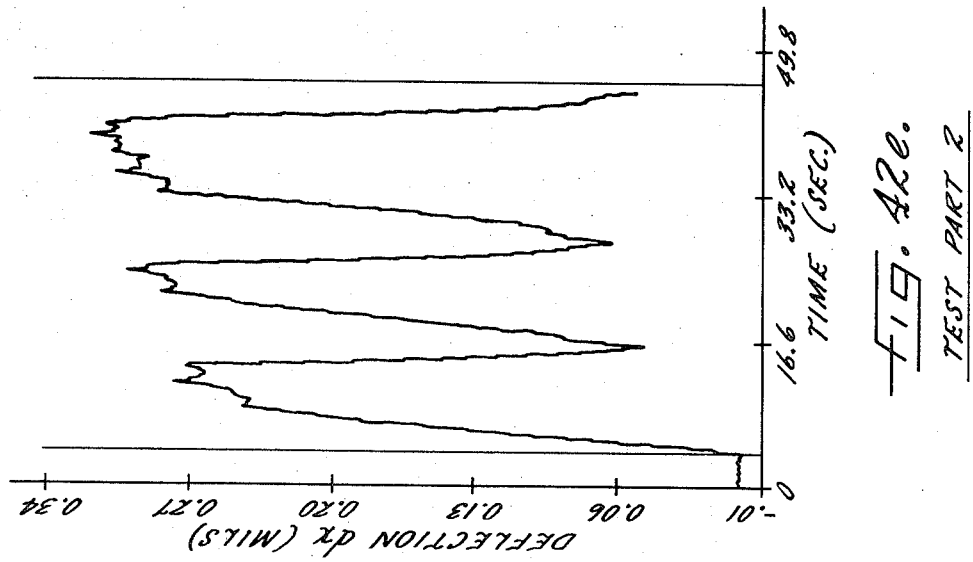
Fig. 42e. TEST PART 2
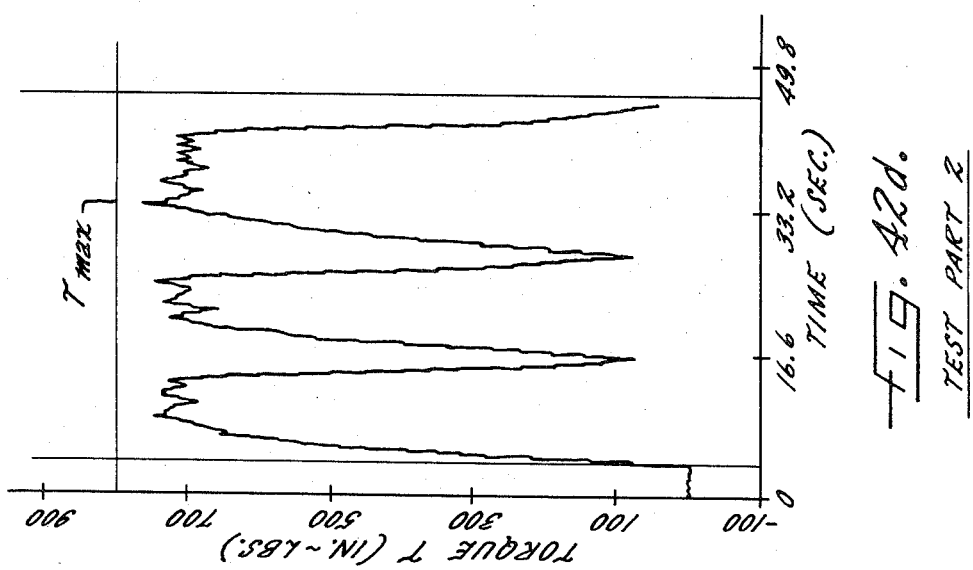
Fig. 42d. TEST PART 2

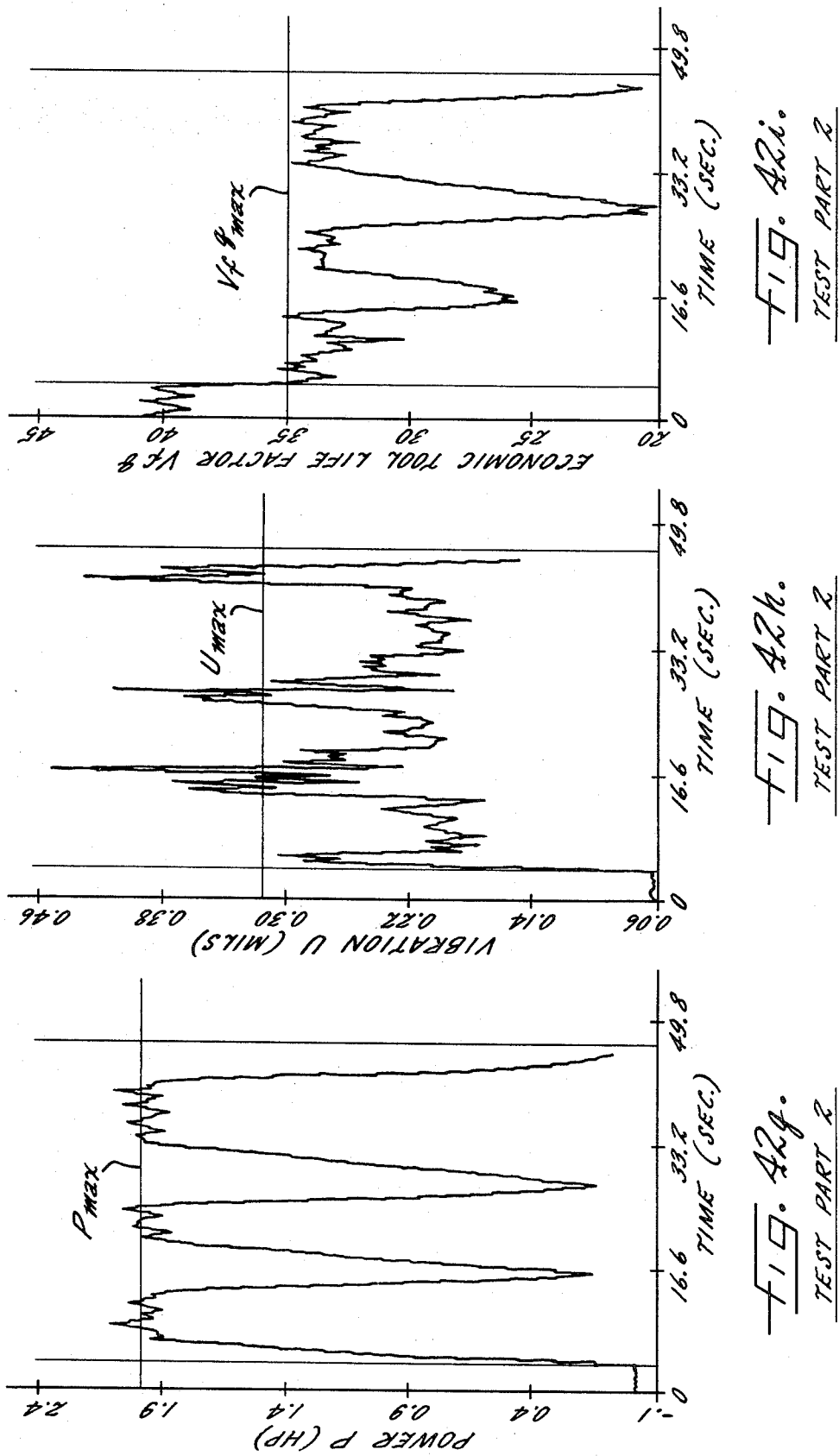

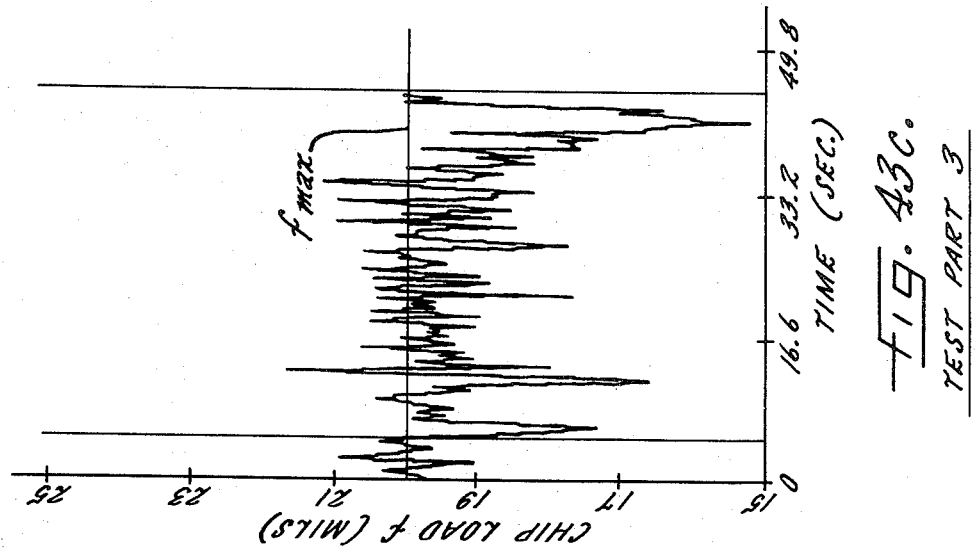
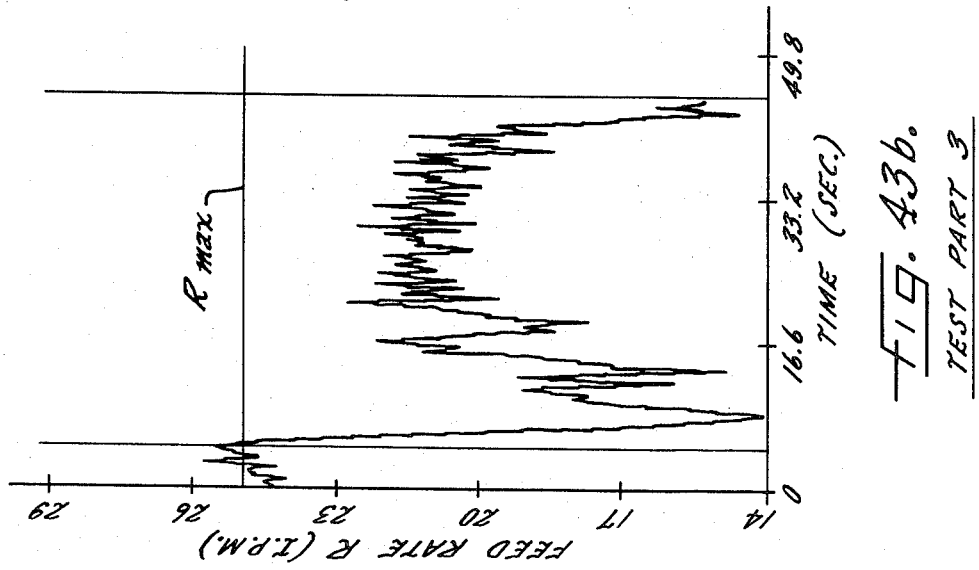
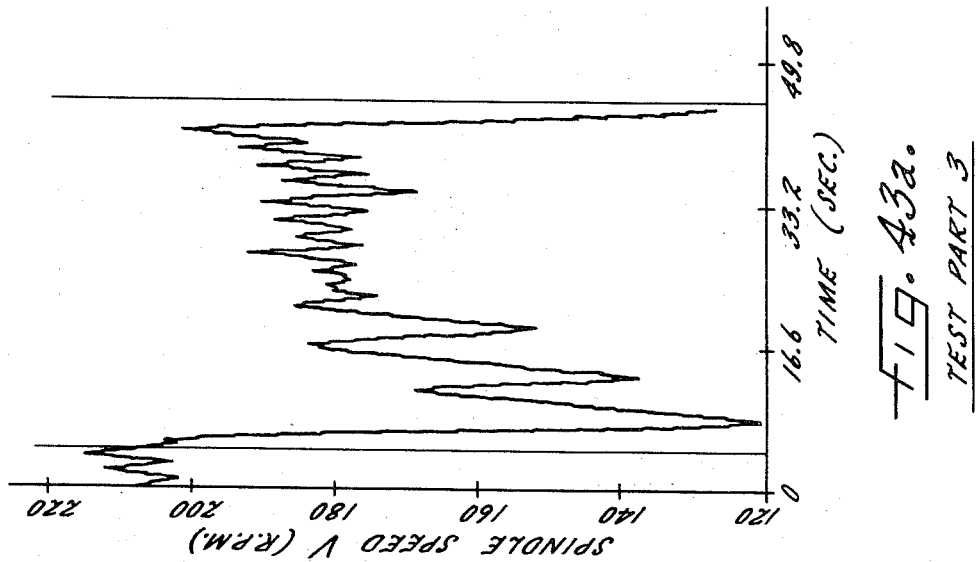

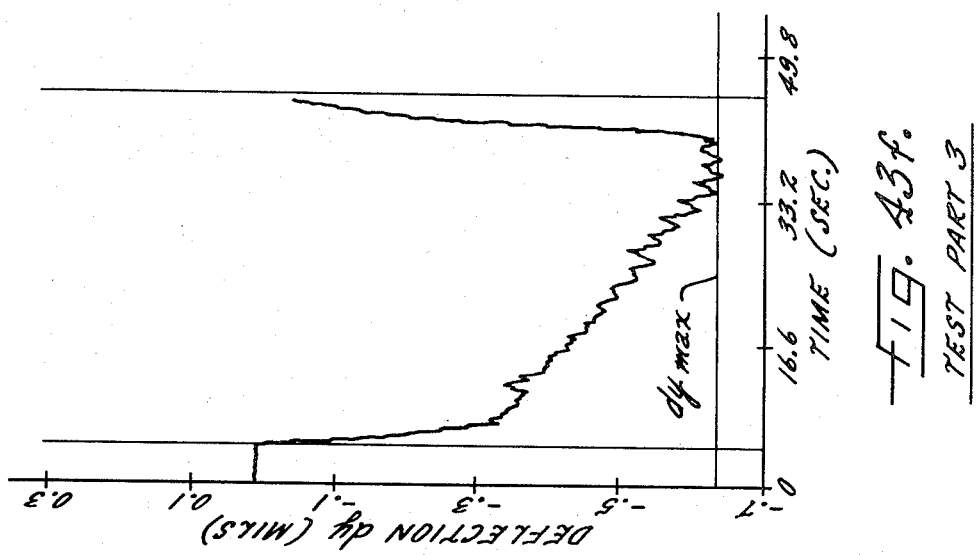
Fig. 43f. TEST PART 3
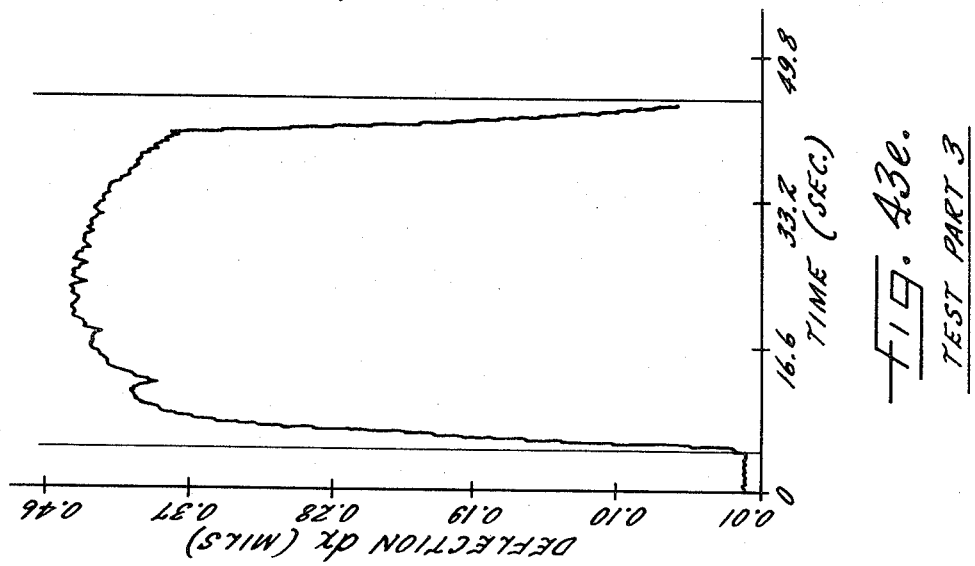
Fig. 43e. TEST PART 3
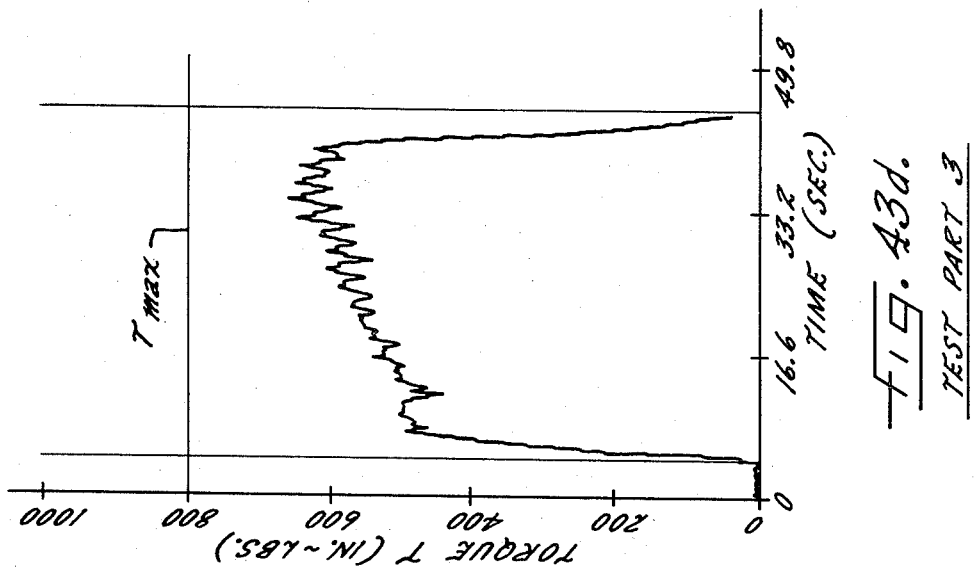
Fig. 43d. TEST PART 3

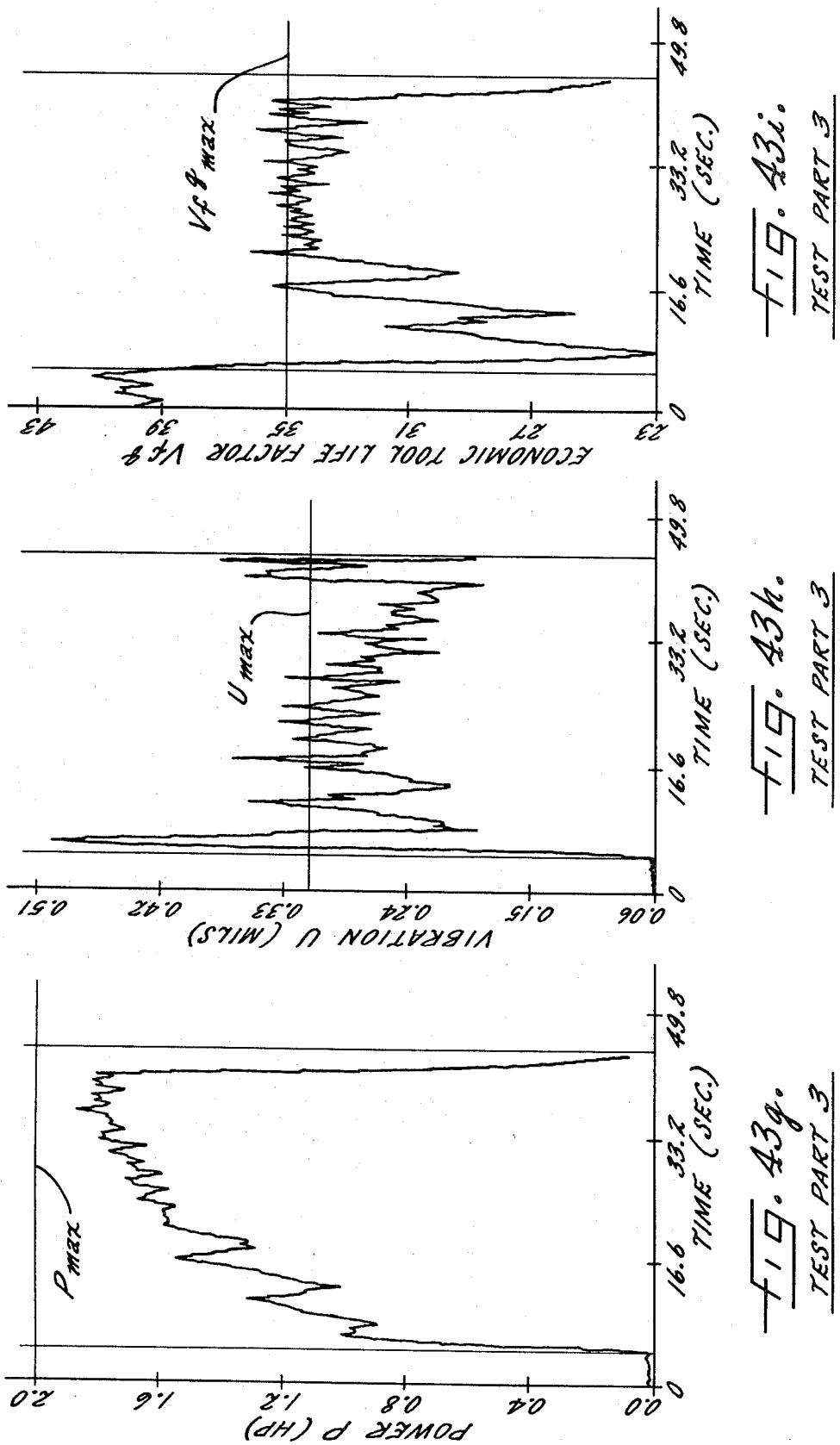

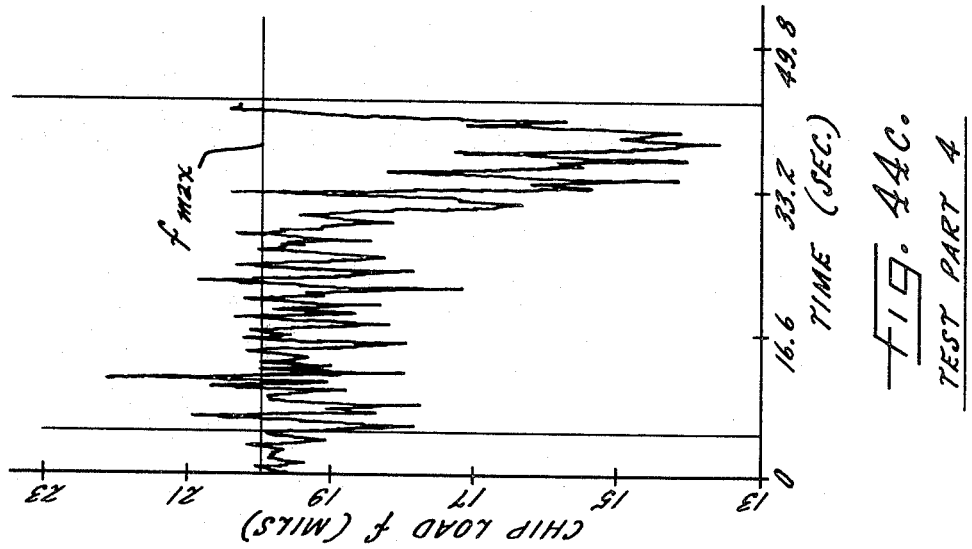
Fig. 44c. TEST PART 4
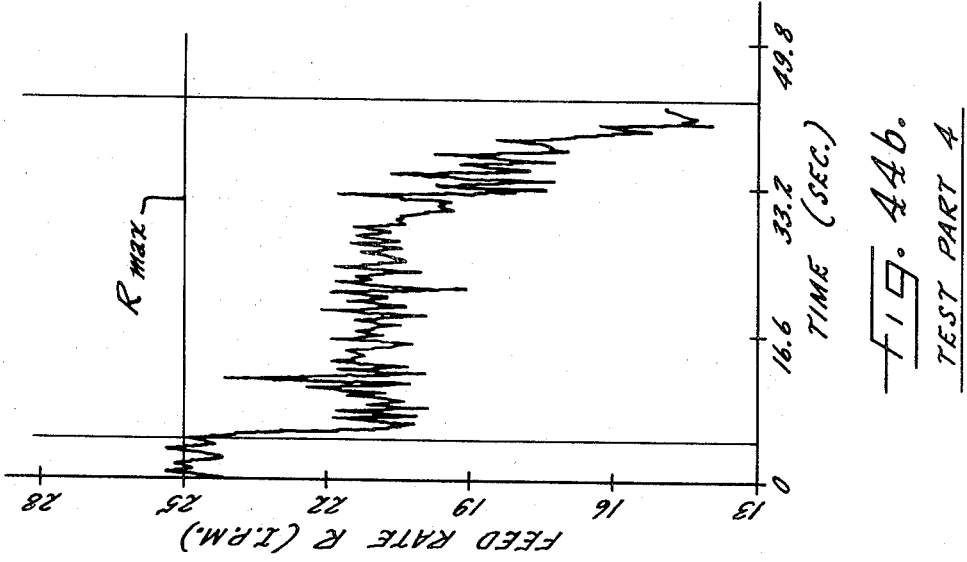
Fig. 44b. TEST PART 4
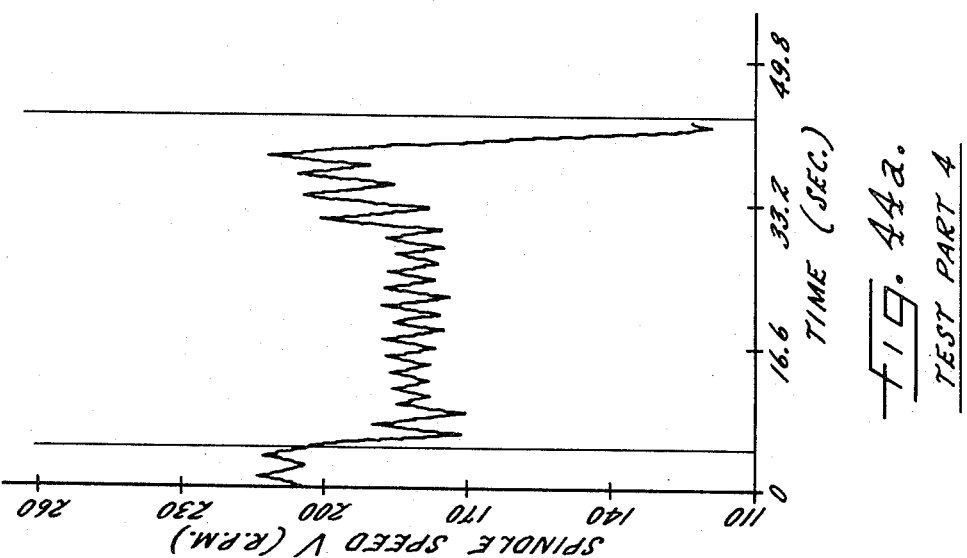
Fig. 44a. TEST PART 4

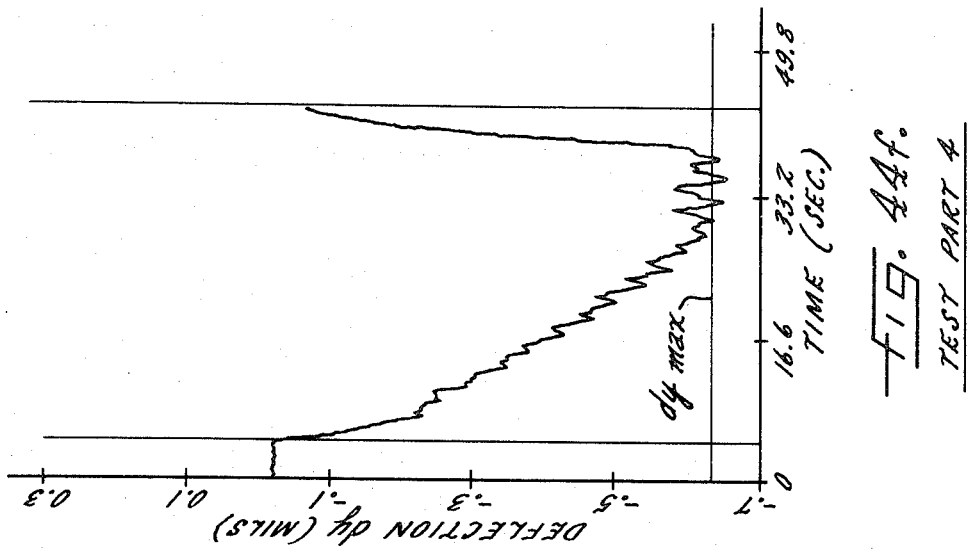
Fig. 44f. TEST PART 4
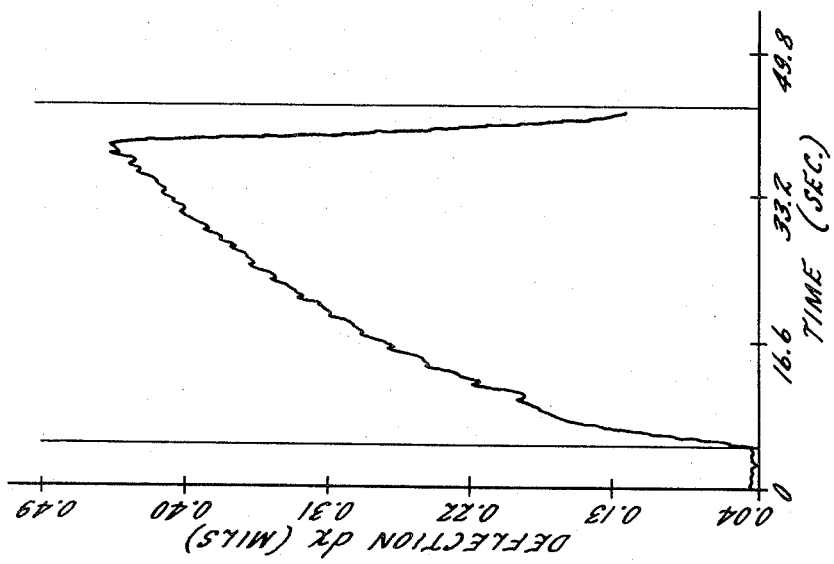
Fig. 44e. TEST PART 4
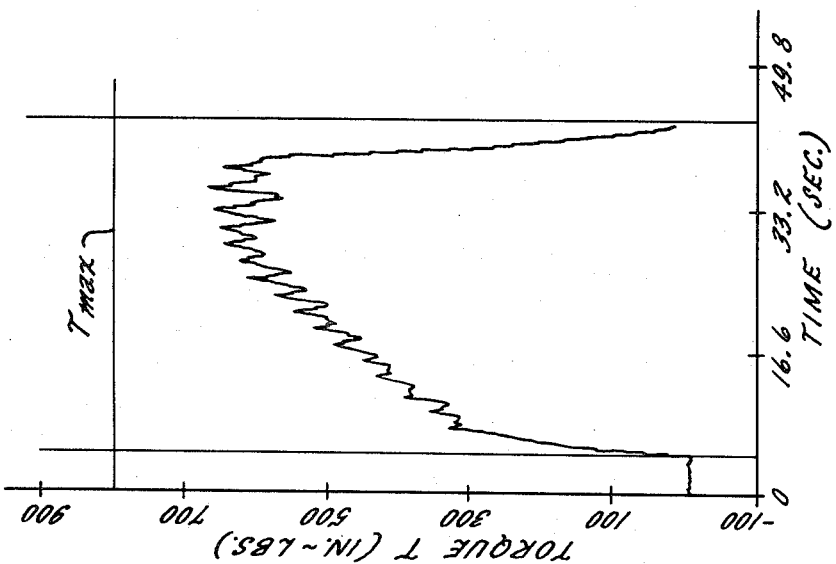
Fig. 44d. TEST PART 4

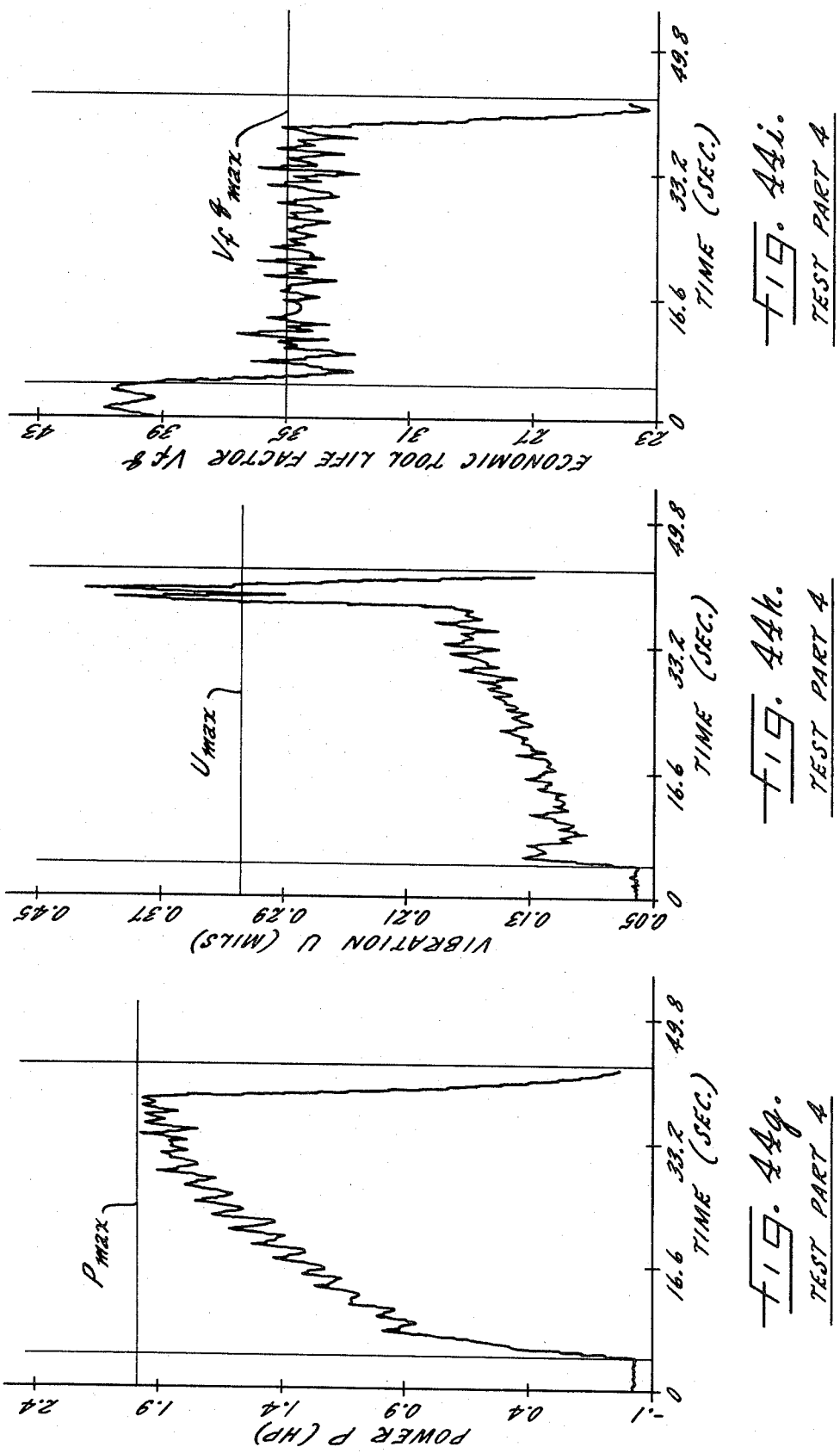

ADAPTIVE MACHINING

BACKGROUND OF THE INVENTION

1. Field of Invention

The present invention relates in general to methods and apparatus for machining workpieces, and more specifically to the control of machine tools wherein a cutter and a workpiece are both rotated and bodily translated relative to one another. Although perhaps most advantageously employed in controlling metal cutting machine tools, the invention may also find use in other types of machining (e.g., abrading) and on any kind of workpiece, e.g., in the wood or plastics working art. The term "machine tool" as here employed is thus to be taken as generically embracing devices for milling, turning, grinding or otherwise operating upon workpieces irrespective of the materials from which the latter are made.

More particularly, the invention here to be disclosed and claimed relates to methods and apparatus for adaptively controlling machine tools so as to automatically achieve and maintain a substantially optimized production efficiency (in the sense of minimum cost or minimum time) from instant to instant by sensing operating variables at the machine tool and making corrective changes in the controlled variables.

2. Description of the Prior Art

There have been numerous proposals described in the prior literature and patents for adaptively controlling machine tools. In general, these have involved continuous monitoring of one or more "performance indices" or "figures of merit" based upon different complex relationships which require, for use in any specific case of a particular workpiece material, cutter configuration, and cutter material, the experimental determination of empirical data or relationships. Moreover, prior adaptive control proposals can be successful, as a general matter, only by sensing one or more difficult-to-measure variables (e.g., tool tip temperature) while the machine tool is operating. As will be seen below, the present invention requires for its foundation data only the published or readily determined constants associated with the well known modified Taylor equation; and the invention is implemented by the sensing of only a few basic variable conditions at the machine tool to signal the instantaneous values of certain operation parameters.

The prior art mentioned above is generally represented by the following publications, to which the reader may refer to a better background understanding:

U.S. Pat. No. 3,220,315 – Mathias
U.S. Pat. No. 3,548,172 – Centner et al.
U.S. Pat. No. 3,571,834 – Mathias
U.S. Pat. No. 3,576,976 – Russo et al.
U.S. Pat. No. 3,634,664 – Valek
"Computer Adaptive Control of a Machine Tool," B. R. Beadle and J. G. Bollinger, Anals of the C.I.R.P., Volume XVIV, pages 61–65, 1971.

SUMMARY OF THE INVENTION

It is the primary aim of the present invention automatically to optimize or substantially optimize from instant to instant the machining of a workpiece, —and in a way which is extremely simple and practical in comparison to the complex and expensive apparatus and procedures which have characterized the prior art.

More specifically, it is an object of the invention to adaptively control a machine tool so as to maintain best economic operating conditions (e.g., minimum cost or minimum time per unit length of cutting) in a way which requires the sensing of only a few basic operating variables at the machine tool while the latter is functioning.

It is also an object to achieve that result in a really practical sense by methods and apparatus which require setup for any specific case (that is, for cutting of any particular shape on a workpiece of any particular material with any particular cutter) with basic data or numerical constants associated with the well known modified Taylor equation, such data or numerical constants being readily available in the published literature or easily determined by simple and well known techniques.

Another object of the invention is to adaptively optimize the operation of the machine tool by treating the inherent limitations of the machine tool, and those of any cutter and workpiece materials combination, as limiting restraints; and to bring economic considerations into effect by adding another special constraint which is based upon economic tool life relationships derived from the Taylor equation and which is treated in a fashion similar to some of the inherent limitation restraints mentioned above.

A further object of the invention is to provide methods and apparatus which are susceptible of relatively low cost implementation and practice by virtue of grouping a plurality of restraints into classes according to the shapes of lines representing limit boundaries in the speed vs. feed rate (i.e., V vs. R) plane. In this respect, the invention is implemented according to relationships mathematically representable by a general case equation having several constants which are of different, unique values for each of a plurality of operating parameters; but in a fashion such that the actual values of such constants need not be determined by extensive experimental procedures.

Stated generally, the invention is carried out by methods and apparatus in which a machine tool is controlled preferably in only its cutter speed and feed rate so as to increase its production rate until one of a plurality of operating parameters, directly or indirectly derived from sensed operating variables, exceeds the corresponding one of a plurality of constraint limit values, whereupon corrective action is taken, according to the classification of the parameter involved, to restore the actual value of that parameter to within the constraint boundary. One of the parameter constraint limits is based very simply upon readily available emperical data associated with the modified Taylor equation so that the most economic combination of speed and feed rate is found, subject to the other inherent limitations of the machine tool, the cutter and the workpiece. The invention may be carried out by analog signal processing circuitry, or by digital signal computations performed on an iterative time schedule.

BRIEF DESCRIPTION OF DRAWINGS

The foregoing and other objects and advantages of the invention will become apparent as the following description proceeds taken in conjunction with the accompanying drawings, in which:

FIGS. 41a through 41i are similar to FIGS. 40a–40i, but for a second test cut made with worn cutter blades;

FIGS. 42a through 42i are similar graphs plotted from a third test cut performed on a workpiece like that shown in FIG. 37;

FIGS. 43a through 43i are similar graphs plotted from a fourth test cut performed on a workpiece like that shown in FIG. 38; and FIGS. 44a through 44i are similar graphs plotted from a fifth test cut performed on a workpiece like that shown in FIG. 39.

DESCRIPTION OF PREFERRED EMBODIMENTS

1. An Exemplary Machine Tool and Numerical Control

Figure 1:
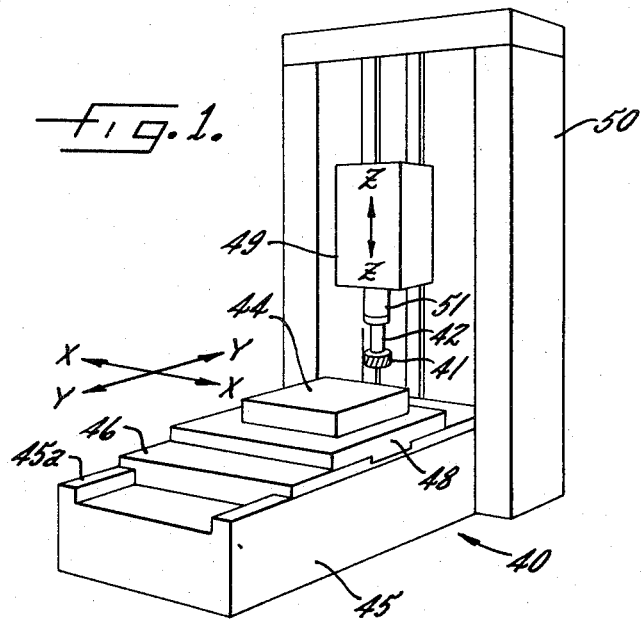
FIG. 1 is a simplified perspective view of a typical machine tool.

The vertical milling machine 40 shown in FIG. 1 is merely exemplary of the many types of machine tools which may be used in practicing the present invention. Although there is illustrated, and will be described, a face milling cutter 41 carried in a spindle 42 for taking a horizontal cut across the upper surface of a slab shaped workpiece 44, this is merely representative of the other types of cutters and other types of machine tools, as well as other types of workpieces, which may be used. For example, the invention will be seen by those skilled in the art as readily applicable to metal turning lathes employing single point cutting tools. In all cases, however, the cutting tool and the workpiece are both rotatable and bodily translatable relative to one another respectively at controllable speeds and controllable feed rates.

Briefly stated, the milling machine 40 includes a base 45 having ways 45a slidably supporting a saddle 46 movable horizontally back and forth along what is here called the Y axis. A servo motor and appropriate drive mechanism such as a lead screw (not shown) serve to produce movement or positioning of the saddle along the Y axis.

The saddle 46 is formed with way surfaces which in turn slidably support a table 48 carrying the workpice 44, the horizontal movement of the table being designated as along an X axis lying in a direction perpendicular to the Y axis. Such movement or positioning of the table is produced by a suitable servo motor and drive mechanism (not shown).

Conventionally, the milling machine 40 further includes a headstock 49 vertically adjustable along the ways of a column 50. The spindle 42 is, of course, rotatable about a vertical axis and for this purpose it is journaled in and projects through a quill 51 supported in but vertically movable relative to the headstock 49. The quill 51 is bodily movable vertically within and relative to the headstock 49 so as to raise or lower the spindle 42 and the cutter 41. This motion is considered as being along a Z axis, and the vertical movement or positioning is effected by a suitable servo motor and gear train (not shown) in a conventional organization. The headstock contains a suitable motor for rotationally driving the spindle directly or through appropriate speed reduction gearing, and such spindle motor may be controlled to drive the spindle 42 and the cutter 41 at any desired angular speed within a range of maximum and minimum values.

Thus, the cutter 41 is rotatable at a controllable speed V while the cutter and the workpiece 44 may be moved relative to one another by motions along three mutually orthogonal axes. Therefore, by controlling such relative motions it is possible to make the cutter machine any desired surface shape on the workpiece, whether a simple flat surface or one of complex curvature.

Figure 2:
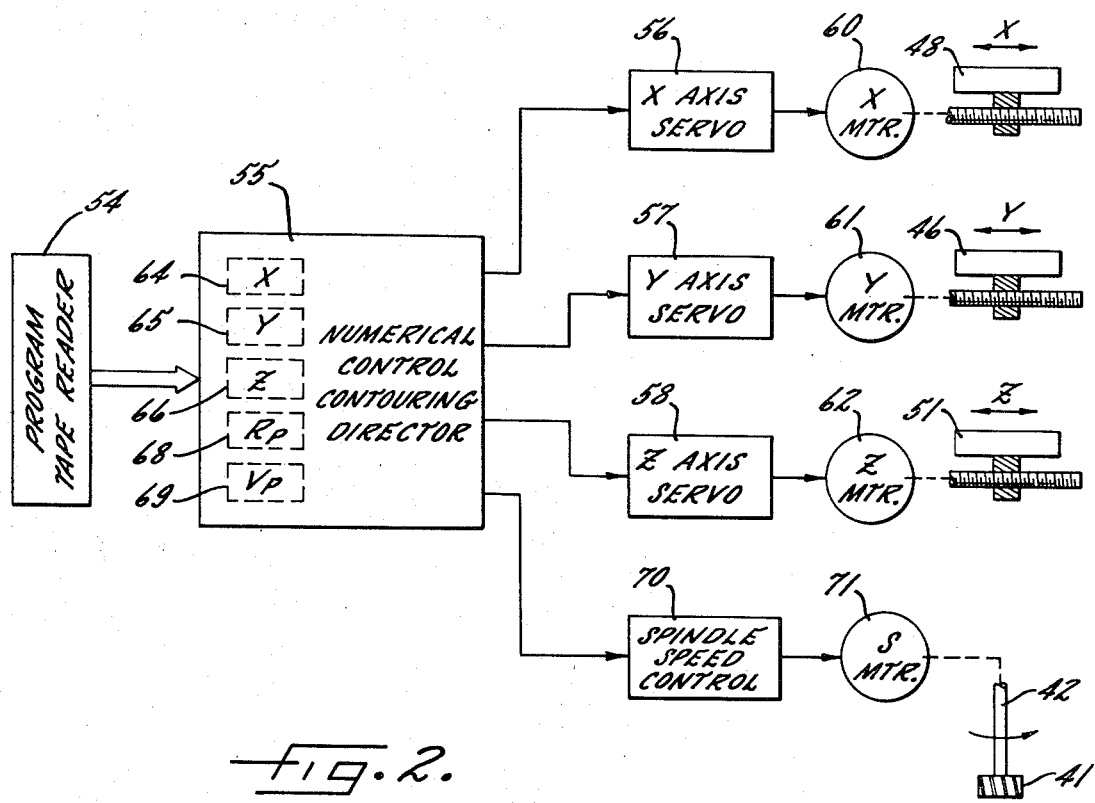
FIG. 2 is a simplified block diagram of a conventional numerical control system usable with the machine tool shown in FIG. 1.

Such relative motions of the cutter and workpiece along the X, Y and Z axes may be effected by any of a variety of well known "numerical control" systems, a typical one being generally illustrated in FIG. 2. As is known in the art, a series of successive relative motions, some being the result of simultaneous feeding movement along two or more of the machine axes, and some perhaps being along a single axis, between the cutter and workpiece may be programmed and stored in the form of numerical commands or a suitable record medium such as a punched paper tape. A tape reader 54 (FIG. 2) supplies numerical command information, one block at a time in the form of digital electrical signals, to a control director 55 which converts that information into time-varying analog command voltages supplied to X, Y and Z servos 56, 57, 58 controlling the aforementioned servo motors 60, 61 62 which produce the respective motions along the X, Y and Z axes. These motors thus impart desired displacements at desired velocities to the table 48, the saddle 46 and the quill 51 so as to make the cutter 41 execute a desired path in space relative to the workpiece 44, thereby to produce a desired dimension, shape or contour on the latter. Details such as position or velocity feedback have been omitted from the generalized illustration of a numerical control system in FIG. 2 because they may take a variety of forms and are familar to those skilled in the art.

It may be noted briefly, however, that the punched tape not only carries X, Y and Z numbers designating end point positions or incremental moves to be successively effected along the three axes, but also carries numerical designations of a desired spindle speed and a desired feed rate to be in effect during the execution of any commanded relative "move." Although in most numerical control systems the angular speed at which the spindle is to be rotated is designated by the symbol S, that angular speed will herein be designated by the symbol V. Likewise, although conventional programming symbols usually employ the symbol F to designate a desired feed rate, i.e., the velocity of relative bodily translation of the cutter and workpiece, the feed rate velocity will herein be designated by the symbol R.

It will be understood that the director 55 usually contains a plurality of storage registers adapted to receive and store signals generated by the tape reader 54 and respectively designating end point positions X, Y and Z. Such registers are generally shown at 64, 65, 66 in FIG. 2. In addition, a numerical control director usually includes storage registers, here identified at 68 and 69, to receive number-designating signals from the program tape reader and which represent a desired or programmed feed rate $R_p$ and a desired cutter velocity $V_p$. When one set of command information has been read from a punched tape by the reader 54, the numerical control director acts upon the numbers stored in the five registers shown in FIG. 2 in order to cause the servo motors 60, 61, 62 to drive their respective machine tool members to the numerically defined end point positions and at axis component velocities which produce a resultant tool rate equal to the feed rate represented by the number $R_p$ held in the register 68. Simultaneously, the director supplies appropriate control signals to a spindle speed control circuit 70 which energizes a spindle-driving motor 71 such that the spindle 42 is driven at an angular speed corresponding to the number $V_p$ stored in the register 69.

Although the diagrammatic illustration of FIG. 2 represents a numerical contouring system, the invention may be employed with equal advantage in "point to point" numerical positioning systems to produce straight line machining cuts along one axis at a time or along two axes at substantially equal velocities so as to create a 45° path in space. In these latter systems, there is simply position feedback from the controlled members of the machine tool so that they move until desired end point positions are reached, and their velocities are determined by the commanded feed rate number $R_p$ read from the program tape into the director.

It is well known that the cutter speed V and the feed rate R are important in determining the surface finish and dimensional accuracy of the ultimately completed workpiece. But these variables V and R also determine the time required to machine a path of a given length along the workpiece, as well as the rate at which the cutter teeth wear. The programming technician is faced with the dilemma of choosing feed rates as high as possible in the interest of reducing the time during which the machine tool is occupied to effect cutting of a given length along the workpiece while avoiding catastrophic destruction or undue wear of the cutting teeth as well as an inacceptable final product. Usually the programming technician is very conservative of his choice of cutter speeds and feed rates; and such conservatism often results in unnecessarily high costs of producing finished parts. On the other hand, if the programming technician is not conservative, the cutter teeth may be destroyed or worn to the point of requiring resharpening so quickly that the cost of frequently changing cutters and resharpening or replacing worn blades more than offsets any savings in reduced machining time at the machine tool.

Although a simple numerical contouring system is illustrated in FIG. 2, it will be understood that the present invention may be useful in the more recent "DNC" (direct numerical control) systems where a versatile digital computer accepts programmed data in a relatively raw state and directly produces either digital or analog servo control signals for the X, Y and Z motions. In this case, again, there will be within the DNC system a plurality of registers which contains axis end point or increment distance numbers defining successive "moves," as well as registers which contain numbers representing the speed V and the feed rate R chosen by the programming technician.

To simplify the description which follows, it will be assumed that the workpiece 44 is to be machined by motion of the cutter relatively along only the X axis. That is, it will be assumed that the spindle 42 and the cutter 41 remain vertically stationary, that the saddle 46 remains stationary, and that only the table 48 is moved horizontally along the X axis so that a horizontal surface 44a (FIG. 3) is machined by the rotating face milling cutter. It will be apparent that the method and apparatus to be described in detail hereinafter can be applied readily to motions along other axes or to simultaneous motions along a plurality of axes.

Figure 3:
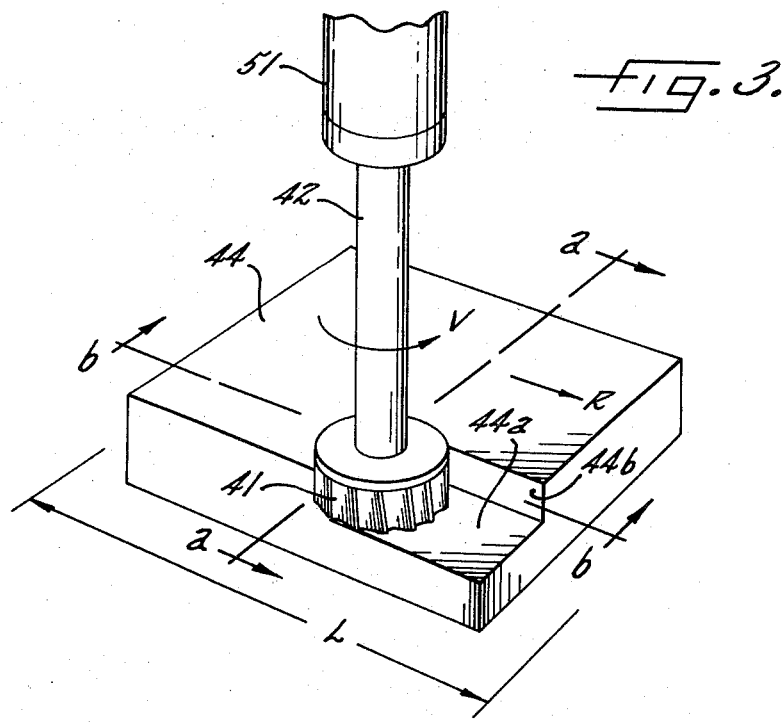
FIG. 3 is a somewhat diagrammatic perspective view of a typical cutter acting upon a typical workpiece.

Referring to FIG. 3, the face milling cutter 41 is assumed to be rotating at a speed V while the workpiece 44 is being moved to the right along the X axis at a feed rate R. If V is expressed in revolutions per minute and R in inches per minute, then the relative feed rate may be expressed as R/V in inches per revolution. This latter quantity is a measure of the "bite" which the cutter takes from the workpiece during each revolution. It is convenient in the general case to consider the relative feed rate R/V in the form of a "chipload" or feed per tooth. If the cutter 41 has any number of teeth N, each tooth carves out 1/N of the bite per revolution, so that the chipload $f$ may be expressed as being equal to R/NV. Since N is a constant for any given cutter, the expression R/V for relative feed, and the expression R/NV for the feed per tooth or chipload $f$ are substantially identical variables. But for the general discussions which follow, the tooth chipload $f = R/NV$ will be used except when otherwise noted. -8)/An($\alpha$ Assuming that the cutting operation shown as being in progress by FIG. 3 is of length L, it can be programmed and carried out by a single block of command information supplied from the tape reader 54 to the numerical director 55 (FIG. 2). If the workpiece is initially located at an X axis position $X_1$ with its right edge spaced to the left of the cutter, then the command block may represent the numbers $X_2$, $V_p$ and $R_p$ where $X_2$ is equal to $X_1 + L$; and where $V_p$ and $R_p$ represent programmer-selected values of spindle speed and feed rate. The X axis servo motor will thus be energized to drive the table 48 and the workpiece toward the right from position $X_1$ to position $X_2$ (and thus through a distance L) at a programmed rate equal to $R_p$ and with the spindle turning at a programmed velocity $V_p$ r.p.m. This very simple operation is here assumed merely for purposes of discussion. It may likewise be assumed that a great number of identical workpieces are to be mounted in the machine tool successively to produce a plurality of finished parts having the complete face milled surface 44a formed thereon.

As shown in FIG. 3, the workpiece 44 is simply a rectangular block which is moved from left to right so that the rotating cutter carves out a shallow notch along one edge. If the cutter becomes more dull or the hardness of the workpiece increases as the cutting pass progresses, this will cause an increase in the torque required from the spindle drive motor to exert greater power in order to maintain the same commanded spindle speed V as cutting progresses. Indeed, if the workpiece material contains hard and soft spots (or otherwise is non-uniform) the torque and power may vary during the progress of the entire cut in a completely unsuitable fashion if the programmer-selected speed and feed rate are maintained. Indeed, this type of variation occurs in an extreme form as the cutter first approaches, but has not yet contacted the workpiece; but thereafter, the torque and power rise abruptly if the same speed and feed values are maintained.

To produce each part with a minimum cost or in a minimum time, it is desirable always to run the machine tool with the highest feasible rate R and an optimum corresponding speed V. The key here, however, lies in the word "feasible" because there are limits which cannot or must not be exceeded due to (a) the limited capabilities of the machine tool itself and the need to prevent damage of the machine tool by overloading or overstressing, (b) the need to avoid unacceptable degradation in the quality (surface finish and dimensional accuracy) of the workpiece, and (c) the fact that the highest possible speed and feed may indeed be uneconomical because of rapid wear on, and the cost of periodically replacing, the cutter. While a numerical control programmer may specify values of speed V and feed rate R, he cannot foresee changing conditions, and he is thus likely to pick values which, if used without change, result in less than a substantially optimized economic production.

2. The Characteristics of Machine, Cutter and Work Quality Limitations

In any system which seeks to make a machine tool work "as fast as possible" there are upper and lower limits of certain operating parameters which simply should not be exceeded. The machine tool must be considered to stay within these limits. Where the two variables V and R are being controlled, any operating parameter to be constrained may not be a simple function of either V or R alone, and so constraining either of the latter independently will not in all cases suffice. This is so because chipload (and certain other operating parameters to be discussed below) is an important determinate of tool wear, surface finish and required power; chipload varies not only directly with the feed rate R but also inversely with the speed V. In contrast, the time required to complete a given cutting path by moving the cutter through a distance L varies inversely and solely with the feed rate R, so feed rate should be maximized to the extent that other limits are not exceeded. A major economic factor is the cutter life, i.e., the length which can be machined before the tool must be changed so that the blades can be sharpened or replaced. To increase feed rate R to a point where tool changes are required very frequently is to operate with very poor economic efficiency.

Figure 4:
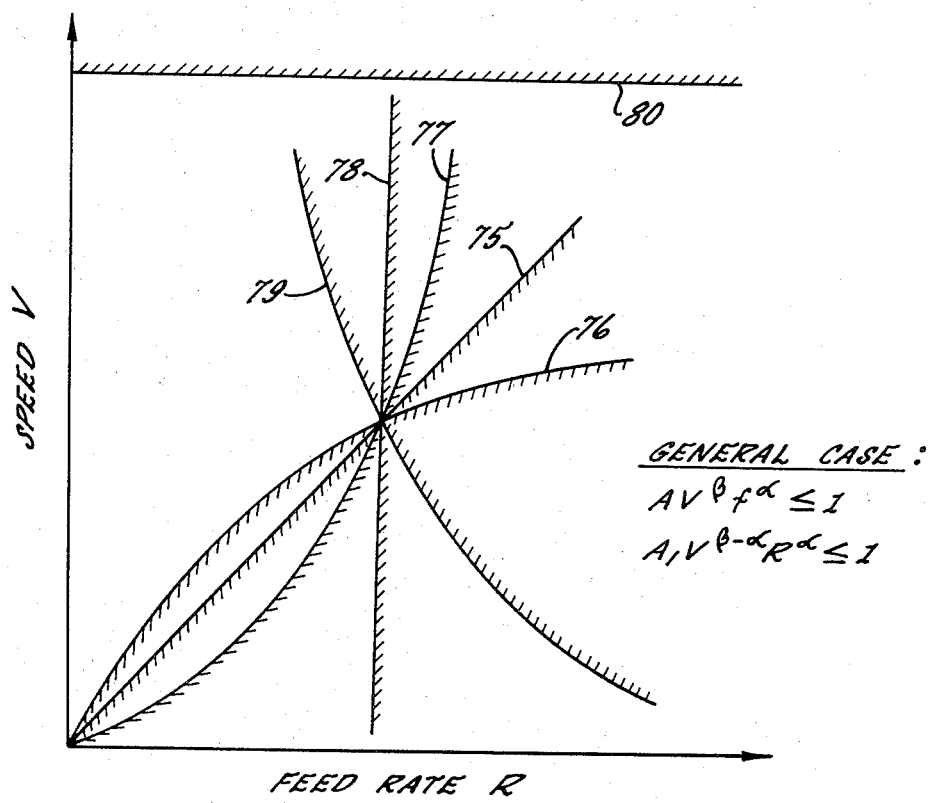
FIG. 4 is a graphical representation of a plurality of constraint boundaries in the V, R plane all of which are representable by a mathematical equation for the general case and which respectively differ according to the values assigned to constants in that general equation.

We have determined that a whole family, and therefore different specific ones, of restraint boundary lines may be represented in the V, R plane by a single general case equation or mathematical model. With reference to FIG. 4, one may consider the general inequality expression:

$$AV^\beta f^\alpha \leq 1, \text{ where}$$

(1)

$$A > 0$$

(2)

The constants $\alpha$ and $\beta$ may be given specific values to define a particular one of the family of inequalities represented by Expression (1), and the value of the constant A may be assigned to convert the inequality into an equation representing a line marking off the boundary of the inequality. Thus, one may write:

$$AV^\beta f^\alpha = 1$$

(3)

and thereby define a family of boundary lines (including all of those shown in FIG. 4) in the V, R plane, with each line corresponding to different assigned values of the constants $\alpha,\beta$ and A. For reference later it may be noted that Equation (3) may also be written:

$$AV^\beta (R/NV)^\alpha = 1$$

(4)

$$A_1 V^{(\beta-\alpha)} R^\alpha = 1$$

(5)

since chipload f is equal to $$f = R/NV$$

(5')

The lines 75, 76, 77 in FIG. 4 are all of generally positive slope, so that as feed R increases, the value of V must increase to keep the operating point on any given one of these lines. From Equations (3) and (5) it will be seen that for all three of these lines, $\alpha$ must be greater than zero, but $\beta$ must lie within different ranges, i.e., $\alpha > 0$ and $\beta < \alpha$. More specifically, For line 75 (straight): $\alpha > 0$ and $\beta = 0$
For line 76 (concave down): $\alpha > 0$ and $\beta < 0$
For line 77 (concave up): $\alpha > 0$ and $0 < \beta < \alpha$ Each of the lines 75, 76, 77 is therefore representative of a sub-family characterized by different ranges of values for $\alpha$ and $\beta$. As will be shown below, the specific values of $\alpha$ and $\beta$ for a specific line within any sub-family need not be precisely known in order generally to deal with the constraint which that line represents.

The boundary line 78 in FIG. 4 is vertical, indicating that points therealong represent a constant value of R which is independent of changes in speed V. Thus, Equation (5) must take the form:

$$A_1 V^0 R^\alpha = 1$$

(6)

which means that $\beta-\alpha=0$ and $\beta=\alpha$. Thus, another sub-family of vertical constraint boundaries is defined when $\alpha$ is greater than 0, $\beta$ is equal to $\alpha$, and A takes on different values.

The boundary line 79 shown in FIG. 4 also represents a sub-family, but one in which an increase in feed rate R requires a decrease in speed V to maintain the operating point on the line. This sub-family of lines is characterizeable by the general Equation (3) or (5) when $\alpha > 0$ and $\beta > \alpha$.

The line 80 in FIG. 4 is horizontal, and it is represented by Equation (3) or (5) when $\alpha$ is equal to 0 and $\beta$ is equal to 1 such that Equation (5) becomes:

$$A_1 V = 1$$

(7)

so that V remains constant despite any changes in R so long as the operating point remains on the line. It will be apparent that in this case A is equal to the reciprocal of the value of the ordinate at which the line 80 resides.

The significance of FIG. 4 and Equations (3) and (5) will become more apparent hereafter, and it may be noted presently only that the line representing any upper constraint boundary in the V, R plane may be viewed as defined by those general case equations when the constants $\alpha,\beta$ and A are assigned the necessary specific values.

A. Chipload as a Limit

Under some conditions, the cutter blades may chip, shatter or plastically deform. Generally this will occur when rotational torque or sidewise force on the cutter becomes excessive, but these values will increase as chipload increases. Thus, to prevent catastrophic failure of any cutter, the chipload in any given workpiece material should be directly constrained so that it does not exceed a predetermined maximum value. That limit value may be readily determined in advance for any particular cutter and workpiece combination by simple tests which run a cutter to a purposely induced failure.

Once a maximum chipload value $f_{max}$ has been obtained, it may be used in the inequality Expression (1) by assigning to the constant A a value equal to $1/f_{max}$ to obtain $$1/f_{max} \cdot V^\beta f^\alpha \leq 1$$

(8)

By assigning values of $\beta = 0$ and $\alpha = 1$, this becomes:

$$f/f_{max} \leq 1$$

(9)

which confirms that the constraint boundary is not violated so long as the actual chipload $f$ is equal to or less than the maximum value $f_{max}$. An operating boundary line in the V, R plane is thus derived by converting Expression (9) into an equality which becomes:

$$f = f_{max}$$

(10)

By substituting $f$ from Equation (5') this becomes $$R/NV = f_{max} \quad (11)$$

$$V = 1/Nf_{max} \cdot R = k_1 R \quad (12)$$

Figure 5:
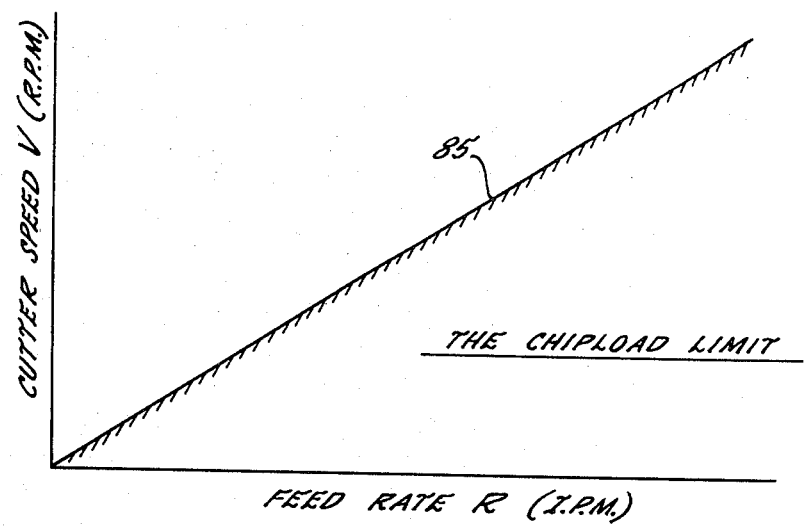
FIG. 5 is a graphical illustration of a maximum chipload limit in the V, R plane.

Thus, the limit of the chipload constraint boundary is a straight line in the V, R plane as shown by the line 85 in FIG. 5. This is a line in the sub-family represented by line 75 in FIG. 4, but for the specific case where $\alpha = 1$, $\beta = 0$ and $A = 1/f_{max}$. The slope of this line is $k_1$ and is equal to $1/Nf_{max}$, where $f_{max}$ is the maximum permissible chipload. Any combination of velocity V and rate R values which result in operating points above the line 85 in FIG. 5 is not likely to cause catastrophic failure of the cutting tool due to excessive chipload.

The maximum chipload constraint is therefore characterized by having its boundary appear as a straight line of the positive slope in the V, R plane. But clearly, any similar linear constraint line will be reasonably approximated by the general case Equation (3) when the ratio $\beta/\alpha$ is much less than one, i.e., when:

$$\beta/\alpha << 1 \quad (13)$$

B. Torque as a Limit

The maximum torque safely transmitted through the spindle of any given machine tool is established by the size, shape and material of the spindle. These factors are, of course, fixed at the time any particular machine tool is designed and manufactured. If the maximum torque is exceeded, then the spindle may be prmanently distorted or broken. The maximum torque $T_{max}$ is usually designated by the machine tool manufacturer and is thus readily available and known as a numerical value. In attempting to operate the machine tool at the highest production rate, care must be taken not to exceed this known value $T_{max}$.

Figure 6:
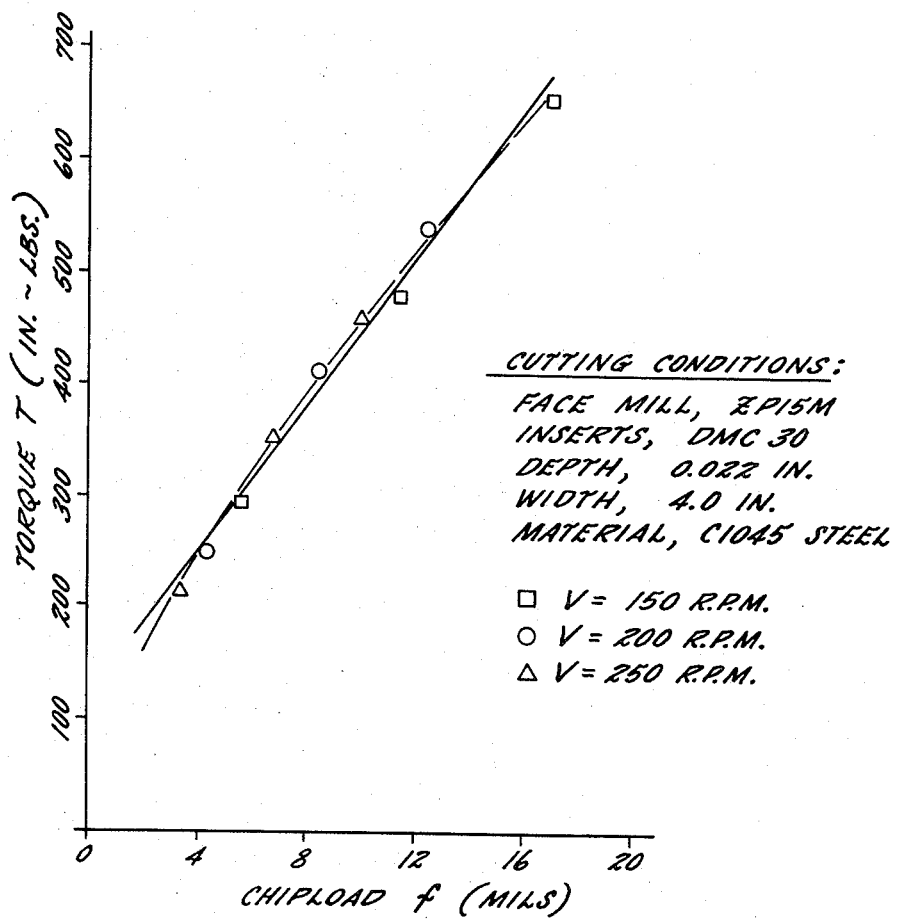
FIG. 6 is a graph showing the variations in torque exerted upon an exemplary cutter with changes in chipload, and at several different spindle speeds.

If the actual operating torque T at any time during machine operations is to be compared with the maximum torque $T_{max}$, it is desirable to know what factors effect variations in torque in order that corrective action may be taken to prevent $T_{max}$ from being exceeded. FIG. 6 is a graphical illustration of actual test data obtained by measuring spindle torque as the chipload was varied over a relatively wide range encompassing the expected operating range of chiploads. Three spindle speeds were chosen and maintained constant for the three cases, and feed rate R was varied to change the actual chipload. As shown, the three straight lines in essence fall on top of one another, from which it may be concluded that actual transmitted torque T varies directly with feed rate R and is substantially independent of cutter speed V.

Figure 7:
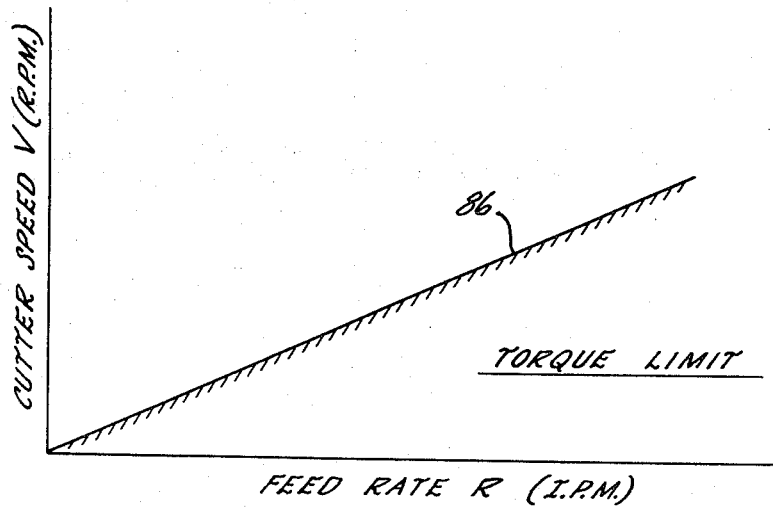
FIG. 7 is a graphical representation of the manner in which a maximum torque is representable as a boundary limit in the V, R plane.

It is safe to say from the evidence in FIG. 6 that spindle torque T varies in the same general fashion as chipload, assuming that the depth and width of cut remain constant and that the workpiece material is uniform. From this, one may deduce that the boundary line associated with the general inequality Expression (1) and represented by the general case Equation (3) may define when the actual torque T exceeds maximum safe torque $T_{max}$; and that line must have the same general characteristics as the boundary line 85 for safe chipload as shown in FIG. 5. Thus, one may validly assume that the maximum safe torque constraint boundary in the V, R plane will appear as a straight line 86, as shown in FIG. 7, even though the exact slope of that line is not known or determined.

This may be confirmed by recognizing from FIG. 6 that:

$$T = k_2 f \quad (14)$$

where $k_2$ is a factor or proportionality. But, because torque T is representable as a single line in the T, $f$ plane of FIG. 6, rather than a family of lines, it is clear that actual exerted torque T is substantially independent of velocity V. This means that in the general case Equation (3) a change in V introduces no substantial variations, i.e., that the partial derivative of torque with respect to V must closely approximate zero. Taking the partial derivative of Equation (3) one may write:

$$\sigma(V^\beta f^\alpha)/\sigma V \cong 0 \cong \beta [V^{(\beta-1)} f^\alpha] \quad (15)$$

Since neither V or $f$ can be zero under actual machining conditions, and the foregoing bracketed quantity is thus not zero, it is clear that:

$$\beta \cong 0 \quad (16)$$

and that the ratio $\beta/\alpha$ must approach zero, since $\alpha$ is always assumed to be greater than zero in the general case. In other words, for a variable which appears substantially as a single straight line (such as the single line in FIG. 6) in the Q, $f$ plane (where Q is the variable parameter or manifestation of concern), it is known that the inequality boundary line represented by the general case Equation (3) must involve values for $\alpha$ and $\beta$ such that:

$$\beta/\alpha << 1 \quad (17)$$

This is the characteristic noted for the staight line 85 in FIG. 5, so it is confirmed that the torque constraint boundary 86 in the V, R plane of FIG. 7 is also a line of positive slope, and one which is approximately straight.

C. Spindle Deflection as a Limit

If appreciable forces are exerted on the cutter in a plane normal to the spindle axis, the quill, spindle and tool shank may be perceptively deflected. In the extreme case, the resulting tilting of the cutter may adversely affect the dimensional accuracy of the finished workpiece, and in lesser cases the machined surface may be tilted or skewed slightly from the desired plane and the surface finish may be degraded. A determination of the tolerable spindle deflection will be based primarily on the dimensional tolerance or degree of surface finish precision demanded in any particular series of workpieces. But with those quality standards established, the numerical values of maximum deflections $d_{x_{max}}$ and $d_{y_{max}}$ may then be found by making a few trial cuts with progressively higher chiploads.

The total deflection of the tool shank, spindle and quill may occur in various directions depending upon the vector along which the cutter is being fed. Indeed, even when the feed direction is along the X axis, the total cutter deflection is made up of components respectively parallel to the X and Y axes. It is therefore best to sense two deflection components separated by 90°, and for this reason, deflections $d_x$ and $d_y$ are separately considered.

(1) Deflection $d_y$ Normal to Cutter Path

Figure 8:
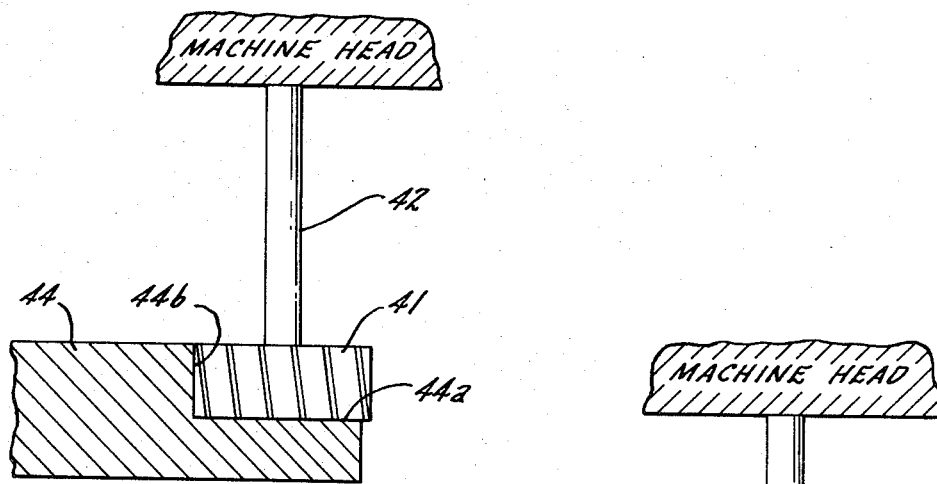
FIGS. 8 and 9 are diagrammatic illustrations depicting a cutter and its supporting spindle respectively undeflected and deflected in a direction normal to the path of cutter feed, the deflection resulting from reaction forces upon the cutter due to its engagement with the workpiece.
Figure 9:
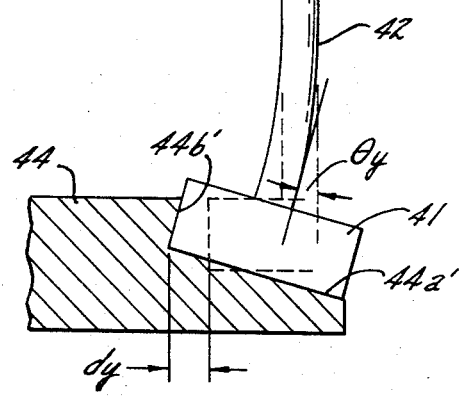

FIGS. 8 and 9 are diagrammatic illustrations of the cutter 41 and spindle 42 looking along the line a—a in FIG. 3 and respectively depicting the cutter undeflected and deflected in a direction normal to the X axis along which the cutter and workpiece are being relatively fed at a feed rate R. In the ideal case represented by FIG. 8, the cutter carves out a perfectly flat surface 44a and a vertical surface 44b. Due to sidewise reaction on the cutter teeth as they rotate and bite into the metal workpiece, there is a force on the cutter and a resulting deflection in a direction parallel to the Y axis. This deflection is the result of bending of the spindle, quill or tool shank through an angle $\theta_y$ shown greatly exaggerated in FIG. 9, so that the edge of the cutter is no longer vertical. As a result, the "horizontal" surface $44a'$, when viewed from above, is wider than intended and is tilted by an angle equal to the tilt of the cutter and the surface $44b'$.

Figure 10:
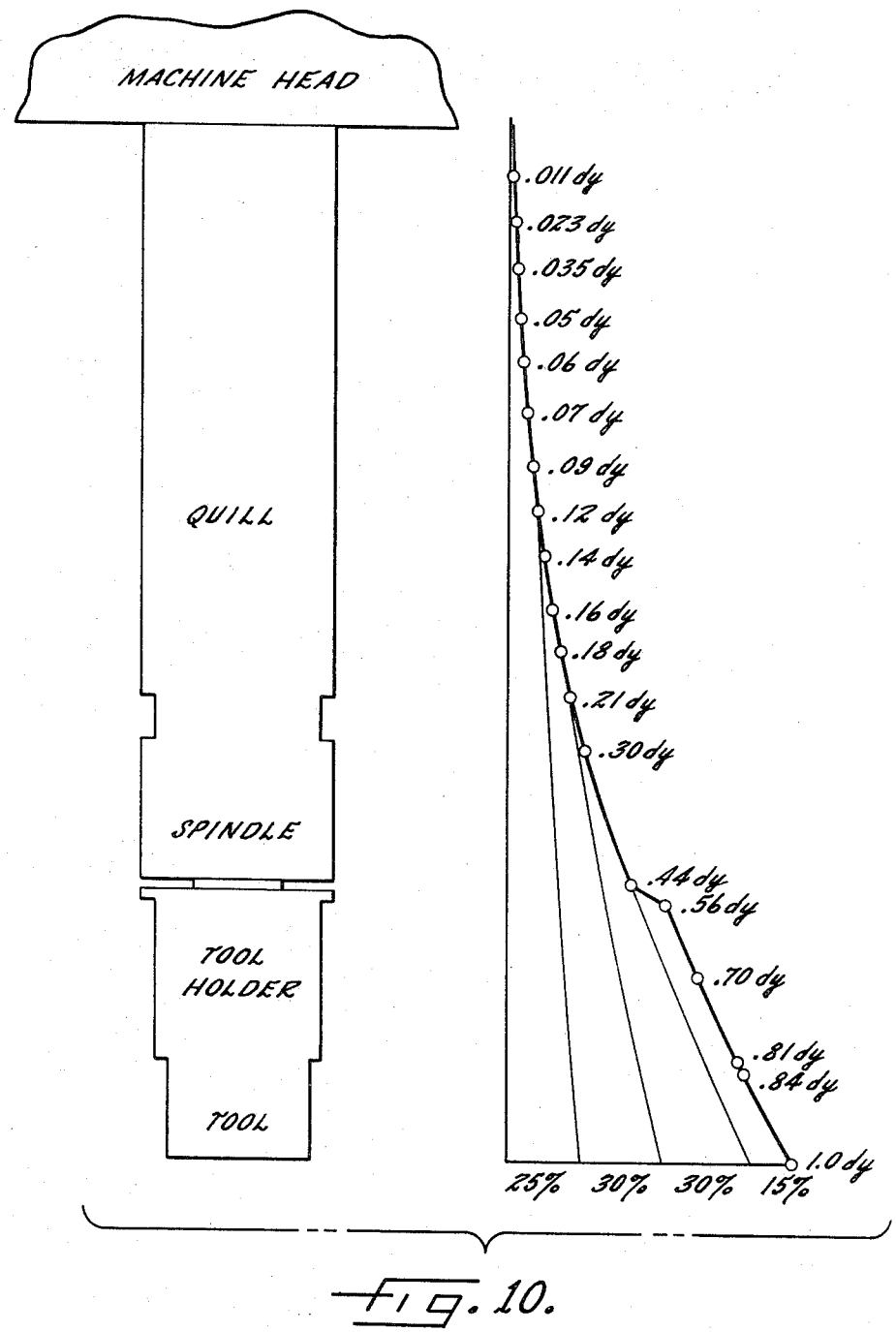
FIG. 10 is a diagrammatic representation of the deflections of a spindle and quill at various lengthwise positions thereof under a given reaction force applied to a cutter carried at the end of a spindle.

It has been shown from static deflection measurements that the deflection magnitude $d_y$ is proportional to the angle $\theta$ and that for a given deflecting force the angle $\theta$ varies with the amount by which the quill is extended from the headstock. From actual static deflection measurements with the quill fully extended, as plotted in FIG. 10, it may be seen that the deflection displacement is progressively smaller at points higher (i.e., closer to the headstock) along the spindle and quill when a given force causes a normalized deflection of 1.0 $d_y$ at the cutter itself. If the deflection is measured at a point on the quill above the cutter, a conversion multiplier should be used to compute the actual cutter deflection $d_y$.

From this it may be said that:

$$d_y = k_3 \, d_{ys} \tag{18}$$

where $k_3$ is a factor of proportionality and $d_{ys}$ is the sensed deflection at a predetermined distance below the headstock. The factor $k_3$ will have different values for each different extended position of the quill, but such values may be readily determined by simple tests on any particular machine.

Figure 11:
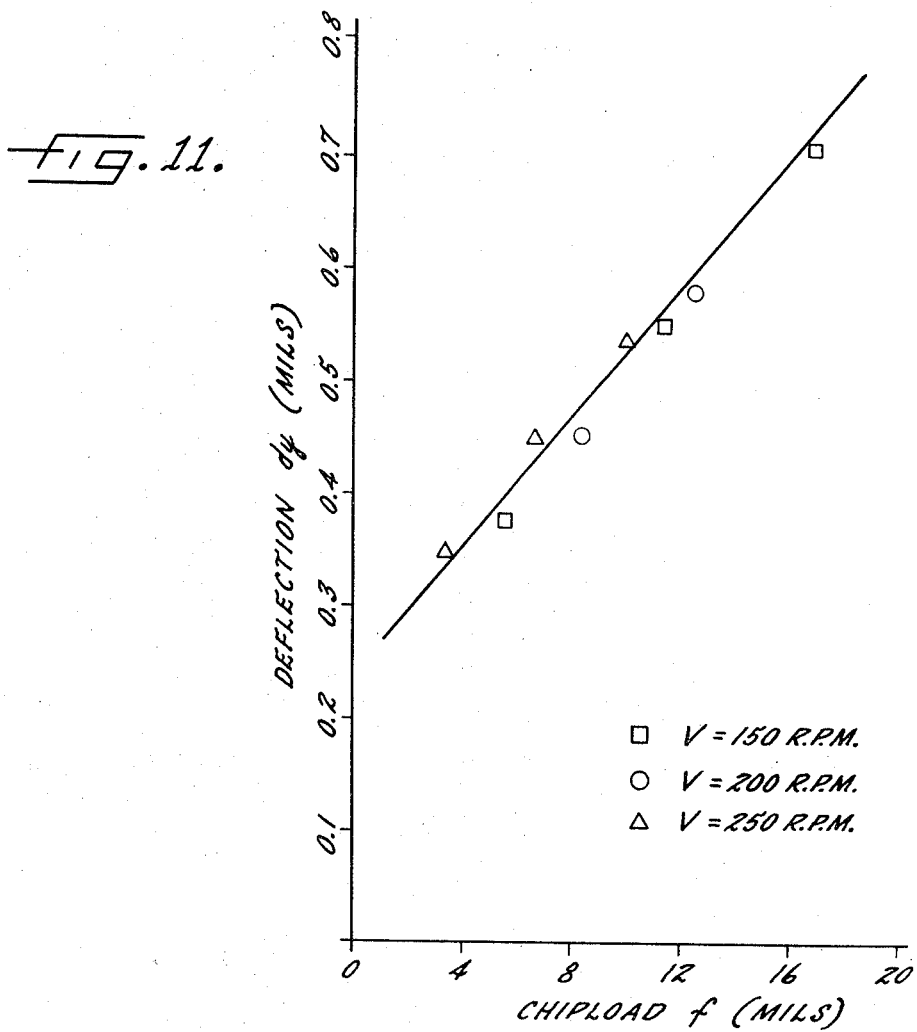
FIG. 11 is similar to FIG. 6 but graphically illustrates the variation of cutter deflection in a direction normal to the feed path vs. changes in chipload, and at several different spindle speeds.

To determine the way in which deflection $d_y$ varies with changes in speed V and shipload f during actual cutting operations, measurements were made on an exemplary machine tool with the quill fully extended, and the results are plotted in FIG. 11. It will be seen that at a given speed V (and with feed rate R being varied to change chipload $f$), cutter deflection $d_y$ varies substantially in direct proportion to chipload $f$. Moreover, as the tests were repeated with three different values of speed V the expected family of three curves fell substantially on one another, indicating that deflection $d_y$ is substantially independent of spindle speed except to the extent that speed V affects chipload $f$.

As noted above, with the quill extended by a given amount, tests may be run with a particular type of cutter acting on a particular workpiece material with progressively increased chiploads until it is determined that the deflection $d_y$ has become excessive because tolerances for the finished workpiece are exceeded. Thus, a numerical value of $d_{y_{max}}$ may be readily established. Yet, the nature of a constraint to prevent exceeding the established $d_{y_{max}}$ value must be understood in order to drive a machine tool to its maximum capability without exceeding the maximum deflection $d_{y_{max}}$.

Figure 12:
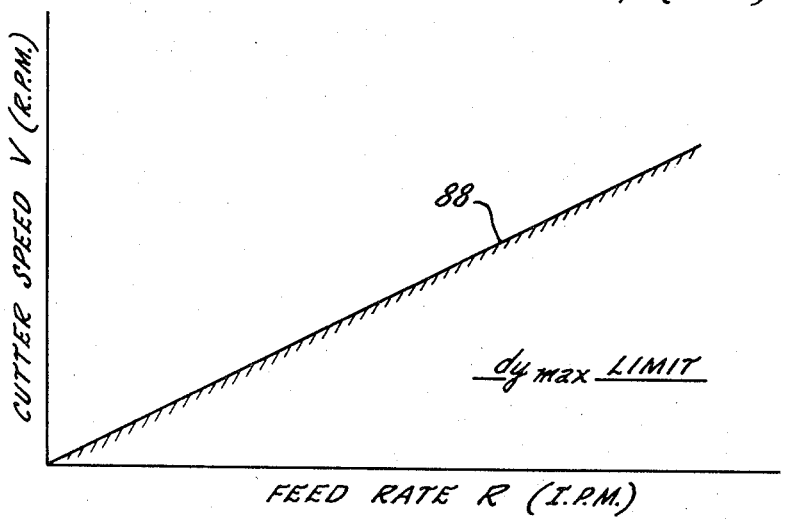
FIG. 12 is an illustration of the manner in which a given normal deflection limit appears as a constraint boundary in the V, R plane.

From FIG. 11, and by analysis similar to that made above with reference to torque T and FIG. 6, it may be concluded that the boundary line for a maximum deflection $d_{y_{max}}$ appears as a straight line 88 in the V, R plane, as shown in FIG. 12. This means that the $d_{y_{max}}$ limit is not exceeded under any operating conditions where:

$$\frac{d_y}{d_{y_{max}}} \leq 1 \tag{19}$$

but by the same rationale which is set forth in the foregoing discussion of torque, it is apparent that the line 88 in FIG. 12 is representable by the general case Equation (3) if the constant A is assigned a value equal to the reciprocal of the maximum deflection $d_{y_{max}}$:

$$\frac{1}{d_{y_{max}}} \cdot V^\beta f^\alpha = 1 \tag{20}$$

where $\beta$ and $\alpha$ have unknown specific values but are related such that:

$$\beta/\alpha << 1 \tag{21}$$

Thus, a constraint boundary for the deflection $d_y$ is similar in its character to the torque boundary and chipload boundary represented by FIGS. 5 and 7; and it is representable in the V, R plane as a substantially straight line 88 of positive slope (FIG. 12).

(2) Deflection $d_x$ Parallel to Cutter Path

Figure 13:
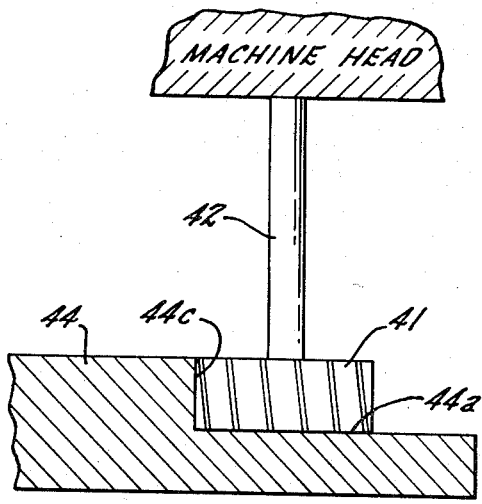
FIGS. 13 and 14 are similar to FIGS. 8 and 9 but respectively show, in diagrammatic fashion, a cutter carrying spindle undeflected and deflected in a direction parallel to the path of cutter motion due to reaction forces on the cutter.
Figure 14:
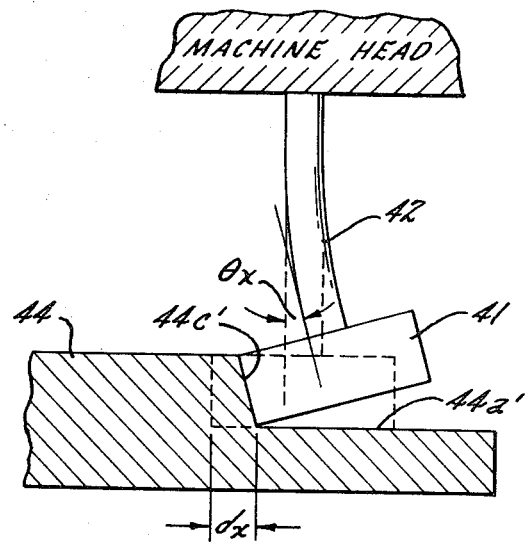

FIGS. 13 and 14 are diagrammatic views taken along the line b—b of FIG. 3 and respectively show the quill, spindle and cutter undeflected and deflected in a direction parallel to the cutter path, i.e., along the X axis. Whereas normally (FIG. 13) the cutter 41 machines a flat surface 44a and attacks the workpiece 44 along a vertical surface 44c, the force of the workpiece in feeding into the cutter deflects the latter to an angle $\theta_x$, as shown greatly exaggerated in FIG. 14. The cutter is thus deflected by a distance $d_x$ from its intended position.

This deflection has several effects. First, it results in the surface $44a'$ being elliptically dished rather than flat because the leading point of the cutter periphery contacting the workpiece is lower than other peripheral points. Portions of this elliptical surface $44a'$ may be somewhat above or below the level of the intended surface $44a$. Thus, both dimensional accuracy and surface finish are degraded by the deflection $d_x$. Secondly, the deflection $d_x$ and the angular tilting $\theta_x$ result in grooving of the workpiece surface by cutter teeth having a face clearance angle, since the effect may be to cause an effective clearance angle greater than that actually formed on the cutter tooth. Therefore, when it is known that a cutter is experiencing a deflection $d_x$, the surface finish of the workpiece should be examined to see if it has been unacceptably degraded.

Again, and as noted above with respect to the deflection $d_y$, a numerical value of a maximum permissible deflection $d_x$ may be established by making test cuts at progressively higher chiploads with the spindle of a machine tool in a given extended position and with a particular cutter and workpiece material. Once this numerical value $d_{x_{max}}$ has been established, it may be thereafter used for purposes of comparison with actually measured values of $d_x$ in order to determine when the maximum or limit has been exceeded.

Figure 15:
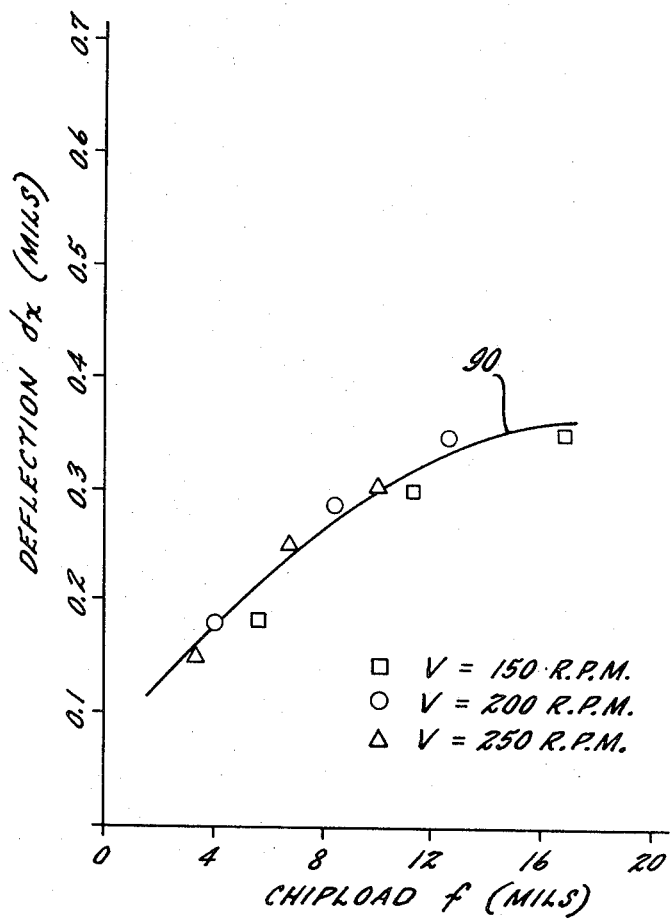
FIG. 15 is a graphical illustration made from actual test data and showing the manner in which parallel deflection typically varies with changes in chipload, and at several different spindle speeds.

Yet, it is desirable to know the nature of the constraint or limit as it appears in the V, R plane. For this purpose, measurements of the deflection $d_x$ were made on a particular machine tool at different chiploads and with different spindle speeds, in the same fashion as described above with reference to FIG. 11. The results for the deflection $d_x$ are plotted in FIG. 15, from which it may be seen that deflection $d_x$ is an approximately linear function of chipload $f$ and is substantially independent of cutter velocity V (except to the extent that the latter determines chipload $f$), but the single line 90 shown in FIG. 15 as reflecting the relationship between deflection $d_x$ and chipload $f$ is somewhat curved at its right extremity. It may be safely assumed therefore that deflection $d_x$ is directly proportional to some positive fractional power of the chipload $f$.

Figure 16:
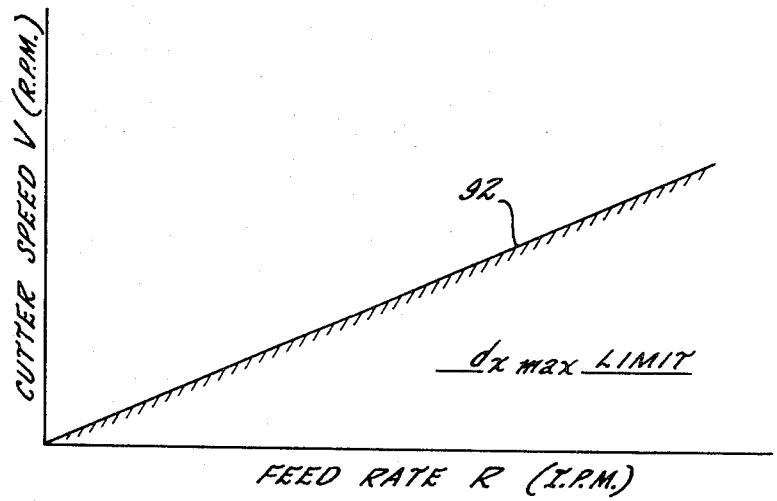
FIG. 16 is an illustration of the manner in which a given, constant parallel deflection limit appears as a constraint boundary in the V, R plane.

From this latter fact, and by an analysis similar to that presented above with respect to the deflection $d_y$, it may be stated that the permissible area of operations where the maximum deflection $d_{x_{max}}$ is not exceeded lies above a line 92 (FIG. 16) in the V, R plane where that line is substantially linear and of positive slope. In other words, the line 92, which defines the boundary of the permissible area lying above it in FIG. 16, is representable by the general case Equation (3) if the constant A is assigned a value equal to the reciprocal of $d_{x_{max}}$ and if the constant coefficients $\alpha$ and $\beta$ are assigned specifically unknown values but values which make the ratio of $\beta$ to $\alpha$ greatly less than one. Thus, the line 92 in FIG. 16 may be represented by $$\frac{1}{d_{x_{max}}} \cdot V^\beta f^\alpha = 1, \text{ where } \beta/\alpha \ll 1 \quad (22)$$

which yields:

$$\frac{f}{(d_{x_{max}})^{1/\alpha}} \cong 1 \quad (22')$$

D. Power as a Limitation

The spindle driving motor and drive train are limited by the original design choices in any given machine tool. Attempts to apply more power in order to speed up machine production will be unsuccessful, and may result in overloading or damage. It is therefore important in an adaptive control system to keep the actual spindle power below the maximum power $P_{max}$ which may be numerically designated by the machine tool manufacturer.

Figure 17:
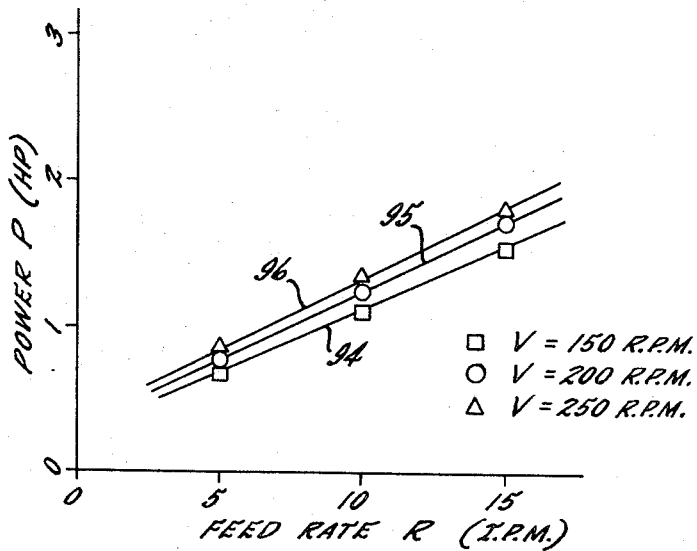
FIG. 17 is a graphical illustration of the manner in which power exerted by the spindle in driving the cutter varies with changes in feed rate for a given depth and width of cut, and at several different spindle speeds.

Exerted spindle power P has been found to increase in consequence of an increase of feed rate R or an increase in spindle velocity V. From measurements taken at three different spindle speeds, and with progressive increases in feed rate, it has been found that exerted power varies linearly with rate R for a given combination of workpiece material, cutter type and material, depth and width of cut, and at a given speed V. As V is changed, a family of individual straight lines 94, 95, 96 is obtained as shown in FIG. 17.

Considering now the general case equation:

$$A_1 V^{(\beta - \alpha)} R^\alpha = 1 \quad (5)$$

it may be noted from the straight lines 94–96 that when rate R is constant, the partial derivative with respect to spindle speed V of an expression for power must be positive and greater than zero. Thus, the partial derivative with respect to V of Equation (5) may be written to form the expressions:

$$\sigma[A_1 V^{(\beta - \alpha)} R^\alpha]/\sigma V \big|_{R = CONSTANT} > 0 \quad (23)$$

$$A_1(\beta-\alpha)V^{\beta - \alpha - 1} R^\alpha > 0 \quad (24)$$

which leads to the conclusion that:

$$(\beta-\alpha) > 0 \quad (25)$$

so that:

$$\beta > \alpha \quad (26)$$

Of course, the exponential constant $\alpha$ is greater than zero because each of the lines 94–96 in FIG. 17 indicates that power increases as the rate R increases. Therefore, it may be concluded that the general case Equation (3), i.e.:

$$AV^\beta f^\alpha = 1 \quad (3)$$

represents the boundary line between spindle power values which are respectively safe or excessive in the V, R operating plane, but with the understanding that the constants of that equation have the relationships:

$$A = 1/P_{max} \quad (27)$$

$$\alpha > 0 \quad (28)$$

$$\beta > \alpha \quad (29)$$

Figure 18:
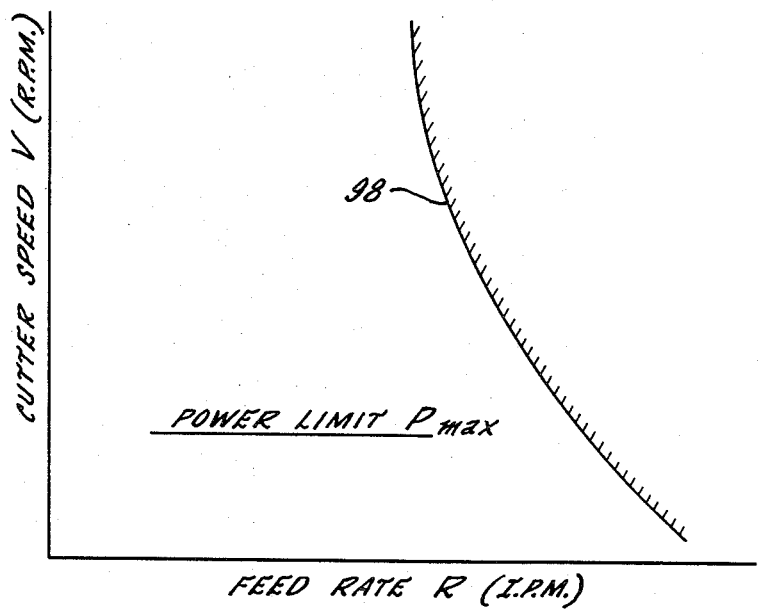
FIG. 18 is an illustration of a constraint boundary in the V, R plane resulting from a given, constant maximum power limitation.

This being so, one may conclude that the boundary line constraint for maximum power falls within that family of lines represented by the line 79 in FIG. 4, and has a generally negative slope, as represented by a line 98 in FIG. 18. As will be pointed out below, it is not necessary that the actual values of $\alpha$ and $\beta$ for the line 98 be known, nor is it necessary to know the exact slope or curvature of the line at any particular point.

E. Limitations Imposed By Tool Vibration and Chatter

When a cutter is driven at certain combinations of feeds and speeds while taking a cut of a given depth and width in a given material, that cutter will vibrate or chatter. Inevitably, this degrades the surface finish, but to an extent which cannot be accurately predicted because the mode and amplitude of chatter is not accurately foreseeable. The informal but very practical rule adopted by machining technicians, therefore, is simply to avoid chatter at all times. This can be accomplished by sensing the vibration amplitude of the spindle or quill as an indicator of cutter vibration, and chatter will not occur until some maximum vibration amplitude $U_m$ is exceeded. It is a simple matter, therefore, to make a few test cuts with a given cutter acting upon a given workpiece material in a particular machine tool while measuring the amplitude of vibrations of the quill. As progressively greater speed and feed conditions are imposed, the vibration amplitude will increase or cutter chattering may be noted. From this test, the safe, maximum vibration amplitude $U_m$ which just avoids chatter can be numerically established. An even lower maximum value for $U_m$ may be chosen if vibration is to be kept very low for the purpose of enhancing surface finish.

During subsequent regular operations of the machine tool, the actual vibration U can be sensed and compared with the safe maximum value $U_m$. The machine tool may be controlled such that at all times:

$$U/U_m \geq 1 \qquad (30)$$

But in order to determine corrective action, it is desirable to know the nature of the boundary line for this constraint in the V, R plane.

Figure 19:
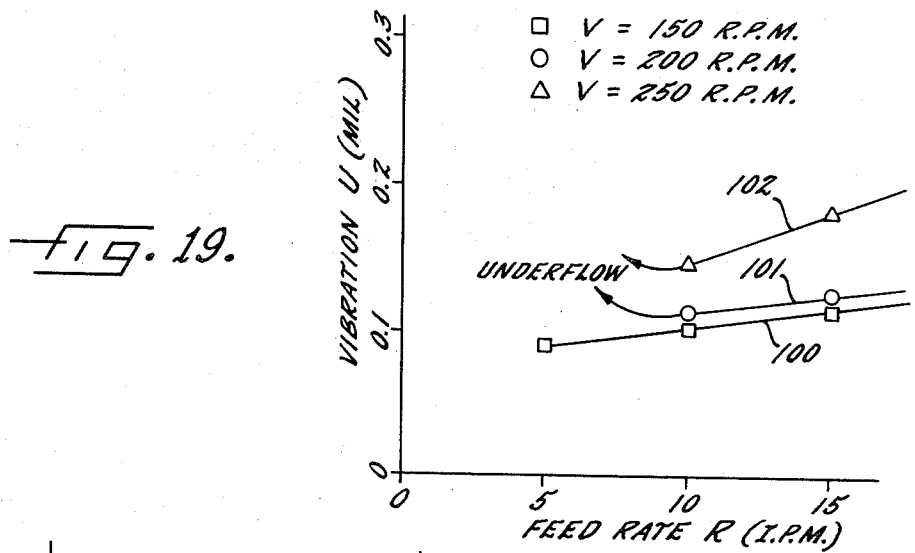
FIG. 19 is a graph of vibration amplitude vs. feed rate under given cutter conditions at several different spindle speeds.

Experimental measurements of vibration U have been made by holding speed V constant at different selected values and varying feed rate R. The results are plotted and represented by a line 100 in the U, R plane as shown in FIG. 19. A family of similar lines is evidenced by lines 101 and 102 similarly plotted with the speed V held constant at respectively higher values. The upturned left ends of lines 101 and 102 are the result of "under-flow" (discussed hereafter) and may be disregarded.

Figure 20:
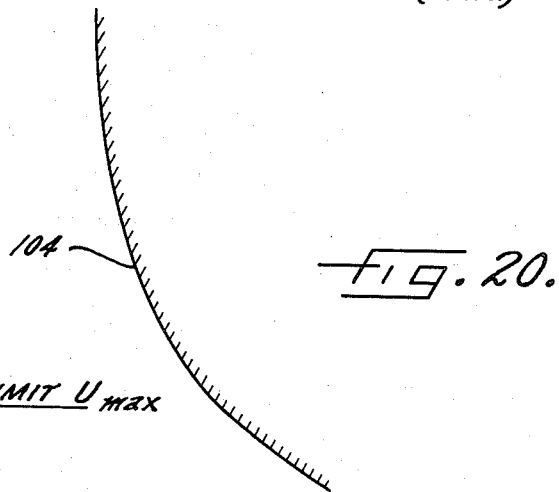
FIG. 20 is an illustration of the shape of a constraint boundary in the V, R plane corresponding to a given constant, maximum vibration amplitude.

It is apparent that vibration U increases with increases in either rate R or speed V. FIG. 19 shows relationships for vibration U which are similar in character to those observed in FIG. 17 for power P. Thus, by the same rationale followed above, it may be concluded that the boundary line, separating areas of acceptable and unacceptable operating points from the standpoint of vibration, appears as a line 104 shown in FIG. 20 having a generally negative slope and shaped similarly to the line 98 in FIG. 18.

The general case Equation (3) may thus represent the vibration constraint 104 in the V, R plane when the constant A is the reciprocal of $U_m$, $\alpha$ is greater than zero, and $\beta$ is greater than $\alpha$. This may be written:

$$1/U_m \cdot V^\beta f^\alpha = 1, \text{ where } \alpha > 0 \text{ and } \beta > \beta \qquad (31)$$

The values of $\beta$ and $\alpha$ in Equation (31) may be specifically different from those for the equation which pertains to the power constraint boundary, but their specific values need not actually be known or determined.

F. Minimum Chipload as a Limit

It has been recognized that if chipload for a functioning cutter is too small, the chips are not cleanly sheared away and the cutter may mash over the work surface to cause what is commonly called "under-flow." The phenomenon may occur at any speed V if the chipload is too small. The minimum chipload value $f_{min}$ below which the actual chipload $f$ must not fall if under-flow is to be avoided can be numerically determined by simple tests with a given machine tool and cutter acting on a workpiece of a given material. By progressively reducing the chipload until under-flow is observed, a numerical value for $f_{min}$ which is slightly greater may be determined and selected.

Once the value for minimum chipload $f_{min}$ has been established, that minimum value will not be violated so long as $$f/f_{min} \geq 1 \qquad (33)$$

which means that a constraint boundary for minimum chipload is not violated so long as actual chipload $f$ is equal to or greater than $f_{min}$. At the boundary line for this constraint, the Expression (33) becomes:

$$f = f_{min} \qquad (34)$$

which from Equation (5') yields:

$$f_{min} = R/NV \qquad (35)$$

$$V = R/N f_{min} = k_5 R \qquad (36)$$

Figure 21:
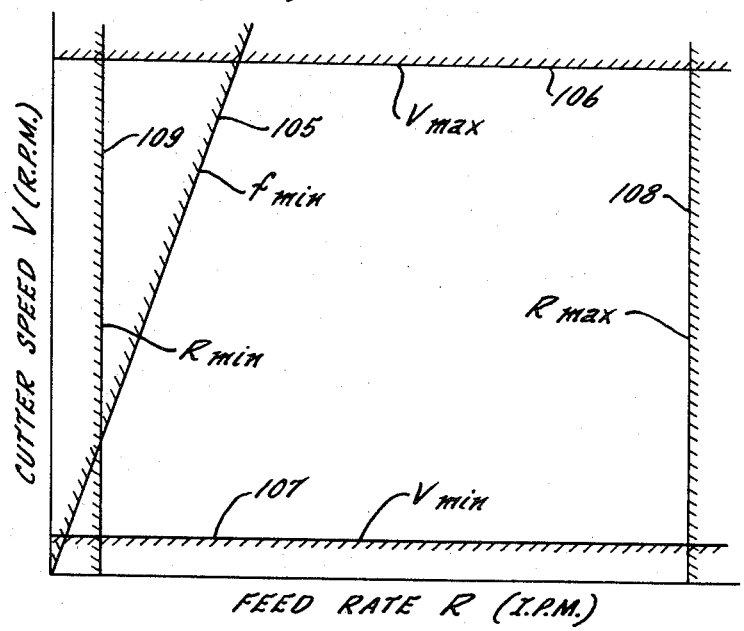
FIG. 21 is an illustration of constraint boundaries in the V, R plane corresponding to inherent limitations of a machine tool as to maximum and minimum spindle speeds, maximum and minimum feed rates, and minimum chipload.

Plotting Equation (36) in the V, R plane results in a straight line 105 with a slope $k_5$, as shown in FIG. 21. So long as the operating point in the V, R plane is kept to the right of the line 105, the actual chipload $f$ will not fall below the minimum acceptable value $f_{min}$.

G. Inherent Limits on Speed and Feed

Finally, it is inevitable that any machine tool will have both maximum and minimum values of speed V and rate R which its drive motors may produce in rotating the cutter and translating the cutter relative to the workpiece. To command values of speed or feed which are below or above these minimum and maximum possible values is to no avail, and indeed attempts to operate under these conditions may damage the motors or associated drive mechanisms.

These minimum or maximum values appear as straight lines in the V, R plane as shown in FIG. 21. The maximum and minimum values $V_{max}$ and $V_{min}$ are represented by horizontal lines 106, 107 while the maximum and minimum values $R_{max}$ and $R_{min}$ appear as vertical lines 108, 109. The specific numerical values for these limits on speed and feed are readily available from the published specifications applicable to any given machine tool.

It is apparent that speed V and feed rate R are independent of one another, even though they jointly affect chipload. Thus, taking the general case Equation (5), i.e.:

$$A_1 V^{(\beta - \alpha)} R_x = 1 \qquad (5)$$

and setting $\alpha = 0$ and $\beta = 1$, it becomes $$A_1 V = 1 \qquad (37)$$

$$V = 1/A_1 = \text{CONSTANT} \qquad (38)$$

This is a simple expression for the line 106 or 107 in the V, R plane when the constant $1/A_1$ is given respectively the numerical value of $V_{max}$ or $V_{min}$. Similarly, when $\alpha$ and $\beta$ in the general case Equation (5) are assigned a value of one, that equation becomes simply:

$$A_1 \cdot R = 1 \qquad (39)$$

$$R = 1/A_1 = \text{CONSTANT}$$

(40)

Equation (40) accurately represents the boundary lines 108 and 109 in the V, R plane of FIG. 21 when the constant $1/A_1$ is respectively assigned the numerical value of $R_{max}$ or $R_{min}$. It will be understood from FIG. 21, therefore, that the absolute maximum and minimum values for permissible ranges of speed V and rate R are representable in the V, R plane as boundary lines expressed by the general case equation noted above with particular values assigned to the constants therein.

3. Economics of Machining Parts

From the work of Brierley and Siekman (*Machining Principles and Cost Control*, McGraw-Hill Book Co., New York, 1965), the cost of machining each of a series of identical parts may be viewed as constituted by the sum of (a) machine tool operating cost $C_M$ to actually machine the part, (b) the cost $C_T$ attributable to the cutter used in machining the part, and (c) the non-productive time costs $C_{NP}$ associated with changing each workpiece. Generally speaking, if a plurality of identical parts are to be produced, a single cutter will be usuable on several parts, after which it is necessary to return that cutter to the tool room for sharpening and to place a freshly sharpened cutter into the machine tool. It may be assumed for exemplary purposes of discussion that the type of cutter in question is a face milling cutter having a plurality of N blade inserts, here called teeth.

It may be seen at once that the machining cost $C_M$ ($) for each part is $$C_M = T_M (R_L + R_{OH})$$

(42)

where $T_M$ is time (minutes) to machine one part;
$R_L$ is machine operator's wage rate ($/min.); and
$R_{OH}$ is machine tool overhead rate ($/min.).

The cost $C_T$ associated with each changing of the cutter is:

$$C_T = C_{DT} + C_G + C_D + C_{IN}$$

(43)

where $C_{DT}$ is cost ($) of down time of the machine for each cutter change;
$C_G$ is the cost ($) for regrinding or sharpening all of the cutter teeth;
$C_D$ is the cost ($) of depreciation of the cutter resulting from grinding; and
$C_{IN}$ is the cost ($) of carrying the cutter in inventory, spread over the number of tool changes in which that cutter will be involved.

These latter costs, i.e.. the individual terms in Equation (43), can be defined in more detailed terms:

$$C_{DT} = T_C (R_L - R_{OH})$$

(44)

where $T_C$ is the time (minutes) required for the operator to change the cutter in the machine tool.

$$C_G = T_G N (R_{GL} + R_{GO})$$

(45)

where
$T_G$ is the time (minutes) to grind one complete tooth on all surfaces which operatively engage the workpiece during machining;
N is the total number of teeth (or inserts) employed in the cutter;
$R_{GL}$ is the wage rate ($/min.) of the grinding laborer;
$R_{GO}$ is the overhead factor ($/min.) associated with the grinding machine.

$$C_D = C_I N/N_G N_E + C_{TH}/N_R N_G N_E$$

(46)

where $C_I$ is the cost ($) of each grindable insert or tooth in the cutter;
$N_G$ is the number of regrinds possible on a tooth insert before the latter is exhausted;
$N_E$ is the total number of cutting edges or usable edge combinations on an insert;
$C_{TH}$ is the original cost ($) of the cutter body which holds the inserts;
$N_R$ is the number of insert sets which can be used in a single body before the latter is discarded as being worn out.

On the other hand, if so-called "disposable" cutter inserts, which are discarded and not resharpened after dulling to a degree ending their usefulness, then the representation of $C_D$ takes the alternative form:

$$C_D = C_I N/N_E + C_{TH}/N_R N_E$$

(46a)

where $C_I$ ($) in this case is the cost of each disposable insert; and the first term represents the cost of replacing the insert blades while the second term represents the depreciation of the cutter body and periodic replacement of screws, clamps or the like.

As to the inventory cost:

$$C_{IN} = R_I (N_{TT} C_{TH} + N_{IT} C_I)$$

(47)

where $N_{TT}$ represents the total number of tool holder bodies stocked in the tool crib.
$N_{IT}$ represents the total number of tooth inserts stocked in the tool crib; and
$R_I$ represents a fraction constituted by the ratio of (a) the value of the tool bodies and inserts for the type of operation performed on the part in question, and (b) the total value of all tool bodies and inserts stocked in the shop tool crib.

The inventory cost $C_{IN}$ is the charge attributable to the production of each part for maintaining the necessary number of cutter bodies and inserts in stock so that the machine tool may be kept busy.

The non-productive cost $C_{NP}$ associated with each part produced may be expressed $$C_{NP} = (T_L + T_U + T_{RT}) (R_L + R_{OH})$$

(48)

where
$T_L$ is the time (min.) required to load a workpiece;
$T_U$ is the time (min.) required to unload a workpiece; and
$T_{RT}$ is the time (min.) required for rapid traversing the machine approximately to and from the workpiece, during which no useful cutting occurs.

From the foregoing, the total cost $C_P$ for producing one part is expressable as $$C_P = C_M + \Delta W/W \, C_T + C_{NP}$$

(49)

where $C_M$, $C_T$, $C_{NP}$ are the dollar costs represented by Equations (42), (43) and (48), respectively. The factor W is the total wear (inches) which a cutter tooth may experience before it must be re-ground or replaced; and the factor $\Delta W$ is the wear imposed on a cutter blade in the machining of a single part. Thus, the term $\Delta W/W\, C_T$ is the cutter cost attributable to the machining of one part based upon the fact that the cutter will have to be changed after some number $W/\Delta W$ of parts have been machined.

As will be described below, the present invention provides a simple and advantageous way of optimizing machining operations by substantially holding the total cost per part $C_P$ to a minimum (and doing so on an instantaneous basis). Minimum cost machining is not, however, the same as minimum time machining which seeks to turn out the maximum number of parts per unit time. The invention to be described may be applied to achieve maximum parts per unit time — which is the same as minimum total time $T_P$ for producing each individual part. It is appropriate, therefore, to note that the total time $T_P$ for producing one part may be represented by $$T_P = T_M + \Delta W/W\, T_C + T_{NP} \tag{50}$$

where $T_M$ is actual machining time;

$T_C$ is time required to change the cutter; and $T_{NP}$ is the non-productive time associated with putting the part in and removing it from the machine tool. Equation (50) is similar in form to Equation (49) and the latter will be used as an example in the following discussion.

For brevity in discussion, it may be assumed that the machining of a single part involves simply a face milling operation over a distance L which includes a short approach before the cutter engages the work and a short departure to clear the cutter from the work. As shown in FIG. 3, if the cutter is rotating at V r.p.m. and the workpiece is moved uniformly at a feed rate of R inches/min., the time $T_M$ to machine the work surface will be:

$$T_M = L/R \text{ min.} = \text{in./in./min.} \tag{51}$$

As the cutter moves, however, each tooth will take a small bite or chip out of the work, and the "chipload" $f$ (here used as a short name for the "feed per tooth") is thus expressed by Equation (5'), supra. By substitution from (5') into (50):

$$T_M = L/fVN \tag{53}$$

Thus, the time for machining a cut of length L on a workpiece can be expressed in terms of the feed per tooth $f$, the spindle speed V in r.p.m., and the number N of teeth on the cutter, providing that f and V remain constant. If $f$ and V vary from instant to instant while the path of length L is being machined, the machining time $T_M$ is simply the sum of the small time intervals $\Delta T$ required to machine small successive increments $\Delta L$ which may involve different values of $f$ and V. That is, the time $T_M$ is the integral of $dT/dL$ over the length of the part.

A. The Manner in Which A Cutter Wears

The wear on cutter teeth —during the machining of a path length L— is a complex function of such variable factors as (a) the material of the workpiece, e.g., its hardness, (b) the material of the cutter teeth themselves, (c) the spindle or cutter speed V in r.p.m., and (d) the feed rate R at which the workpiece and cutter are relatively moved. Initial work toward defining cutter wear relationships is credited to F. W. Taylor ("Art of Cutting Metals," Transactions, A.S.M.E., Vol. 28, page 31, 1906) who found the empirical relation $$V \cdot T^n = K \tag{54}$$

where V is cutter speed in r.p.m.,

T is the useful tool life (min.) before regrinding of inserts, or discarding of disposable inserts, is necessary; and $n$ and K are empirical constants determined experimentally from cutter wear tests made with particular workpiece materials and particular cutting teeth materials and geometry.

The constants $n$ and K in Equation (54) will thus be different for each workpiece material and each cutter blade material, but for most common combinations, these constants have been determined and published in the literature. See, for example, *Economics of Machining* by W. W. Gilbert, Machining Theory and Practice, A.S.M.E., 1950, pps. 465–485.

Figure 21A:
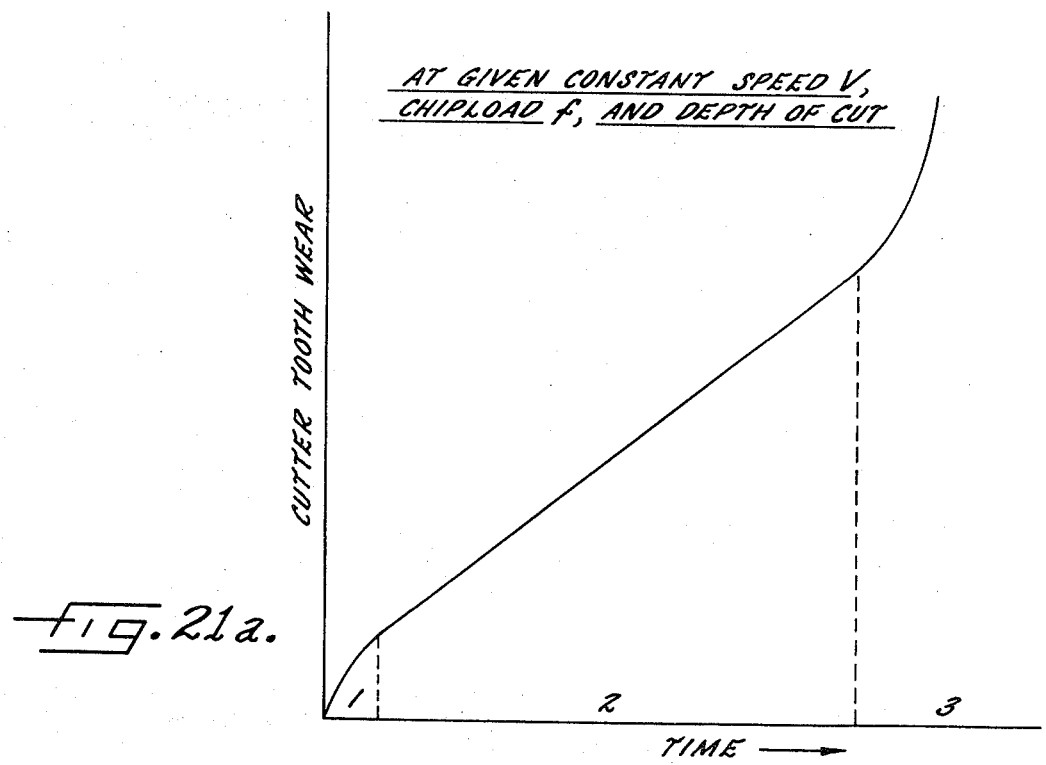
FIG. 21a is a graph showing the manner in which a cutter typically wears as machining time passes.

From Taylor's work, it is known that when a sharpened cutter blade is put into active service (at a given speed V and chipload $f$) there is an initial period of high, non-linear cutter wear rate, then a period in which wear is substantially proportional to time, and finally a high wear rate leading to catastrophic breakdown of the cutting edge. These relationships are shown in FIG. 21a which is a typical graph of cutter wear versus time when machining is carried out at some predetermined constant spindle speed and feed rate on a workpiece of uniform consistency. Since by far the greatest useful life of a cutter blade is constituted by the central, linear zone 2 in FIG. 21a, it may be reasonably assumed that wear is proportional to machining time. Hence:

$$\Delta W/W = T_M/T \tag{55}$$

where $T_M$ is machining time (min.);

T is total useful life (min.) of the cutter blades before regrinding or discarding is required $\Delta W$ is the wear (inches) experienced during the time $T_m$; and W is the total wear tolerable before the cutter blades must be reground or replaced.

Taylor's work, as represented by Equation (54) assumes that the chipload $f$ remains constant throughout the use of a cutter whose life is T minutes. But in many cases, the feed rate R, and thus chipload $f$, as well as the cutter speed V may be changed from time to time. This has led to what is well known as the "modified Taylor equation:"

$$V\, T^n f^q = K \tag{55a}$$

where $f$ is chipload or feed per tooth; and $n$, $q$ and K are constants which have been determined and published for common combinations of workpiece and cutter materials. Thus Equation (55a) provides a useful relation between tool life T, cutter speed V and chipload $f$ —the latter being determined in part by feed rate R as indicated in Equation (5'). For a more detailed explanation of the "modified Taylor" equation (55a), reference may be had to *Machining With Carbides and Oxides* by F. W. Wilson, McGraw-Hill Book Co., New York, N.Y., 1962, pps. 74–75. Even though feed rate and spindle speed, and thus chipload $f$, may vary, the linear relationship expressed in Equation (55) may validly be assumed to be applicable from instant to instant without substantial inaccuracy.

4. Minimum Cost Machining

To seek a minimum cost for the production of each machined part, one may take the expression of Equation (49) and attempt to control the machine tool in a manner such that the total cost $C_P$ is minimized. The non-productive cost $C_{NP}$ is unaffected by the way in which the machine tool is controlled, and for purposes of this invention $C_{NP}$ may be treated as a fixed constant. But the way in which the machine tool is controlled will affect the frequency with which cutter changes are necessary, so the cutter cost per part (or per unit length - - - ) of machining $\Delta W/W\, C_T$ becomes important; but on the other hand, the cost $C_T$ of a tool change is unaffected by the way the machine tool is controlled, and may be viewed as a constant. The achievement of minimum cost of machining is not a simple or obvious thing, however, because of limitations inherent in the machine tool which is used in the basic process. Prior attempts have been characterized by enormous complexity or by a failure fully to satisfy the objective.

In arriving at the novel methods and apparatus which characterized the invention to be here disclosed and claimed, I have started with the classical approach of finding the relations which must exist to make the total cost $C_P$ a minimum. The tool change cost $C_T$ and the non-productive workpiece changing cost $C_{NP}$ are assumed to be fixed or at least beyond being changed due to the manner in which the machine tool is controlled during actual cutting periods. Starting with Equation (49):

$$C_P = C_M + \Delta W/W\, C_T + C_{NP} \tag{49}$$

and substituting from Equations (42) and (55), one obtains:

$$C_P = T_M (R_L + R_{OH}) + T_M/T\, C_T + C_{NP} \tag{56}$$

But, as shown above by Equation (53):

$$T_M = L/fVN \tag{57}$$

and from rewriting the modified Taylor Equation (55a):

$$T = K^{1/n}/V^{1/n} \cdot f^{q/n} \tag{58}$$

By substitution of (57) and (58) into (56):

$$C_P = [L(R_L + R_{OH})/N]\, V^{-1}f^{-1} + [LC_T/NK^{1/n}]\, V^{(1/n - 1)} f^{(q/n - 1)} + C_{NP} \tag{59}$$

The quantities in brackets and $C_{NP}$ are fixed by factors other than the manner in which the physical cutting function is carried out. For simplification, these quantities may be replaced by constants, viz:

$$M_0 = C_{NP} \tag{60}$$

$$M_1 = L(R_L + R_{OH})/N \tag{61}$$

$$M_2 = L \cdot C_T/NK^{1/n} \tag{62}$$

Thus, replacing the symbol $C_P$ by $C$ for simplification, Equation (59) may be rewritten:

$$C = M_0 + M_1\, V^{-1}f^{-1} + M_2 V^{(1/n - 1)} f^{(q/n - 1)} \tag{63}$$

To make cost per part $C$ a minimum, the variables $V$ and $f$ must take on values such that two partial derivatives equal zero, that is:

$$\sigma C/\sigma V = 0 \text{ and } \sigma C/\sigma f = 0 \tag{64 and 65}$$

These expressions become:

$$\sigma C/\sigma V = -M_1\, V^{-2}f^{-1} + (1/n - 1)\, M_2\, V^{(1/n - 2)} f^{(q/n-1)} = 0 \tag{66}$$

and $$\sigma C/\sigma f = -M_1\, V^{-1}f^{-2} + (q/n - 1)\, M_2\, V^{(1/n - 1)} f^{(q/n-2)} = 0 \tag{67}$$

Equations (66) and (67) yield the simultaneous expressions:

$$M_1 = (1/n - 1)\, M_2\, (Vf)^{q/n}\, V^{(1 - q/n)} \tag{68}$$

and $$M_1 = (q/n - 1)\, M_2\, (Vf)^{q/n}\, V^{(1 - q/n)} \tag{69}$$

To be valid and consistent, Equations (68) and (69) require either that $Vf = 0$ or that $V = 0$ in the general (and actual) case for which $q \neq 1$. Either result is useless in a practical sense because physical machining inevitably requires that $Vf$ and $V$ both be finite.

Thus, a straightforward mathematical (differential calculus) approach to minimize the cost per part leads to a blind alley of no physical significance.

A. Adjoining a Further Restraint

Since the values of the two variables V and f for making C (or $C_P$) a minimum cannot be found in any meaningful manner by setting the two partial derivatives equal to zero, we have attempted to circumvent that blind alley by imposing a single constraint upon the range of the values of V and f. This is consistent with practical realities, since any machine tool must be operated with certain restraints or boundaries, e.g., the power rating of the quill or spindle motor cannot be exceeded, and chipload f must not become so excessive as to catastrophically destroy cutter teeth, as noted above. More particularly, we have found that a constraint from a family of inequality constraints defined by Expression (1) can be adjoined to Equation (63) to arrive at a useful manner to control V and $f$ such that $C_P$ can be minimized. And the surprising result of my approach, viewed after its formulation, is that different ones of the same family of constraints may be utilized in accounting for the other limitations (discussed above) which are necessarily imposed by a given machine tool and the basic machining process.

Consider again the inequality expression (1):

$$AV^\beta f^\alpha \leq 1 \tag{1}$$

where A is a constant defined below; and $\alpha$ and $\beta$ are constants which may be selected.

That inequality family defines "borders" having different shapes, as shown in FIG. 4, depending upon the range of values for $\alpha$ and $\beta$, marking off areas of the V, R plane (on the unshaded sides of the "border lines") in which the inequality holds true. The value of A is that value which makes the inequality into an equality when V and $f$ take on values both falling on the "limit" or "border" line.

As noted above, the general case equality or Equation (3) has advantages and versatility in representing different constraint boundary lines when A, $\alpha$ and $\beta$ are given different values or relationships. For the moment, however, consider the general case represented by Expression (1) and the adjoining of that as a constraint term to Equation (63), thereby forming a new equation for a cost per part $C'$. Let:

$$C' = C_P + \text{the constraint} \tag{70}$$

$$C' = M_0 + M_1 V^{-1} f^{-1} + M_2 V^{(1/n-1)} f^{(1/n-1)} + \lambda(AV^\beta f^\alpha + S^2 - 1) \tag{71}$$

The symbol $\lambda$ is known as a Lagrange multiplier and the term S is a new variable, sometimes called a slack variable, which is introduced in order to convert the inequality of Expression (1) into an equality.

The necessary conditions to minimize the cost per part as subject to the constraint (and as now represented by $C'$) are that the variables V, $f$, $\lambda$, S take on values which make $C'$ a minimum, and this is defined by setting the four partial derivatives to zero — thereby obtaining four simultaneous equations, as shown:

$$\sigma C'/\sigma V = -M_1 V^{-2} f^{-1} + (1/n-1)M_2 V^{(1/n-2)} f^{(q/n-1)} + \beta \lambda A V^{\beta-1} f^\alpha = 0 \tag{72}$$

$$\sigma C'/\sigma f = -M_1 V^{-1} f^{-2} + (q/n-1)M_2 V^{(1/n-1)} f^{(q/n-2)} + \alpha \lambda A V^\beta f^{\alpha-1} = 0 \tag{73}$$

$$\sigma C'/\sigma \lambda = AV^\beta f^\alpha + S^2 - 1 = 0 \tag{74}$$

$$\sigma C'/\sigma S = 2S\lambda = 0 \tag{75}$$

Simultaneous solution of the last four equations yields:

$$S = 0 \tag{76}$$

$$\lambda = M_2 (1-q)/An(\alpha-\beta) \cdot V^{(1/n-1-\beta)} \cdot f^{(q/n-1-\alpha)} \tag{77}$$

$$AV^\beta f^\alpha = 1 \tag{78}$$

$$Vf^n = [n(\alpha-\beta) M_1/\{\alpha-\beta q + n(\beta-\alpha)\}M_2]^n \tag{79}$$

The slack variable S and the Lagrange multiplier $\lambda$ are of no interest, but Equations (78) and (79) define relationships of V and $f$ which must exist if a part is to be machined with the cost $C_P$ of Equation (59) held at a minimum. The constants n and q can be obtained from the published literature or determined experimentally by known techniques for any combination of cutter material, cutter blade shape, and workpiece material. The specific values of constants $\alpha$ and $\beta$ in Equation (78) relating to minimum cost could be determined experimentally, or usually selected intuitively by plotting the shapes of the lines (see FIG. 4) which Equation (3) represents with different values of $\alpha$ and $\beta$. As shown below, however, such specific values need not be actually determined.

To pursue for a moment the Equations (78) and (79) which apply (with specific values assigned to A, $\beta$ and $\alpha$) under conditions when machining is carried out with minimum cost per part, these may be further reduced to:

$$f_{opt} = 1/A^{(\beta q - \alpha)} [n(\alpha-\beta) M_1/M_2\{\alpha - \beta q + n(\beta - \alpha)\}]^{n\beta/\beta q - \alpha} \tag{80}$$

and $$V_{opt} = A(q/\alpha - \beta q)[M_1 n(\alpha-\beta)/M_2\{\alpha - \beta q + n(\beta - \alpha)\}]^{n\alpha/\alpha - \beta q} \tag{81}$$

If $f$ and V are maintained constant at the optimum values $f_{opt}$ and $V_{opt}$, and if A, $\alpha$ and $\beta$ values are properly chosen, then Equations (80) and (81) define the conditions under which a series of parts could be machined at minimum cost, although these conditions by themselves may call for violation of the machine tool or part quality limits discussed earlier.

There is, however, hidden in Equations (78) and (79) a very significant result. The quantity in the brackets of Equations (79) is proportional to the reciprocal of the optimal tool life T which appears in the modified Taylor Equation (55a). This is evident from the fact that Equation (55a) may be rearranged:

$$Vf^n = K[1/T]^n \tag{55a'}$$

This will be put to good use, as explained hereinafter, since the result of achieving minimum cost of machining parts by use of the modified Taylor equation subject to a single inequality restraint can be effected by numerically specifying a cutter life T and applying an equality restraint, as represented by the simultaneous solution of Equations (78) and (79).

5. Instantaneous Control

It has been assumed in the foregoing, merely for ease of discussion, that a plurality of discrete parts were to be machined with minimum cost for each part; and with each part being machined with a uniform cutter volocity V and feed per tooth $f$ after the optimum values of the latter had been determined. These controlled variables may be affected, however, by variations in the hardness of the workpiece or sharpness of the cutter, as well as changes in the depth or width of the cut as the tool makes a complete pass across the workpiece. This problem is the primary reason for seeking to adaptively control the machine tool, and such unforeseen or unforeseeable variations are readily overcome by considering the cost (above called $C_P$ or simply C or $C'$) on a small per unit basis. In other words, while machining is in progress, the relations discussed above may be considered during successive short time intervals ΔT during which the cutter is fed through the work increments ΔL, and as these approach extremely small values, the values of V and f may be considered as tending to vary instantaneously with time due to changes in workpiece hardness, cutter sharpness width and depth of cut and other such factors. The analysis and derivation given above is fully applicable on an instantaneous or "per unit length" basis, wherein the operation of the machine tool is viewed as a continuous process, and the instantaneous cost per unit distance of machining is minimized. To minimize the instantaneous cost from instant to instant — but subject to other machine tool or part quality limitations, is the objective sought and the advantage realized by the present invention.

6. Utilization of Minimum Cost Relations Subject to One or More Constraints

The variables in Equations (78) and (79) are simply V and f. They may, of course, be changed to V and R, so that these expressions are susceptible of representation in the V, R plane as defining two lines which intersect at a point of minimum cost (here called optimum machining), where one of these lines is the boudnary represented by Equation (78) of some inequality restraint on the machining process.

It is to be recognized that the right side of Equation (79) is a constant, since the symbols therein all represent constnts, even though the values of α and β have not yet been shown to be precisely known or determined. Designating that composite constants, as $K_1$, one obtains the simple expression:

$$V f^q = K_1 \qquad (79')$$

Figure 22:
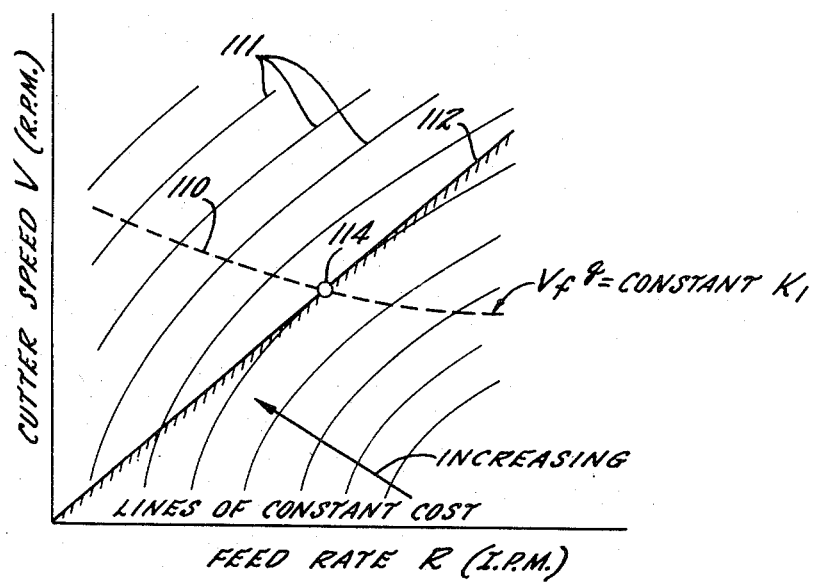
FIG. 22 is a graphical illustration of the location of a point of optimum economic operation in the V, R plane where one inequality constraint is associated with an economic function as contemplated by the present invention.

This equation may be plotted as one of a subfamily of curves in the V, R plane which are of generally negative slope, as represented by the dashed line 110 in FIG. 22, the exact shape and location of any one line in the subfamily being dependent upon the specific applicable values for the constants $q$ and $K_1$. A specific line of the family represented by 110 will be established when all of the constants in Equation (79) have been assigned numerical values so that the composite constant $K_1$ in Equation (79') has a definite numerical value. To have optimum cost conditions, therefore, the avscissa and ordinate operating values of V and R should define a point on this line. It may be noted incidentally that line 110, even though its exact shape and location are not known, falls in the same subfamily as the line 79 in FIG. 4 and the power restraint boundary in FIG. 18. The line 110 can thus be viewed as represented by the general case Equation (3) when α and β are within value ranges such that α ≥ 0 and β > α. It may be noted also with reference to FIG. 22 that lines of constant cost 111 may be drawn in the V, R plane, with those of greater constant cost being spaced progressively toward the upper left.

Further, it may be recognized that Equation (78) defines any one of several possible constraint boundaries —such as those discussed above with reference to FIGS. 5, 7, 12 and 16 — depending upon the values assigned to A, β and α. If the entire machining process were subject to only a single constraint limitation, represented by Equation (78), then the point of optimum machining would lie at the intersection of that constraint boundary and the particular line 110 represented by Equation (79') when α and β in Equation (79) are given those values which are applicable to the equation for the single constraint. As shown in FIG. 22, it is assumed merely by way of example that a single inequality constraint is bounded by a straight line 112 of positive slope (this being similar to the constraint boundary for maximum chipload shown as line 85 in FIG. 5). The operating point 114 for values of V and R to produce optimized machining conditions, but without exceeding the limit represented by line 112, lies at the intersection of lines 110 and 112. The point 114 lies on the line 110 which is furthest to the right, and thus at the location of lowest cost, but without violating the constraint boundary 112. That is, the line 110, and Equation (79) from which it comes, represent the locus of points where individual constraint boundaries, such as represented by line 112 in FIG. 5, are tangent to lines of constant cost. Ordinarily, the point 114 could be established by solution of the simultaneous Equations (78) and (79), although such an approach is rather complex. A simpler procedure has been discovered and will hereinafter be explained.

Figure 23:
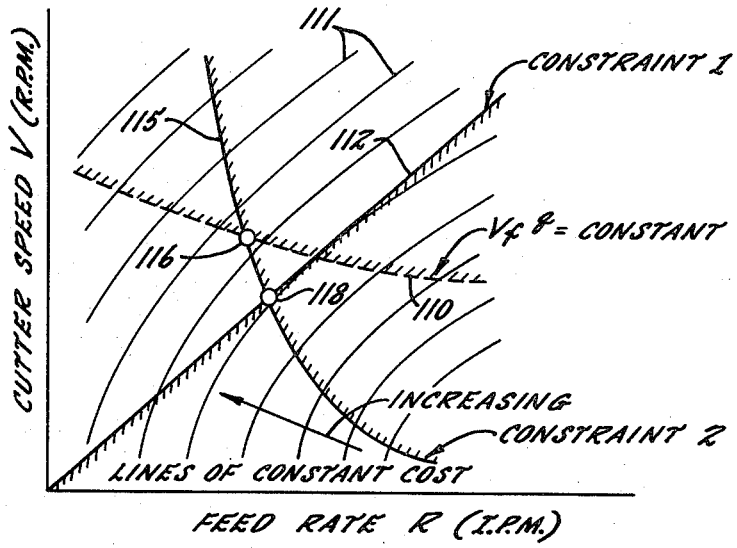
FIG. 23 is similar to FIG. 22 but illustrates a point of optimum economic operation arrived at by consideration of two constraint boundaries and the optimum economic relationship.

On the other hand, if the machining process is subject to two or more inequality constraints, then the best possible economic operating point (i.e., combination of V and R values) may be located according to either of two possibilities, as illustrated in FIG. 23. The latter Figure is similar to FIG. 22 except it includes a second constraint boudnary line 115 (similar in shape to the power limitation boundary 98 shown in FIG. 18). The operating point of V, R values for optimum machining (least cost) may now be either:

a. at a point 116 on one of the constraint lines at the intersection with the line 110 represented by Equation (79'), when $K_1$ is determined by utilizing those values of α and β which are applicable to the intersected constraint boundary line; or b. at a point 118 which is the intersection of two constraint boundary lines, when such intersection lies further toward the direction of reduced cost, that is, downwardly and/or to the right of the point 116 as shown in FIG. 22.

We have discovered that a machining control system can be made to approach and operate at an economically optimized point in the V, R plane by methods and apparatus which do not require continuous simultaneous solution of Equations (78) and (79) as such, but on the contrary, where the line represented by:

$$V f^q = K_1 \qquad (79')$$

is treated simply as the boundary for another equality constraint which has the form:

$$V f^q < K_1 \qquad (79'')$$

Accordingly, the control system need function only to establish values of V and R which lie at an intersection of several constraint boundaries, one of those boundaries being based upon, and easily determinable from, economic considerations and factors, e.g., most economical tool life or minimum production time.

Very importantly, we have discovered and confirmed that when the boudnary line 110 defined by Equation (79') is used to mark off the inequality constraint defined by Expression (79''), the intersecton of that boundary line with any other constraint boundary will essentially always involve a constraint boundary which appears as a line of generally positive slope in the V,R plane. This is fortunate because attempts to find operating points at intersections of the line 110 with constraint boundaries of generally negative slope would in a mathematical sense be unrealizable, calling for solutions in which speed V would approach zero and chipload $f$ would approach infinity. Since all operational constraints (e.g., hereinbefore discussed with reference to FIGS. 5, 7, 12 and 16) of this positive slope nature are representable by the general case Equation (3) when $\beta/\alpha \ll 1$, then it is a simple matter to compute a specific numerical value for the constant $K_1$. It will be recalled from Equations (79) and (79') that:

$$K_1 = [M_1 (\alpha - \beta) n / M_2 \alpha - \beta q + n (\beta - \alpha)]^n \quad (82)$$

But if $\beta/\alpha \ll 1$ approaches zero, and both numerator and denominator of Equation (82) are divided by $\alpha$, that equation reduces to:

$$K_1 = [M_1 n / M_2 (1 - n)]^n \quad (83)$$

As noted from Equations (61) and (62), the values of the composite constants $M_1$ and $M_2$ are numerically ascertainable, i.e.:

$$M_1 = L (R_L + R_{OH})/N \quad (61)$$

$$M_2 = L \cdot C_T / N K \, 1/n \quad (62)$$

It will be seen later that the length L need not be numerically designated since it cancels out in computations for a numerical value of $K_1$, so that "per unit length" economic considerations are effected. The wage rates $R_L$ and $R_{OH}$ as well as the cutter or tool cost $C_T$ are known or readily established, and the number N of cutter teeth is known for any given machining job to be performed. Likewise, the modified Taylor equation constants K, $n$ and $q$ are known for the cutter and workpiece to be used in any machining job, or at least they can be numerically found by straightforward and well known procedures. Thus, an actual numerical value for the constant $K_1$ may be ascertained (as hereinafter described) and it is not necessary to experimentally determine some odd and precise values of $\alpha$ and $\beta$ to be used in Equation (79) or Equation (82). On the contrary, Equation (83) will serve with excellent accuracy and it requires no specific values for $\alpha$ and $\beta$.

7. Methods and Apparatus for Adaptive Economic Optimization

As noted earlier herein, it is not sufficient to control a machine tool in a manner to make the feed rate as high as physically possible in an attempt to minimize production cost or time. There are limits which must be recognized and respected (a) to safeguard the machine tool itself, and (b) to preserve workpiece quality at an acceptable standard. Moreover, the cost for producing parts may be less than optimum if the operating values of V and R cause cutter wear in such a way that an undue proportion of productive effort is devoted to changing cutters and regrinding blades or purchasing new ones.

In accordance with the present invention, these considerations are taken into account, and economically optimized machining is realized by relatively simple methods and apparatus which treat economic factors as a constraint along with other machine and workpiece quality constraints. More particularly, the machine tool is operated normally always to change the feed rate R in a sense to speed up the machining process, but when any of several constraint boundaries is violated, the value of V or R (or both) is changed in a sense to eliminate the violation and to move the operating point in the V, R plane to a location of greatest machining speed which does not violate any of a plurality of constraint boundaries, including one based upon optimized economic factors. As details of exemplary embodiments of methods and apparatus are hereinafter described with reference to digital methods and apparatus, it will become apparent to those skilled in the art that equivalent analog methods and apparatus may also be employed.

Figure 24:
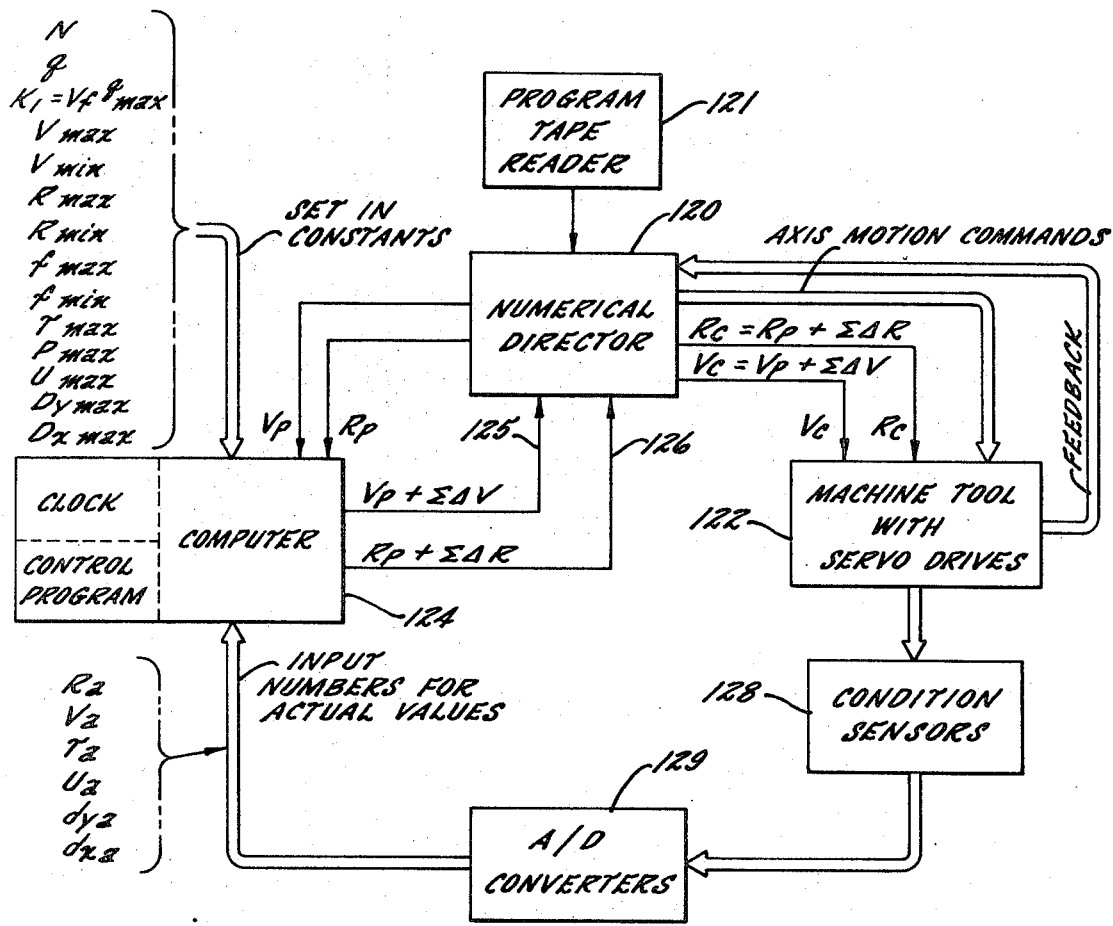
FIG. 24 is a block diagram illustration of a machine tool control system embodying the features of the invention and capable of carrying out the method here to be described.

Referring now to FIG. 24, a numerical control director 120 is shown connected to receive successive blocks of input data from a program tape reader 121, each block (or a succession of blocks) resulting in storage of programmed values $V_p$ and $R_p$ for spindle speed and feed rate intended to be in effect while a machine tool 122 is operating upon a workpiece. These latter programmed signals, which may change from time to time, are not supplied directly to the machine tool, however, but are transmitted from the director 120 to a computer 124 for processing and modification as hereinafter described. The director 120 receives modified control signals via lines 125 and 126 and transmits them (with or without conversion to analog form, as may be required) as the actually commanded speed and feed value signals $V_c$ and $R_c$ to the speed and feed servos of the machine tool. In the absence of the present invention, the signals $V_c$ and $R_c$ would come directly from the director as representing the values selected by the programming technicians and which may depart widely from the values required for optimized machining.

In carrying out the present invention, a plurality of variables are sensed at the machine tool 122 while machining is in progress with the cutter operatively acting upon a workpiece. This is accomplished by condition sensors collectively represented at 128 and which, in the exemplary embodiment here to be treated, include means for sensing and signaling the dynamically changeable actual values of feed rate $R_a$, spindle speed $V_a$, spindle torque $T_a$, cutter vibration $U_a$, and the two deflection components $d_{ya}$ and $d_{xa}$. If the sensors provide output signals in analog form, such signals may be passed through analog-to-digital converters collectively represented at 129 and which in turn supply the actual value signals for the several variables to the input of the computer 124.

Figure 27:
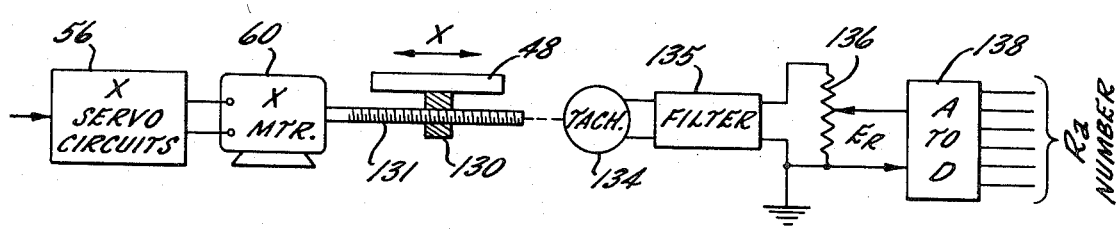
FIGS. 27 and 28 are simplified, diagrammatic illustrations of exemplary apparatus for measuring and signaling the instantaneous values of feed rate and spindle speed during operation of the controlled machine tool.

The condition sensors may take any of a wide variety of alternative forms known to those skilled in the art. Suitable examples are illustrated in simplified form by FIGS. 27 and 32. Referring first to FIG. 27, the machine tool table 48 movable along an X axis is shown associated with a nut 130 engaged with a lead screw 131 driven by the X axis servo motor 60 whose input is supplied by the X axis servo circuits 56. In order to signal the actual value of the table velocity, i.e., feed rate R, a tachometer 134 is mechanically coupled to the lead screw 131 to supply a dc. output voltage which is directly proportional to the lead screw velocity. The output of the tachometer may be passed through a smoothing filter 135 to remove noise spikes, and thence through a potentiometer 136 (to permit adjustment of the scale factor or constant of proportionality, and resulting voltage $E_R$ may then be fed to any suitable dc. voltage-to-digital converter 138 having a plurality of output terminals upon which a number is signaled in plural bit binary or binary coded notation. The output of the converter 138 is therefore a dynamically changeable digitally signaled $R_a$ number which represents the actual value of the feed rate R at which the table 48 (and any workpiece thereon) are being fed relative to the rotating cutter of the machine tool.

Figure 28:
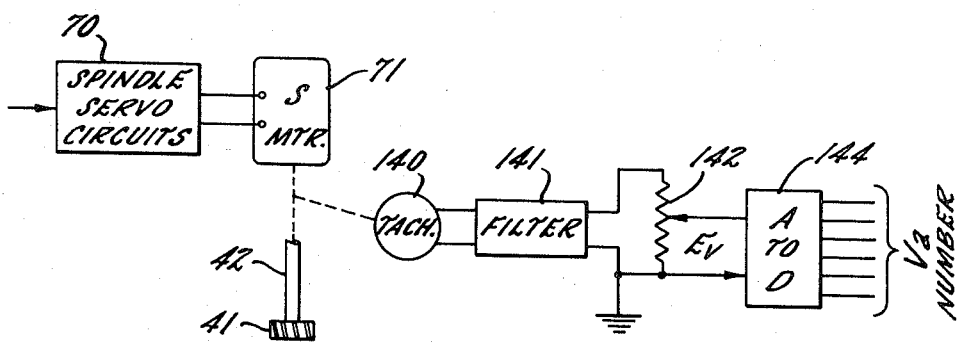

FIG. 28 shows a similar, simple arrangement for dynamically signaling in binary or coded binary decimal notation the value of the actual spindle speed in a machine tool. As there shown, the spindle 42 carrying a cutter 41 is mechanically coupled to be driven by a motor 71 which is controlled in its speed by spindle servo circuits 70 according to an analog command voltage supplied thereto. A linear dc. tachometer 140 may be mechanically driven from the spindle and its output passed through a smoothing filter 141 and a potentiometer 142 to produce a dc. voltage $E_V$ which is instantaneously proportional to actual spindle speed V. The latter voltage is then supplied to an analog-to-digital converter 144 having a plurality of output terminals upon which appear the plural bit signals which digitally represent a number equal to the actual speed $V_a$ of the spindle 42.

Figure 29:
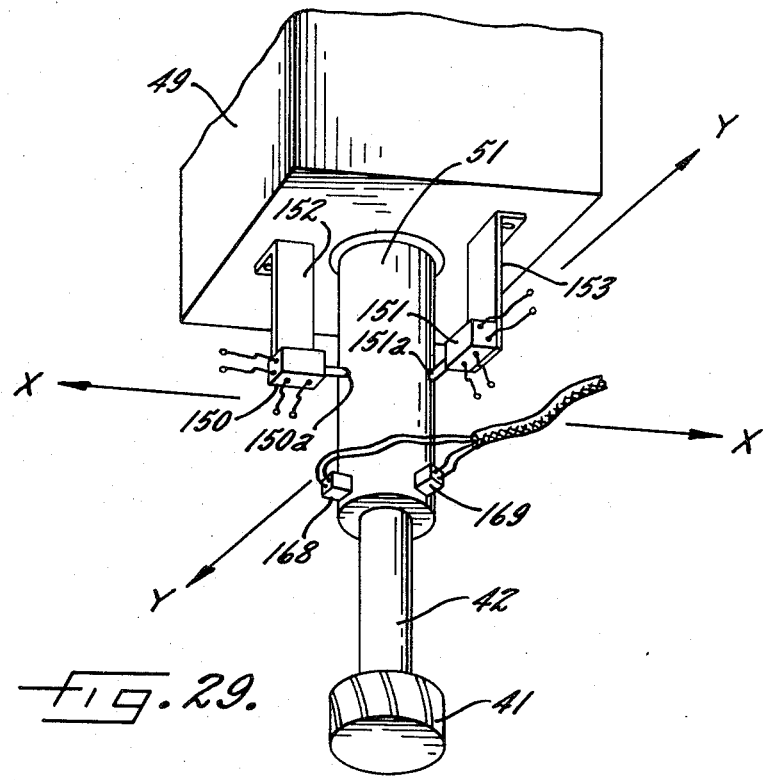
FIG. 29 is a fragmentary structural view illustrating physical components employed in continuously measuring deflections and vibrations of the machine tool spindle during operation.

The pickup transducers for the signaling of spindle deflections and vibrations are diagrammatically illustrated in FIG. 29. To measure the deflections $d_x$ and $d_y$, two linear variable differential transformers 150 and 151 are carried at the ends of rigid mounting brackets 152, 153 which project downwardly from the underside of the machine headstock 49. These differential transformers respectively have sensing plungers 150a and 151a which are axially displaceable in directions parallel to the Y and X axes, and the plungers are axially biased into engagement with the quill 51. As the spindle 42 and quill 51 deflect along the X or Y axis, therefore, the plungers 150a and 151a will be correspondingly shifted axially so as to move the differential transformer cores by corresponding amounts.

Figure 30:
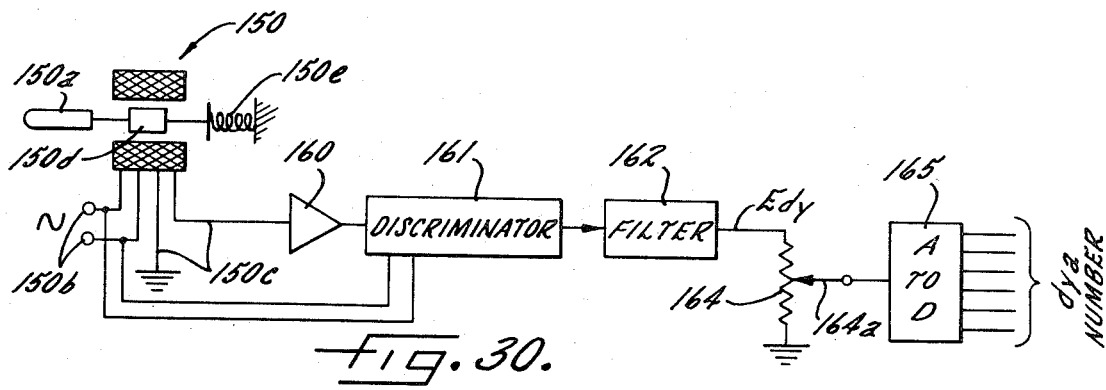
FIGS. 30, 31 and 32 are simplified block diagram representations of suitable apparatus for respectively measuring and signaling deflection, vibration, and torque during operation of the machine tool.

As shown in FIG. 30, the differential transformer 150 for sensing the variable deflection $d_y$ includes input terminals 150b and output terminals 150c respectively connected to primary and secondary windings surrounding a core 150d axially biased by a compression spring 150e. As the plunger 150a is displaced from a neutral position, the ac. signal induced in the secondary winding and appearing at the output terminals 150c proportionally changes in amplitude. This signal is passed through a suitable amplifier 160 and thence to a discriminator 161 and a filter 162 whose output is a dc. voltage $E_{dy}$ proportional in magnitude to the instantaneous displacement of the core 150a. The latter voltage is applied to a potentiometer 164 whose wiper 164a may by adjusted to determine the scale factor of proportionality and which thus supplies an input signal to an analog-to-digital converter 165. The latter may take a variety of forms but it is here shown as having a plurality of output terminals upon which the individual bits of a binary or binary coded decimal notation of the number $d_{ya}$ appears. The number signaled at the output of the converter 165 is directly acceptable by the computer 124 shown in FIG. 24.

Referring again to FIG. 29, the transducers for measuring actual values of the vibration variable are shown as two piezo-electric accelerometers 168 and 169 fixed to the lower end of the quill 51 at points separated by 90° on the quill periphery. Two such accelerometers are employed because the quill may vibrate in any direction parallel to the plane defined by the X, Y axes of the machine tool; and by sensing two orthogonal vibration vector components separated by 90° and combining them vectorially, the resultant amplitude of vibration in any direction may be signaled.

Figure 31:
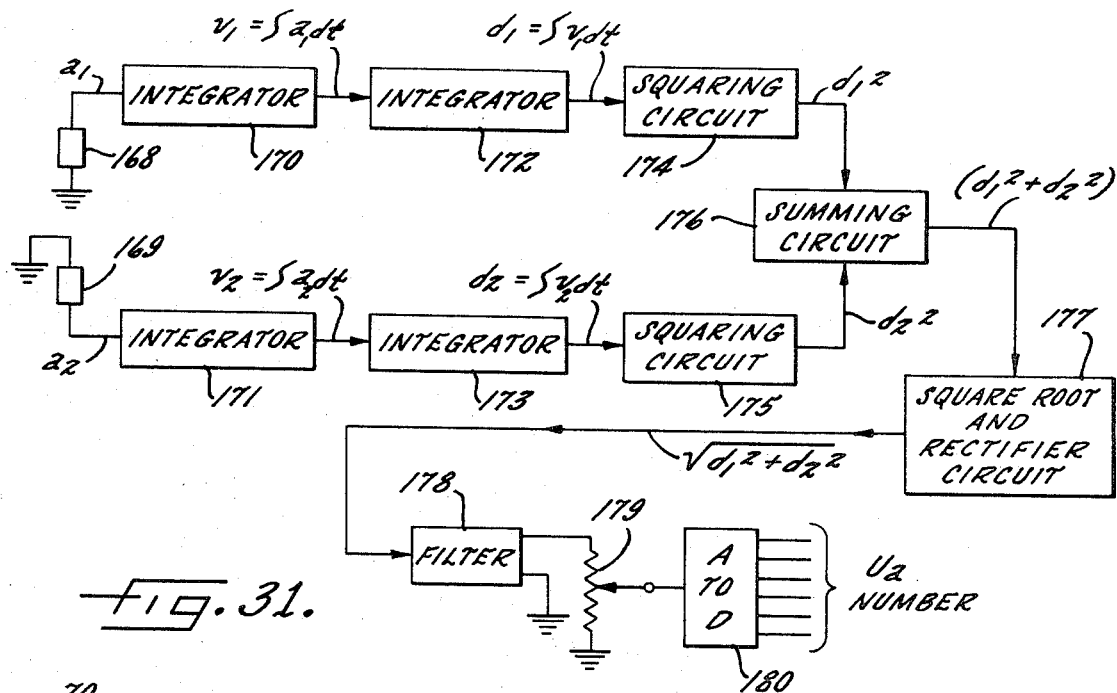

The circuitry associated with the two accelerometers is diagrammatically shown in FIG. 31. Assuming that vibration is sinusoidal and that each of the accelerometers produces an output voltage instantaneously proportional to the acceleration which it senses along a line passing through it and intersecting at right angles with the spindle axis, the time integral of such output voltage is proportional to the velocity experienced by that accelerometer. Accordingly, voltages $a_1$ and $a_2$ instantaneously proportional to acceleration experienced by the devices 168 and 169 are fed to integrators 170, 171 which produce second output voltages $v_1$ and $v_2$, the latter being instantaneously proportional to the velocity of those devices. These velocity-representing voltages $v_1$ and $v_2$ are passed through respective integrators 172, 173 which in turn produce output voltages $d_1$ and $d_2$ respectively proportional to the time integral of the instantaneous velocities and therefore instantaneously proportional to the axial displacements experienced by the devices 168 and 169. All the voltages are generally sinusoidal in waveform since the vibration is harmonic in nature. The voltages $d_1$ and $d_2$ are thence passed through respective squaring circuits 174, 175 which produce output voltages $d_1^2$ and $d_2^2$ for the purpose of accomplishing a vector summation. These latter voltages are applied to the inputs of a summing circuit 176 whose output thus represents the sum of the squared voltages, i.e., $d_1^2 + d_2^2$. This latter signal is passed through a square root and peak rectifier circuit 177 to derive a voltage proportional to the square root of the aforesaid sum. This will be recognized as a signal which is proportional to the amplitude of the vector sum of the two component displacements experienced by the two accelerometers 168 and 169. Thus, the output of the square root circuit 177 is a dc. voltage which is proportional to the actual vibration U being experienced by the lower end of the quill 51 shown in FIG. 29. This latter voltage is passed through a smoothing filter 178 and scale factor adjustment potentiometer 179 to an analog-to-digital converter 180 similar to the converters 138, 144, 165 described above. The output terminals of the converter 180 therefore carry bit signals which digitally represent a vibration number $U_a$ which in value is proportional to the actual vibration amplitude being experienced by the machine tool quill and cutter.

Figure 32:
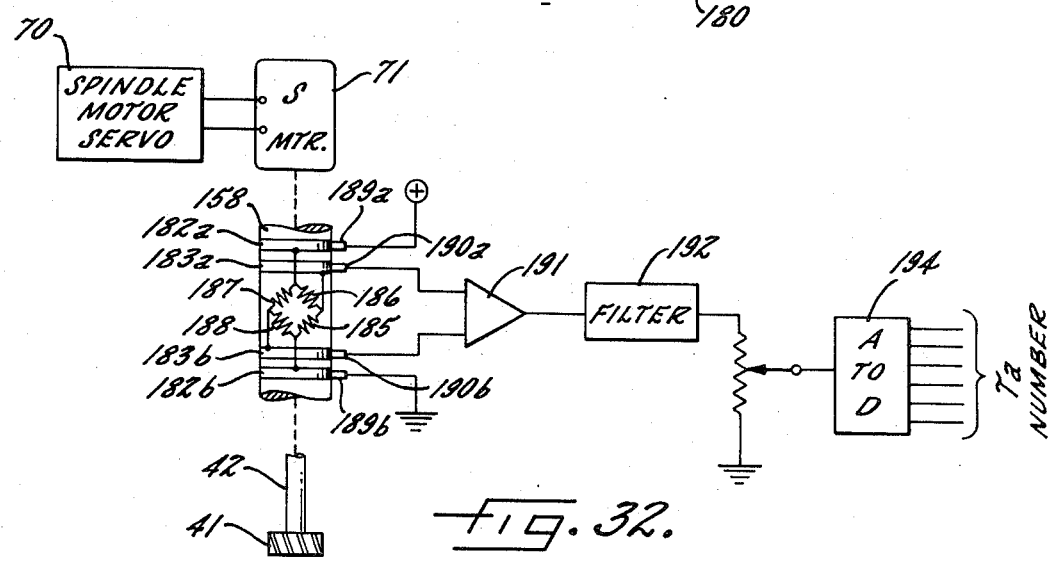

Finally, in order to sense and signal the actual value of spindle torque during operation of the machine tool, an arrangement such as that diagrammatically shown in FIG. 32 may be employed. As there shown, the lower portion of the spindle 42 which projects below the quill 51 is fitted with two pairs of slip rings 182a, b and 183a, b. Fixed to the spindle surface by suitable adhesive are four resistive or semi-conductor strain gages 185, 186, 187, 188. These strain gages are arranged such that their resistance increases or decreases as the spindle experiences increases or decreases in angular strain due to exerted torque. The bridge circuit receives an energizing voltage from a suitable dc. source through two brushes 189a, 189b riding in contact with the slip rings 182a, b. The output terminals of the bridge circuit are connected to the slip rings 183a, b via brushes 190a, b riding thereon. The output voltage from the bridge circuit appearing between these latter brushes is therefore directly proportional to spindle strain and thus spindle torque. That voltage is passed through a suitable amplifier 191, a filter 192 and a scaling potentiometer 193 to an analog-to-digital converter 194 whose output signals thus continuously signal in digital form a number $T_a$ representing the actual value of torque being exerted by the spindle.

Further in keeping with the present invention, the limit values of a plurality of operating parameters are signaled, these values defining the boundaries of permissible operating regions in the V, R plane for the respective parameters involved. As stated above, one of these limit values represents a restraint boundary 110 (FIG. 23) beyond which the economic performance of the machining operation is unacceptably degraded, e.g., that one boundary is defined by the constant $K_1$ discussed above and which is equal to the maximum permissible value for the composite operating parameter $Vf^q$. That is $Vf^q_{max} = K_1$.

To signal such limit values which are numerically determined and known in advance, they are simply fed into and stored within registers or the like in the computer 124 (FIG. 24), so that they may be called out and utilized in different computations or comparisons. The registers thus become a means for signaling such limit values.

On the other hand, the actual values of several machine tool operating parameters are dynamically signaled while the cutter in the machine tool is operatively acting on the workpiece. This is accomplished by and within the computer itself according to a control program (to be described) which has been supplied thereto. More particularly, a first group of such operating parameters is constituted by the sensed and signaled operating variables themselves, and thus the changing values of parameters $R_a$, $V_a$, $T_a$, $U_a$, $d_{ya}$ and $d_{xa}$ supplied as inputs to the computer are signaled by the computer storage registers may be used directly as parameter values. By using the sensed variable inputs, however, the computer can also rapidly and repeatedly compute and signal the actual values of a power parameter $P_a$, a chipload parameter $f_a$ and an economic parameter $Vf^q_a$. These latter parameter values are readily yielded by the following computer-performed computations:

$$P_a = V_a \cdot T_a \tag{84}$$

$$f_a = R_a / N V_a \tag{85}$$

$$Vf^q_a = V_a \cdot (f_a)^q \tag{86}$$

The values of N and q in the foregoing equations are numerically known, and they are supplied to the computer (FIG. 24) with those constants originally set in, as explained above. Storage registers in the computer, which are periodically updated as $P_a$, $f_a$ and $Vf^q_a$ change, serve as a means for signaling these actual values of computed parameters.

The corresponding actual and limit values for each of the several parameters involved are compared on a continuous basis, or on such a rapidly repeating basis as to be an essentially continuous basis, so as to determine and signal when any one of the limits or constraint boundaries is exceeded by the corresponding actual value. The computer 124 (FIG. 24) contains means (such as its CPU) which can readily perform this function according to the control program hereinafter explained. It will be sufficient to note here that:

$Vf^q_a$ is compared with $K_1$, that is with $Vf^q_{max}$;
$V_a$ is compared with $V_{min}$;
$V_a$ is compared with $V_{max}$;
$R_a$ is compared with $R_{min}$;
$R_a$ is compared with $R_{max}$;
$f_a$ is compared with $f_{max}$;
$f_a$ is compared with $f_{min}$;
$T_a$ is compared with $T_{max}$;
$P_a$ is compared with $P_{max}$;
$U_a$ is compared with $U_{max}$;
$d_{ya}$ is compared with $d_{y\,max}$; and
$d_{xa}$ is compared with $d_{x\,max}$.

All of the limiting values in the foregoing list are initially set into the computer as numerical constants, and all of the actual values shown above for the several parameters are either present in the computer 124 by direct signaling from the condition sensors or as a result of computations performed by and stored within the computer utilizing the signaled input actual values of the operating variables. If the foregoing comparisons indicate that any actual value exceeds the corresponding limit or maximum value, the computer creates and stores a signal indicative of that fact, as treated more fully below.

The apparatus shown in FIG. 24, and the method carried out thereby, acts on a more or less continuous basis to change the values of $V_c$ and $R_c$ supplied as commands to the machine tool servos in a direction such that machining cost (or time) is reduced, and until one or more of the several constraints is violated. When any violation is detected, then the value of $V_c$ or $R_c$, or both, is changed in a sense tending to remove the violation. Because one of the constraints is based upon minimum machining cost (or time), the machine tool is adaptively adjusted automatically for minimum cost or time operation, but subject to the machine or part quality limitations which may, and must, under some circumstances exert a predominate influence.

Figure 33:
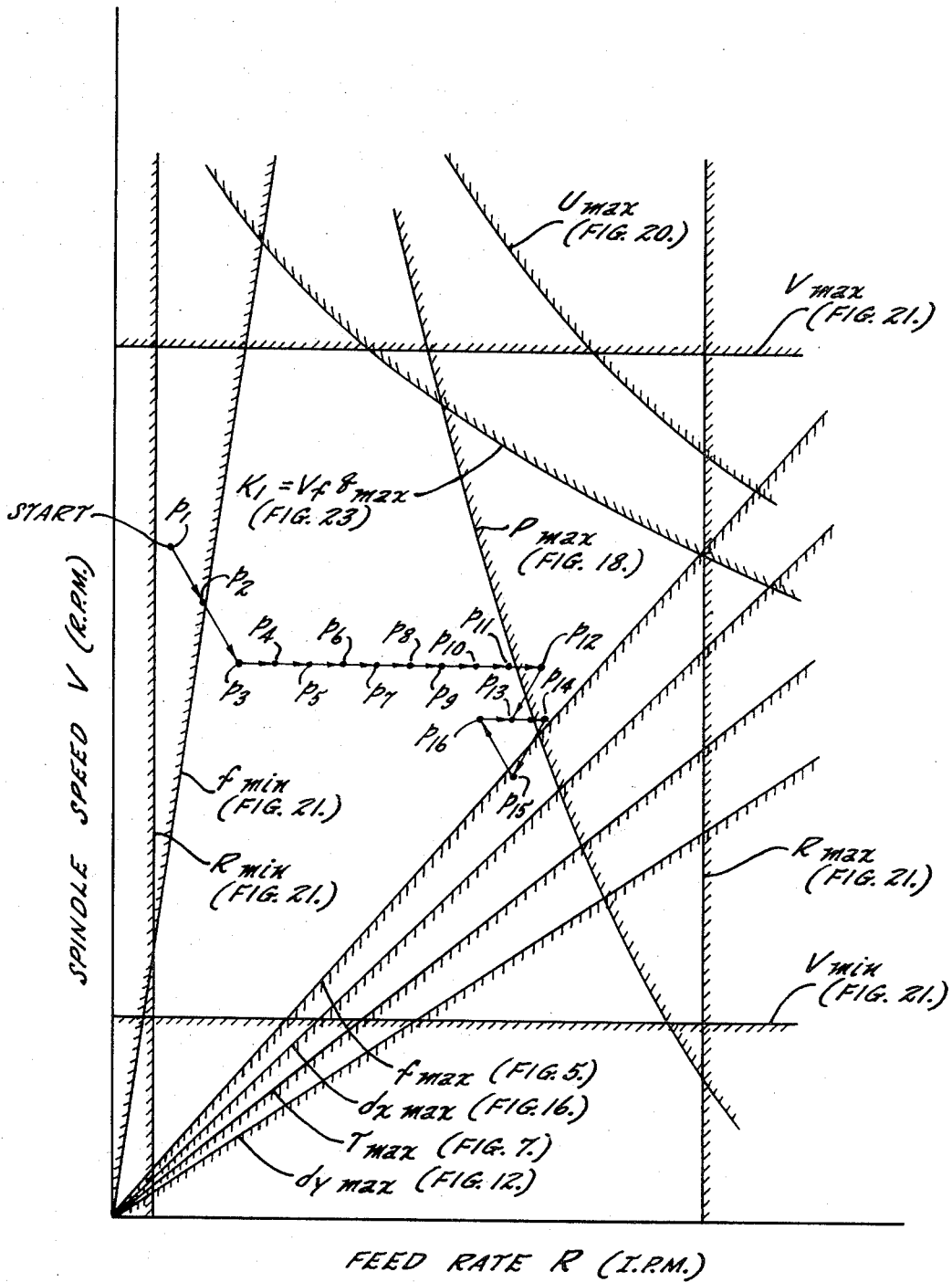
FIG. 33 is a graphical representation of eleven constraint boundaries in the V, R plane and the manner in which the method and apparatus here disclosed functions to arrive at an optimum operating point as conditions at the machine tool change.

To bring this about, we have recognized that the several constraints discussed above may be grouped into three classes, two of which are determined by virtue of similarity as to the boundary lines of the constraints in the V, R plane. FIG. 33 shows all of the constraint boundaries heretofore discussed, and indicates as to each (a) the drawing figure in which that boundary line is herein previously shown, and (b) the parameter to which it applies. These several constraint boundaries can be classified as follows:

Class I: Boundary lines of positive and substantially constant slope, for which in the general case Equation (3), given above, the exponential constants are within ranges such that $\beta << \alpha$, or $\beta \cong 0$ and $\alpha \cong 1$. These lines are exemplified by the maximum chipload boundary and include the constraint boundaries for maximum chipload $f_{max}$, maximum torque $T_{max}$, maximum Y deflection $d_{y\ max}$, and maximum X deflection $d_{x\ max}$.

Class II: Boundary lines of negative or infinite slope, and for which in the general case Equation (3) the exponential constants $\alpha$ and $\beta$ fall within value ranges such that $\alpha > 0$ and $\beta \geq \alpha$. These lines are exemplified by the maximum power boundary and include the boundaries for $P_{max}$, $U_{max}$, $Vf^a_{max}$ and $R_{max}$.

Class III: Boundary lines which do not fall within either Class I or Class II, or which logically are to be excluded from Class I or Class II. These Class III constraints are those which are defined by either (a) minimum limits or (b) upper limits with boundaries of zero slope, and include the boundaries for $f_{min}$, $V_{min}$, $V_{max}$ and $R_{min}$. As will be noted below, the constraint boundary $R_{min}$ can be ignored by virtue of the control method here employed.

Each boundary in FIG. 33 marks off an area which might be called a "permissible region" of operating points which may be established by particular combinations of the speed V and feed rate R in the V, R plane with respect to its constrained parameter. But the central area shown in FIG. 33 as surrounded essentially by the $f_{max}$, $P_{max}$, $Vf^a_{max}$, $V_{max}$ and $f_{min}$ lines, is not to be construed as a single operating region, since the torque $T_a$, for example, may be very high or low at given values of V and R, depending upon the hardness of the workpiece or the sharpness of the cutter blades, and these latter factors may vary from instant to instant. FIG. 33 has been drawn, however, to illustrate by "stop motion" one example of the locations of the constraint boundary lines for a particular machining job to be performed with a particular cutter on a particular machine tool and with a particular workpiece of a given hardness. The locations and shapes of the lines are specifically determined by the applicable numerical values of the several operating parameter limits. But if the machining job is to be performed on a different machine tool with a different kind of cutter acting on a workpiece of a different material, then the limit values will be somewhat different, and the relative shapes and locations of the constraint boundary lines will be changed. FIG. 33, therefore, may be viewed as a specific example of the general case which it represents. And, to obtain a control method and apparatus which will be effective in all specific cases, it is preferable to take into account all of the limits so that any one can exert a controlling influence as conditions change.

The classification given above leads to a significant advantage in that all of the constraints falling within Class I, or all of the constraints falling within Class II, may be treated together so that the violation of any one constraint within a given group is caused to produce the same corrective response. More particularly, we have established that when any Class I constraint boundary is violated, the corrective action should involve (a) increasing the speed V and (b) decreasing the rate R. If this is done, the actual operating point in the V, R plane will be returned to the region above a positive slope boundary line in the most direct and expeditious fashion.

When any Class II constraint boundary is violated, the corrective action should involve (a) decreasing the speed V, and (b) decreasing the feed rate R. This will return the operating point to the permissible region in the fastest and most direct way. It may be noted that the $R_{max}$ boundary line in FIG. 33 has an infinite slope, and is representable by the general case equation when $\beta = \alpha$. This line therefore represents a constraint falling within Class II. Decreasing the speed V when this boundary is violated does not increase the rate of metal removal from the workpiece, but it does result in reducing the rate of cutter wear and thus the machining cost, bearing in mind the nature of the lines of constant cost as shown in FIGS. 22 and 23. Hence, the corrective action when the $R_{max}$ boundary is violated is properly a reduction in both speed V and rate R. On the other hand, the $R_{min}$ boundary line in FIG. 33 is logically excluded from Class II (even though for this line $\alpha = \beta$) because corrective action when that line is violated requires an increase in the feed rate R. As it turns out, the $R_{min}$ constraint boundary need not even be considered according to the method and apparatus which will be described more fully below.

As to the exceptional or unusual constraints which fall within Class III, the corrective action in response to any violation is unique and logically deduced for each. Thus, if the $f_{min}$ boundary line is violated, speed V should be decreased and rate R increased. If the $V_{max}$ or $V_{min}$ boundary is violated, the speed V should be respectively decreased or increased, but the rate R can be increased so as to speed up the machining operation unless some other constraint violation requires a decrease in the rate R.

In summary, we have devised a control method which is based upon the following procedural rules:

1. If a Class I constraint is violated, speed V is increased and rate R is decreased.

2. If a Class II constraint is violated, speed V and rate R are both decreased.

3. If a Class III constraint is violated the speed V and/or rate R are changed as appropriate to the boundary in question, with corrective action for the $f_{min}$ boundary violation being given precedence over all others.

4. If more than one constraint is violated simultaneously:
   a. The corrective action is the same as if only one constraint were violated, providing all violated constraints call for the same responsive correction.
   b. If the plurality of violated constraints individually require contradictory changes in speed V, the latter is not changed at all. If the plurality of violated constraints call for contradictory changes in the rate R, the latter will be increased, but in the example here given this can occur only when the $f_{min}$ boundary is violated, since violation of any other boundary causes the rate R to be decreased.

5. In the absence of any constraint violation, the rate R will be increased, thereby shifting the operating point for the system to a location in the V, R plane which provides increased rate of metal removal.

Figure 34:
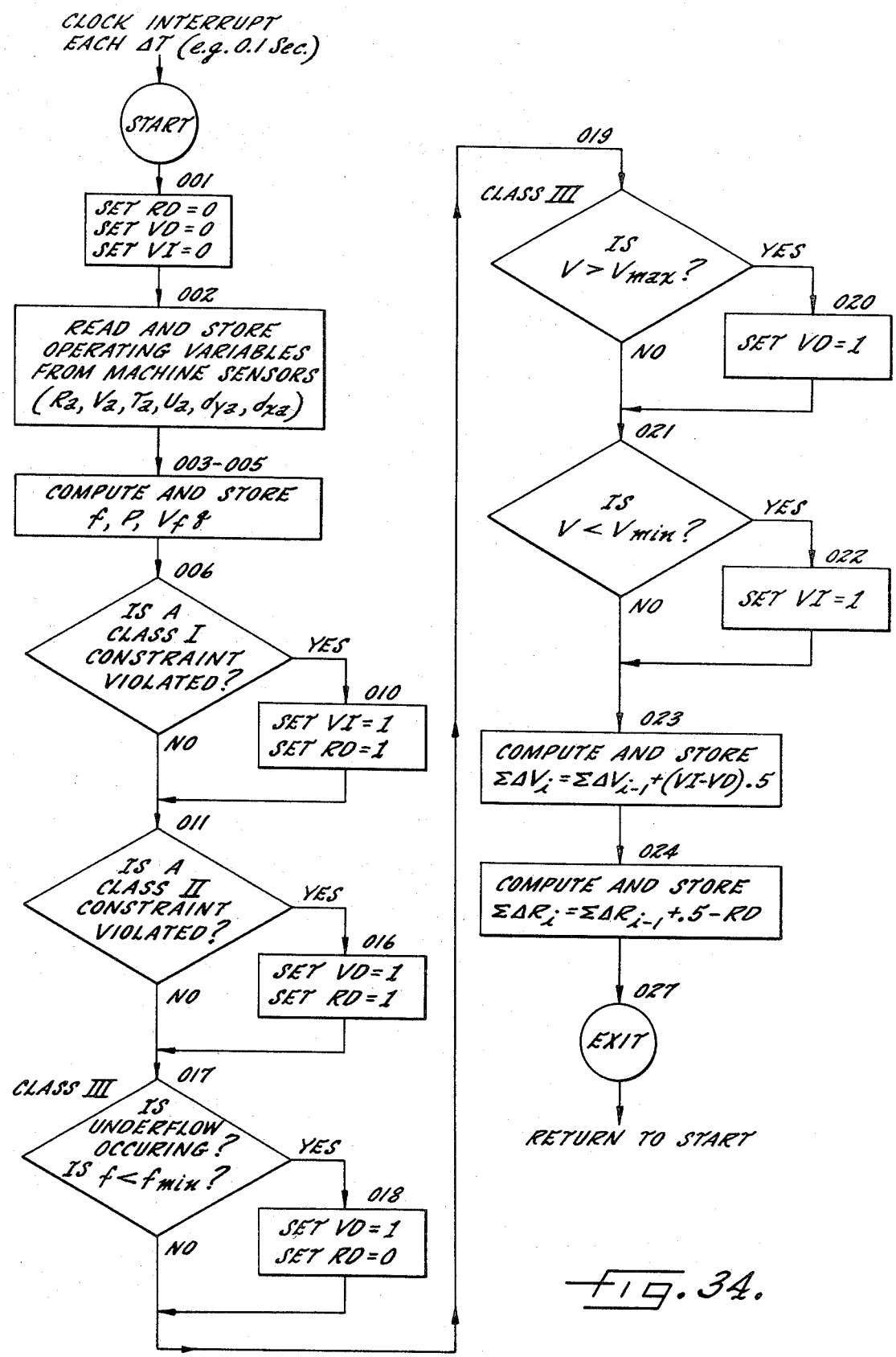
FIG. 34 is a flow chart for a suitable program to set up a digital computer so that it becomes a part of apparatus embodying the invention and participates in carrying out the method of the invention.

To accomplish the foregoing, the computer 124 (FIG. 24) is supplied with a control program which functions according to the generalized flow chart shown in FIG. 34. This flow chart can be best understood from a narrative description of the specific, exemplary program set out below. But before treating the flow chart and the program, and in the interest of having a concrete example, it will be useful first to designate the several specific limit values and other constants which have been employed in conducting actual tests on a specific machine tool to prove out the efficacy of the invention.

A. Exemplary Constants and a Specific Exemplary Program

For a specific machining operation, the workpiece material was type C 1045 steel and the cutter was a type ZP15M with six replaceable tooth inserts made of DMC-30 carbide steel. The machine tool was a small modified vertical milling and drilling machine Giddings & Lewis Model 10V, of the general organization shown in FIG. 1. With this information as a starting point, it was determined from published data pertaining to the modified Taylor Equation (55a) that the constants should have the following approximate values:

$$n = 0.3$$
$$q = 0.42$$
$$K = 125$$

These constants were based upon the assumption that the maximum allowable cutter tooth flank wear would be 10 mils before the useful life of a blade was fully used up.

From the machine tool operating specifications, and with the machine tool to operate with its spindle fully extended from the headstock, the following values were assigned or assumed as limits:

$$V_{max} = 300 \text{ R.P.M.}$$
$$V_{min} = 100 \text{ R.P.M.}$$
$$R_{max} = 25 \text{ I.P.M.}$$
$$T_{max} = 800 \text{ inches-pounds}$$
$$P_{max} = 2.0 \text{ H.P.}$$

No value for $R_{min}$ was assigned, because it is not needed as hereinafter noted.

It was experimentally determined that the cutter teeth would chip or otherwise fail if the feed per tooth $f$ exceeded about 20 mils. Also, it was observed that extreme vibration leading to "under-flow" occurred if the feed were less than 5 mils per tooth. These same experiments showed that vibration was not excessive, and surface finish was acceptable so long as vibration did not exceed 0.318 mils when measured by a sensor of the general organization shown above in FIGS. 29 and 31. Thus, it was reasonably determined and assumed for the simple machining operation contemplated on this particular machine tool and with the cutter and workpiece materials designated above, that the following limits were applicable:

$$f_{max} = 0.020 \text{ inch} = 20 \text{ mils}$$
$$f_{min} = 0.005 \text{ inch} = 5 \text{ mils}$$
$$U_{max} = 0.318 \text{ mil}$$

Finally, from these same experimental tests and examinations of surface finish on test pieces, it was determined that the milled surface was excessively tilted if the deflection $d_y$ normal to the feed path exceeded 0.625 mil, and that the flatness of the milled surface was unacceptable due to elliptical dishing if the deflection $d_x$ parallel to the feed path exceeded 0.5 mil when these deflections were measured at different feed rates and speeds by instrumentation such as diagrammatically shown in FIGS. 29 and 30. Thus, it was assumed that:

$$d_y = 0.625 \text{ mil}$$
$$d_x = 0.5 \text{ mil}$$

To concretely specify the economic constraint boundary by determining an applicable value of the constant $K_1$, certain economic costs and figures were reasonably assumed. First, the cutter used employed six disposable blade inserts each with four cutting edges, so Equation (46a) was applicable to compute the cost $C_D$ of cutter depreciation associated with each tool change. On the assumption that the cost of replacing one disposable insert (including the depreciation of the cutter body) was $2, Equation (46a) yields:

$$C_D = (\$2.00 \text{ per blade}) (6 \text{ blades per set})/(4 \text{ edges per blade}) = \$3.00 \text{ per change}$$

(87)

On the assumption that the sum of direct labor and labor overhead ($R_L + R_{OH}$) is $0.15 per minute, and that it takes an average of 9.0 minutes to change a cutter, the down time cost $C_{DT}$ for each tool change becomes from Equation (44):

$$C_{DT} = T_C (R_L + R_{OH}) = 9 (0.15) = \$1.35 \text{ per change}$$

(88)

Further, the entire inventory cost, represented by Equation (47), may be assumed such that:

$$C_{IN} = \$0.05 \text{ per tool change}$$

(89)

And in the case of disposable inserts, rather than regrindable inserts, it is apparent that the regrinding cost $C_G$ is zero.

From these figures, the total cost $C_T$ attributable to cutter expense for producing a part by machining a path length L thereon comes from Equation (43):

$$C_T = C_{DT} + C_G + C_D + C_{IN} = \$1.35 + 0 + 3.00 + 0.05 = \$4.40$$

(90)

Putting Equations (61) and (62) back into (83) yields:

$$K_1 = [L (R_L + R_{OH})/N \cdot N \; K^{1/n}/ L \cdot C_T \cdot n/1 - n]^n$$

(91)

It will be seen that numerical values for L and N in the foregoing expression cancel, and thus when the specific numerical values listed above are applied, the constant $K_1$ becomes:

$$K_1 = K [(R_L + R_{OH})/C_T \cdot n/(1-n)]^n = 125[(0.15)(0.3)/4.40 \, (.7)]^{.3} = 35$$

(92)

Thus, the maximum value bounding the upper limit of the parameter $Vf^q$ according to Expression (79'') is, in the present example, concrete numerical value of 35.

Summarized, for each of the several operating parameters here discussed, the computed or rationally assumed exemplary limit values are:

$$N = 6$$
$$q = 0.42$$
$$K_1 = Vf^q max = 35$$

$V_{max} = 300$
$V_{min} = 100$
$Vf^q_{max} = 35$
$R_{max} = 25$
$R_{min} =$ not used
$f_{max} = 20$
$f_{min} = 5$
$T_{min} = 10$
$T_{max} = 800$
$P_{max} = 2.0$
$U_{max} = 0.318$
$d_y = 0.625$
$d_y = 0.50$ The foregoing specific constants and limit values were set into the computer 124 shown diagrammatically in FIG. 24, so that they were signaled by and could be called out from storage registers, for use according to a program shortly to be detailed.

The computer 124 may be any one of a wide variety commercially available and familiar to those skilled in the art. It will include, in any event, the conventional "clock" to measure off successive small time periods, each arithmetic operation requiring on the order of only 1 or 2 microseconds. The computer can perform different programs concurrently by time sharing, but it may be a wholly dedicated computer if that is desired. In the present example, the computer was set to time share its work with other functions, and to interrupt other work and enter the adaptive control program once every 0.1 seconds. Thus, it may be said that the computer includes means for measuring off successive short time periods $\Delta T$, and performing all of the steps within the adaptive control program once during each such period. The actual operations to go through the program one time might require only on the order of 0.001 seconds. Of course, interrupt frequency or $\Delta T$ values other than 0.1 seconds may be chosen. The computer also includes storage registers where different input or computed numbers (identifiable by address location) may be stored, as is well known. Moreover, in the present instance, the computer may contain one-bit storage locations (analogous to flip-flops) to receive and signal numbers here called RD, VD, VI to designate respectively "rate decrease," "speed decrease," "speed increase." These particular numbers can have either of two values, i.e., 1 or 0.

The program generally depicted by the flow chart of FIG. 34, and which is repeated within the computer 124 during each successive time period $\Delta T$, may be described in its successive steps by the following table:

INTERRUPT & START

001 Set RD = 0, VD = 0, VI = 0
002 Read Sensor ADC's and store $R_a, V_a, T_a, U_a, d_{ya}, d_{xa}, V_p, R_p$
003 Compute and store $f = R_a/NV_a \times 10^3$ (mils per tooth)
004 Compute and store $P = T_a \times V_a \times 1.587 \times 10^{-5}$ (hp.)
005 Compute and store $E = V_a f^q = V_a [f \exp .42]$
006 Compute $f - 20 =$ ANS
 If ANS is zero or positive, skip to step 010
 If ANS is negative, go to step 007
007 Compute $d_{ya} - 0.625 =$ ANS
 If ANS is zero or positive, skip to step 010
 If ANS is negative, go to step 008
008 Compute $d_{xa} - 0.50 =$ ANS
 If ANS is zero or positive, skip to step 010
 If ANS is negative, go to step 009
009 Compute $T_a - 800 =$ ANS
 If ANS is zero or positive, go to step 010
 If ANS is negative, skip to step 011
010 Set VI = 1, Set RD = 1, go to step 011
011 Compute $P - 2 =$ ANS
 If ANS is zero or positive, skip to step 016
 If ANS is negative, go to step 012
012 Compute $U_a - 0.318 =$ ANS
 If ANS is zero or positive, skip to step 016
 If ANS is negative, go to step 013
013 Compute $R_a - 25 =$ ANS
 If ANS is zero or positive, skip to step 016
 If ANS is negative, go to step 014
014 Compute $T_a - 10 =$ ANS
 If ANS is zero or positive, go to step 015
 If ANS is negative, skip to step 017
015 Compute $E - 35 =$ ANS
 If ANS is zero or positive, go to step 016
 If ANS is negative, skip to step 017
016 Set VD = 1, Set RD = 1, go to step 017
017 Compute $5 - f =$ ANS
 If ANS is zero or positive, go to step 018
 If ANS is negative, skip to step 019
018 Set RD = 0, set VD = 1, go to step 019
019 Compute $V_a - 300 =$ ANS
 If ANS is zero or positive, go to step 020
 If ANS is negative, skip to step 021
020 Set VD = 1, go to step 021
021 Compute $100 - V_a =$ ANS
 If ANS is zero or positive, go to step 022
 If ANS is negative, skip to step 023
022 Set VI = 1, go to step 023
023 Compute and set $\Sigma \Delta V = \Sigma \Delta V + (VI-VD) 0.5$ go to step 024
024 Compute and set $\Sigma \Delta R = \Sigma \Delta R + 0.5 - RD$; go to step 025
025 Compute and set $V_c = V_p + \Sigma \Delta V$, go to step 026
026 Compute and set $R_c = R_c + \Sigma \Delta R$; go to step 027
027 EXIT In the narrative sequence, the computer during each iteration of the program first resets the control numbers RD, VD and VI to zero (step 001). It then proceeds to read and store fresh or updated actual values of the operating variables at the machine tool (see step 002). Next, the program involves at steps 003 through 005 to computation and storage of updated or current actual values of the operating parameters $f$ and E, where E is the composite symbol for the parameter $Vf^q$. In step 004, the number $1.587 \times 10^{-5}$ is a factor to convert the product of torque in inch-pounds and speed in R.P.M. to horsepower. In step 003, the factor 103 converts inches to mils, since R is in inches/min. and V is in R.P.M.

During steps 006 through 009, the computer checks all of the Class I restraints by performing a numerical comparison for each, in order to determine if any one of the restraints is violated. At step 006, for example, the computer takes the current values of the chipload parameter $f$ and subtracts the previously stored limit value $f_{max}$, which is 20. If the result is negative, zero or positive, this is an indication that the actual value is respectively less then, equal to, or greater than the limit value. The CPU in the computer signals the sign of the result, and finding that answer to be zero or positive, the computer produces a signal indicating that the $f_{max}$ constraint is violated.

Similar comparison computations are performed at steps 007, 008, 009 for the Class I constraints on $d_y$, $d_x$ and T. If at any of the steps 006 through 009, a violation is detected by a positive sign resulting from the arithmetic subtraction, the computer immediately skips to and performs the operation designated for step 010. Thus, if a violation is detected at 006, it is known that there is at least one Class I restraint violation, and steps 007, 008 and 009 need not be performed. If any Class I violation is detected, step 010 is performed to set the numbers VI = 1 and RD = 1, and the computer proceeds then to steps 011. If no Class I violation has been found, the computer skips steps 010 so that VR and RD both remain zero, and the computer proceeds to step 011.

In steps 011 through 015 arithmetic comparisons are made for all of the Class II restraints. For example, at step 011, the actual current value of spindle power P is compared with the limit value of 2.0 H.P.; if the answer is negative, no violation is detected, but if the answer is zero or positive a power violation is signaled. Similar Class II comparisons are made at steps 012, 013, 015 for the $U_{max}$, $R_{max}$, $Vf^q_{max}$ restraints. If a violation is found at any of these steps, the computer skips to and performs step 016 which involves setting VD = 1 and RD = 1. Thus, if RD were not set equal to one at step 010, it may be so set at step 016 if a Class II restraint is violated. If no Class II restraint is violated, then step 016 is not performed, and the computer proceeds to step 017.

It may be noted that step 014 simply compares the actual torque $T_a$ with an arbitrarily low value of 10 inch-pounds. This comparison is made to determine if the cutter is actually engaged with the workpiece. If the spindle torque is extremely low, this is an indication that the cutter is simply being fed through space during its approach to or departure from the workpiece. Under these circumstances, the economic constraint upon $Vf^q$ can be disregarded, and feed rate can be increased to shorten the time during which the machine tool is "cutting air." As shown, if the comparison at step 014 confirms that the machine is "cutting air", the comparison step 015 is by-passed, and the computer skips immediately to step 017.

At step 017, the computer performs the Class III comparison for $f_{min}$ as shown in the flow chart of FIG. 34. That is, it subtracts the actual value of the chipload f from the minimum value of 5.0 mils. If the answer is negative, indicating that the minimum value has not been violated, the computer skips to steps 019. On the other hand, if the answer is zero or positive and thus indicates that the actual chipload is less than or equal to the minimum permissible value, the computer performs step 018 setting RD = 0 (even if it has previously been set to 1) and setting VD to 1 if it has not previously been so set.

At step 019, the computer performs a comparison for at $V_{max}$ restraint. If no violation is found, the computer skips to step 021, but if a violation is found, VD is set to 1, or left set at 1 if it has been so set at step 016.

At step 021, a comparison is made for the $V_{min}$ restraint by subtracting the current actual value of speed $V_a$ from the minimum value of 100. If the answer is negative and thus indicates no violation, the computer skips to 023, but if the answer is zero or positive, the computer at step 022 sets VI = 1.

At the end of step 022, the computer has checked all of the Class I, Class II and Class III restraints, and has established values of either 0 or 1 for the three control signals VD, VI and RD. The computer next proceeds at step 023 to incrementally change, by a small predetermined value $\Delta V$ (which in the present example is 0.5 r.p.m.) the then accumulated, stored value of all previous incremental changes $\Sigma \Delta V$. It performs the arithmetic operation:

$$\Sigma \Delta V_i = \Sigma \Delta V_{i-} + (VI - VD)\, 0.5$$

If neither VI nor VD is a one, or if both VI and VD's are one, no incremental change is made in $\Sigma \Delta V$. But if only VI or VD is a one, then an incremental change of 0.5 is added to or subtracted from the then existing value of $\Sigma \Delta V$.

Similarly, at step 024 the computer performs the incrementing function:

$$\Sigma \Delta R_i = \Sigma \Delta R_{i-1} + 0.5 - RD$$

(95)

It will be seen that in every case where RD is zero, the accumulated and stored correction number $\Sigma \Delta R$ is increased by 0.5, and this will increase the feed rate at the machine tool to increase the speed of machining operations. But on the other hand, if the adaptive control program has resulted in RD being set to a value of 1, the arithmetic operation at step 024 subtracts a value of 0.5 from the previous accumulation $\Sigma \Delta R_i^-$ to arrive at a lower new value $\Sigma \Delta R_i$. Thus, when any Class I or Class II violation has been detected (but the minimum chipload restraint violation has not been detected) the feed rate R at the machine tool will be incrementally decreased. Otherwise, the feed rate R will be incrementally increased during each iteration until such time as a Class I or Class II violation does occur.

At step 025, the new value of $\Sigma \Delta V$ is added to the programmed velocity $V_p$ to produce, store and signal a commanded velocity number $V_c$; and a similar addition is performed at step 026 to produce a commanded rate $R_c$ equal to the sum of $R_p$ and $\Sigma \Delta R$. The program ends with an exit at step 027, and it will be repeated again and again during each successive $\Delta T$ time period.

Referring to FIG. 24, the modified velocity and feed numbers periodically updated and signaled by the computer 124 are supplied via lines 125, 126 to the director 120, and they are transmitted by the latter as actual speed and feed commands $V_c$ and $R_c$ to the machine tool servos. The director will usually and conventionally include digital-to-analog converters for changing the signals $V_p + \Sigma \Delta V$ and $R_p + \Sigma \Delta R$ into analog command voltages which are then transmitted to the machine tool. In the example here given, the feed movement is only along the X axis, and the number $R_p + \Sigma \Delta R$ directly determines the instantaneous values of the X axis feed rate. Those skilled in the art will understand, however, that when the numerical program of motion read from a program tape calls for simultaneous movement along several axes so that the resultant feed is at some angle in space, the director 120 may include means for resolving the desired path feed rate $R_p + \Sigma \Delta R$ into its axis components, so that appropriate individual commands are supplied to the X, Y and Z axis servos to produce the composite commanded path velocity.

In review, the computer 124 is so physically set-up by the program inserted therein that it includes means for producing a first control signal which causes it to enter and perform step 010 when comparisons reveal that the actual value violates the limit value for any Class I restraint. It similarly includes means for producing a second control signal which causes it to enter and perform step 016 when comparisons reveal that the actual valve violates the limit value for any Class II restraint. Means are responsive to either the first or second control signal for decreasing the feed rate R (see step 024) because that will be the result when $RD = 2$. Means are also responsive to the second control signal for decreasing the speed V, because this occurs at step 023 when $VI = 0$ and $VD = 1$ (the latter being so because of step 016). Means are further responsive to the first control signal and the absence of the second control signal for increasing the speed V, since the performance of step 010 but not step 016 will leave $VI = 1$ and $VD = 0$ when step 023 is reached. And finally, means are responsive to the absence of both the first and second control signals for increasing rate R, because at step 023, $\Sigma\Delta V$ will not be increased but at step 024, $\Sigma\Delta R$ will be increased by the increment of 0.5.

Viewed in another way, the computer 120 is set-up such that in cooperation with the director 120 and the machine tool servos there are means for:

a. decreasing the existing feed rate R when any of the Class I or Class II restraints is violated;

b. decreasing the existing speed V when any of the Class II restraints, but none of the Class I restraints, is violated;

c. increasing the existing speed V when any Class I restraints, but none of the Class II restraints, is violated; and d. increasing the rate R when none of the Class I and Class II restraints is violated.

B. Operational Sequences

The overall operation of the apparatus shown in FIG. 24 and the end results of the method here described can best be seen from the short connected arrows in FIG. 33. Assuming for example that the machine tool begins operation at point $p1$, the first pass through the computer program will find that the $f_{min}$ constraint is violated. Accordingly, the speed V will be decreased and rate R increased during the first two $\Delta T$'s to bring the operating point from $p1$ to $p1$ to $p3$. During the next nine $\Delta T$'s, no constraint violation will be detected so the signals VD, RD, VI will remain zero in the computer, and only the rate R will be incrementally increased to move the operating point from $p3$ to $p12$. However, in the next $\Delta T$, a power constraint violation will be detected at program step 011 with the result that VD and RD signals will be set to 1 at program step 016. Therefore, during program steps 023 to 027 the commanded speed and feed will be decreased, shifting the operating point to $p13$. During the next $\Delta T$, no constraint violation will be signaled, and thus the operating point will shift to $p14$. During the next $\Delta T$, a power constraint violation will appear and the operating point will be shifted to $p15$. From the nature of the program described above, the system will now enter a limit cycle, with the operating point being successively shifted from $p13$ to points $p14$, $p15$ and $p16$ back to $p13$. By maintaining the $\Delta V$ and $\Delta R$ increments sufficiently small (here 0.5) this limit cycle is negligible in its effect upon the steady state operation of the entire system. The size of the $\Delta V$ and $\Delta R$ increments may be chosen as a compromise to (a) make the system rapidly approach a steady state limit cycle whenever it is not at a point of optimum operation, (b) allow fast tracking of moving optima and constraint boundaries, and (c) keep the limit cycle sufficiently small so that it does not significantly disturb steady state operation.

It will now be seen that the adaptive method and control apparatus brings the system to an operating location near the intersection of two constraint boundaries in the V, R plane where machining proceeds with best economic efficiency, yet without more than a minor and insignificant violation of the several parameter limits. In the example given by the arrows in FIG. 33, the maximum power and maximum chipload limits determine the point or area of steady state operation, and the economic limit ($Vf^n_{max}$) does not play a direct part. Likewise the $d_{x\,max}T_{max}$, $d_{y\,max}$ and $U_{max}$ lines have no effect because their limits are not exceeded.

Figure 35:
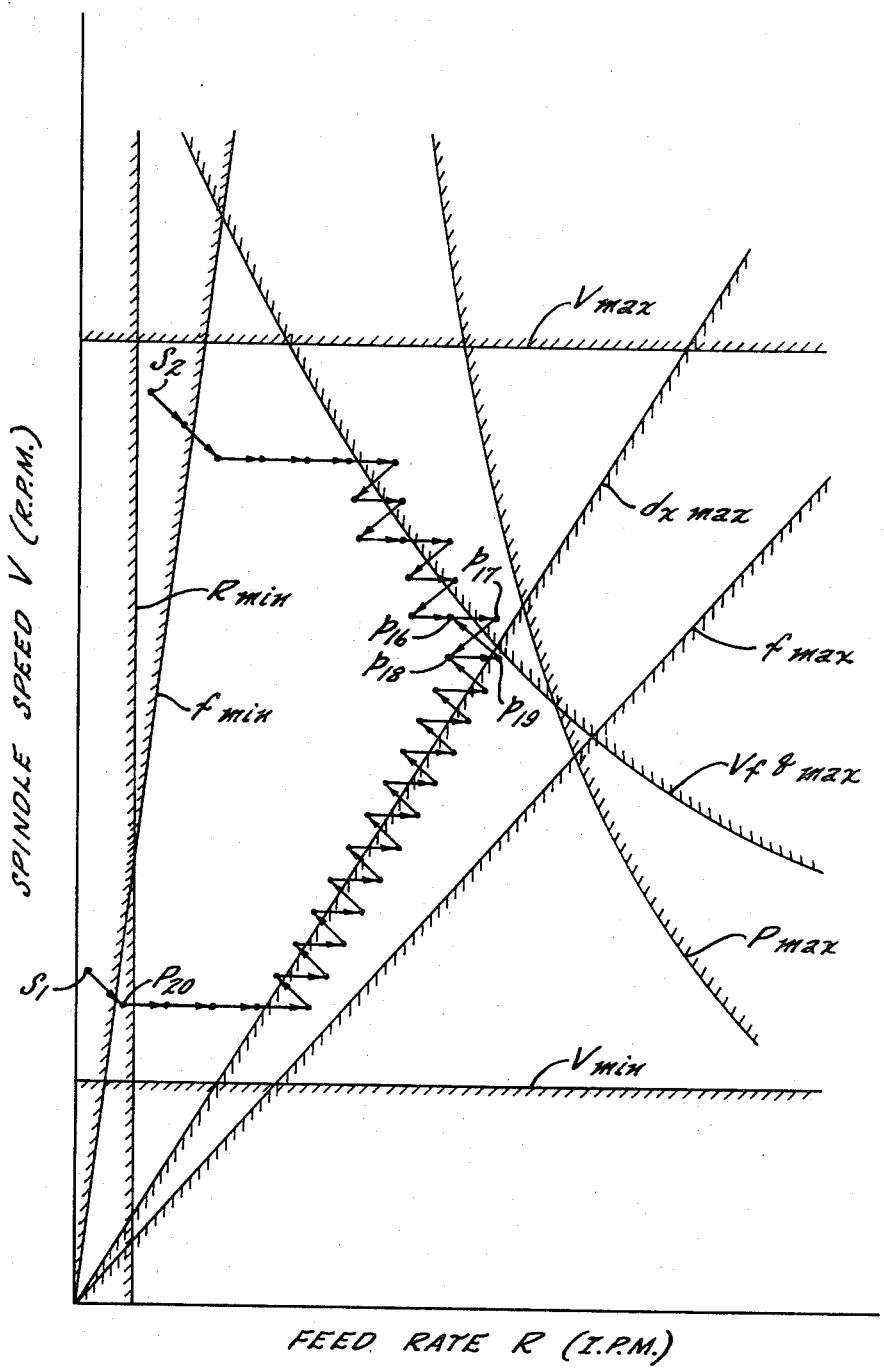
FIG. 35 is similar to FIG. 33, but shows a different exemplary relationship between several constraint boundary lines.
Figure 36:
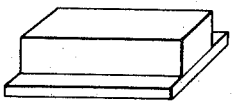
FIGS. 36, 37, 38 and 39 are simple perspective views of workpieces upon which test cuts were made.
Figure 37:
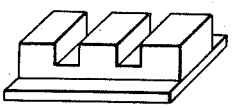
Figure 38:
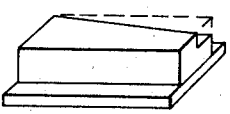
Figure 39:
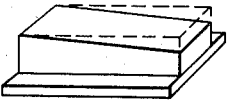

Yet, under other circumstances such as those shown for example in FIG. 35, the $d_{x\,max}$ and the $Vf^n_{max}$ lines may be controlling and the same method and apparatus will function to bring the operating point from starting locations of S1 or S2 to the limit cycle $p16$, $p17$, $p18$, $p19$ located at the intersection of these two lines. In this example of FIG. 35, the economic restraint boundary is directly effective, and the power restraint has no direct part in determining the operating point in the V, R plane. From this, it will be understood that regardless of the relative locations of the several individual restraint boundaries, the method and apparatus of the present invention will function in the general case to automatically adjust the system to optimized economic performance, subject to the limits which are imposed by the machine tool which is used and the minimum acceptable standards of part quality.

The reader may visualize other specific examples of different relative locations of the several constraint boundaries shown in FIG. 33, as may be created by different combinations of workpiece materials, cutter material, cutter configurations, variations in work hardness or depth of cut, machine tool limits, part quality standards, variations from instant to instant in workpiece hardness or cutter sharpness or changes from time to time in the depth or width of cut.

Point $p20$ in FIG. 35 illustrates why the $R_{min}$ constraint can be ignored, as indicated earlier. When the operating point is at any location in the V, R plane which does not violate either a Class I or a Class II restraint, the feed rate R will always be increased by the selected increment $\Delta R$. Thus, the appropriate corrective action will be taken to increase R when $R_{min}$ is violated even though that violation is not affirmatively sensed by an arithmetic comparison.

C. An Alternative Embodiment

Figure 25:
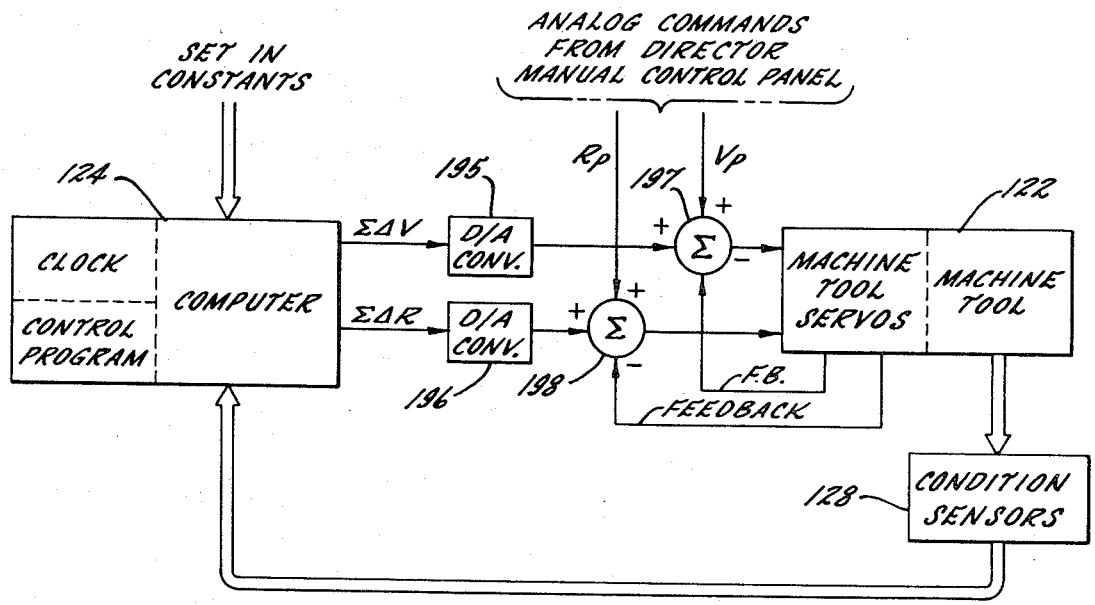
FIG. 25 is similar to FIG. 24, but shows an alternative embodiment for carrying out the same method.

An alternative embodiment of the invention shown in FIG. 25 is basically similar to that illustrated by FIG. 24. In this alternative form, however, analog signal voltages $R_p$ and $V_p$ come directly from any suitable source such as a numerical director or a machinist's manual control panel. The same constants are set into the computer, and it receives the same actual value signals from condition sensors 128. In this instance, however, the program steps 025 and 026 are omitted, and rapidly updated changeable digital signals $\Sigma\Delta V$ and $\Sigma\Delta R$ are transmitted from the computer 124 through digital-to-analog converters 195, 196 to algebraic summing devices 197 and 198, respectively. These summing devices, as shown, receive additively the programmed command voltages $R_p$ and $V_p$ and they receive subtractively feedback signals representing actual values of speed V and rate R existing in the machine tool 122. In result, therefore, devices 197 and 198 supply final command signals $V_c$ and $R_c$ to the motors which form a part of the speed and feed servos in the machine tool, these command voltages being balanced by feedback to keep the actual speed and feed values equal to $V_p + \Sigma\Delta V$ and $R_p + \Sigma\Delta R$. The apparatus of FIG. 25 will thus function in the same general manner and achieve the same overall result as the apparatus described previously with reference to FIG. 24.

Figure 26:
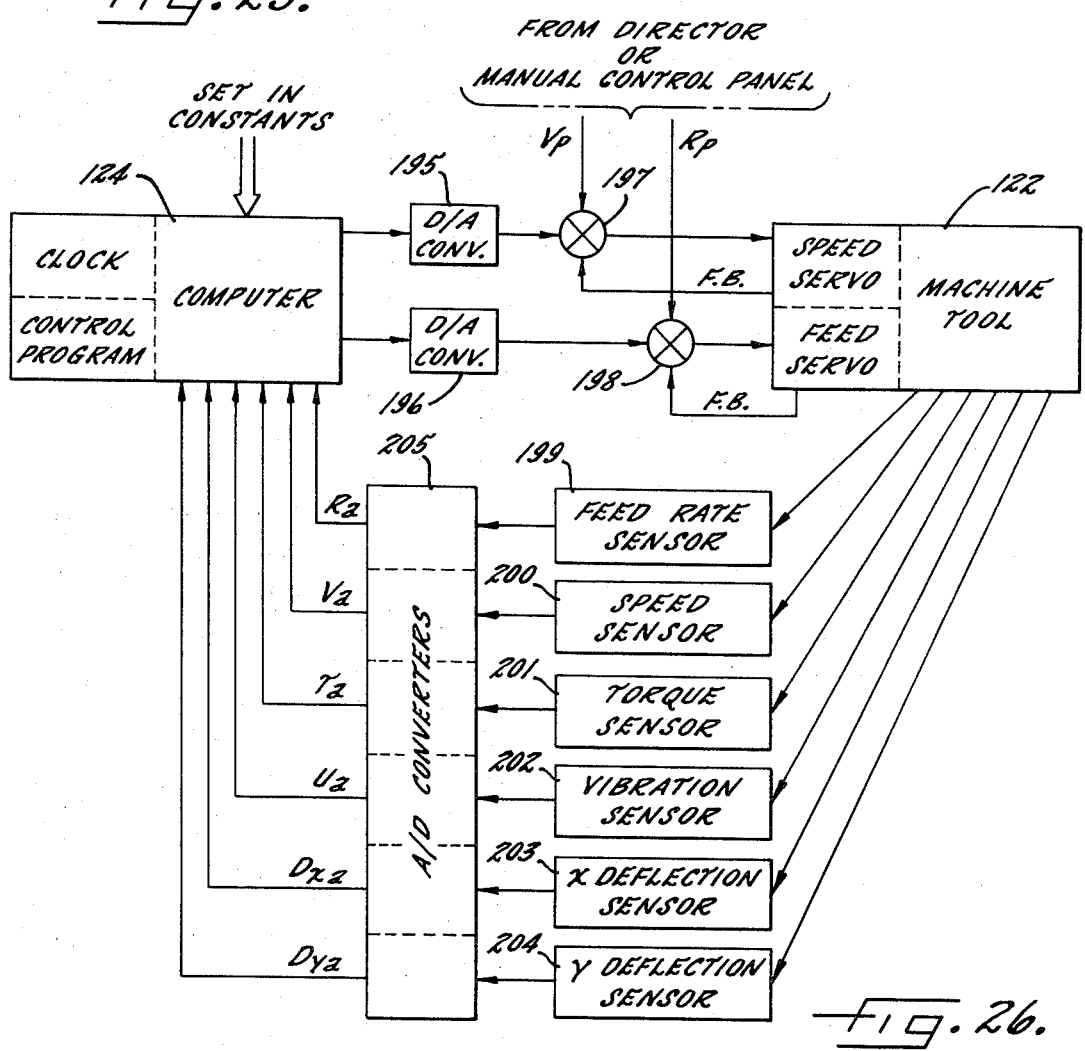
FIG. 26 shows in greater detail the system which is illustrated in FIG. 25.

FIG. 26 illustrates the same apparatus as shown in FIG. 25, but with slightly greater detail. It may be assumed in FIG. 25 that the condition sensors 128 directly produce digital output signals representing the actual values of the several conditions while the machine tool is operating with the cutting acting upon a workpiece. Thus, no analog-to-digital conversion is required. In FIG. 26, however, six separate condition sensors 199 through 204 are illustrated, it being assumed that these provide dc. voltages or other analog signals which are proportional to the sensed condition values of $R_a$, $V_a$, $T_a$, $U_a$, $d_{xa}$, and $d_{ya}$. In this case, there are six corresponding analog-to-digital converters shown collectively at 205 for converting the respective actual condition signals from analog-to-digital form and supplying the six respective digital representations of the input of the computer 124. Thus, the invention may be practiced with either analog or digital signals and with such conversion as may be required from one form to the other. Indeed, the computer 124 which functions digitally on a rapid, iterative basis may be constructed completely with analog circuits which function with smoothly and continuously variable analog signals.

Equations (49) and (50) are substantially identical in their form although the form pertains to cost of machining and the latter expresses time for machining a cut of unit length L on a workpiece. Therefore, the same mathematical derivations explained above and based upon Equation (49) may be followed by one skilled in the art with reference to Equation (50) in order to arrive at an expression for a restraint boundary, and a numerical constant, pertaining to minimum machining time rather than minimum machining cost. Where minimum production time (and the cost of cutters is purposely to be ignored) is predominant economic consideration, the economic factor will be a restraint boundary line specifically different from $Vf^q = K_1$, but the method, apparatus and rationale will otherwise be the same as previously described herein. Thus, the invention is generically applicable to the optimization of any economic factor or consideration, whether that be minimum cost, minimum time, or some combined function of the latter factors such as maximum shop profit, —but always subject to the other inherent limits imposed by machine tool capabilities or part quality standards.

8. Results of Actual Tests

To determine the nature and degree of machining performance five test cuts have been performed, two on a test part 1 and one each on different test parts, 2, 3 and 4 which are respectively shown in FIGS. 36, 37, 38 and 39. In all instances the workpiece material was type C1045 steel and the cutter was type ZP15M with DMC 30 carbide teeth inserts, so the exemplary modified Taylor equation constants given above were applicable. The numerical values for the several limits as stated above were employed in the control program, and the test cuts were made on a modified Giddings & Lewis Model 10V machine tool.

A. First Test Cut

Test piece 1 (FIG. 36) is a flat rectangular steel block 4 inches wide and 12.75 inches long. A face milling cut 0.025 inches deep was made using new insert blades and the method described above with the constants described. The resulting spindle speed and table feed rate are shown as functions of time in FIGS. 40a and 40b, respectively. The other constraint variables are graphed as time functions in FIGS. 40c through 40i.

Figure 40C:
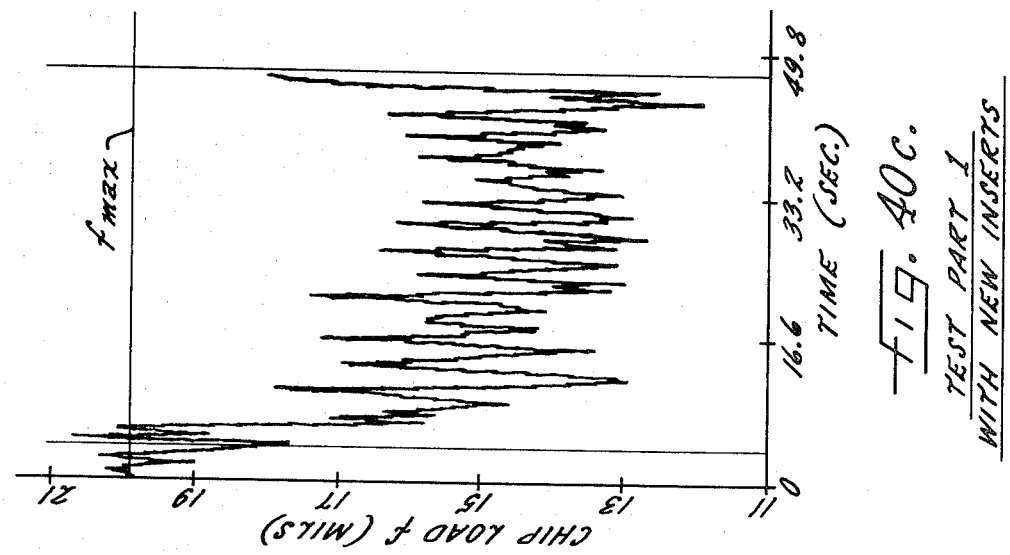
FIGS. 40a and 40i are graphs showing variations in different operating parameters during a first test cut on a workpiece like that shown in FIG. 36.
Figure 40B:
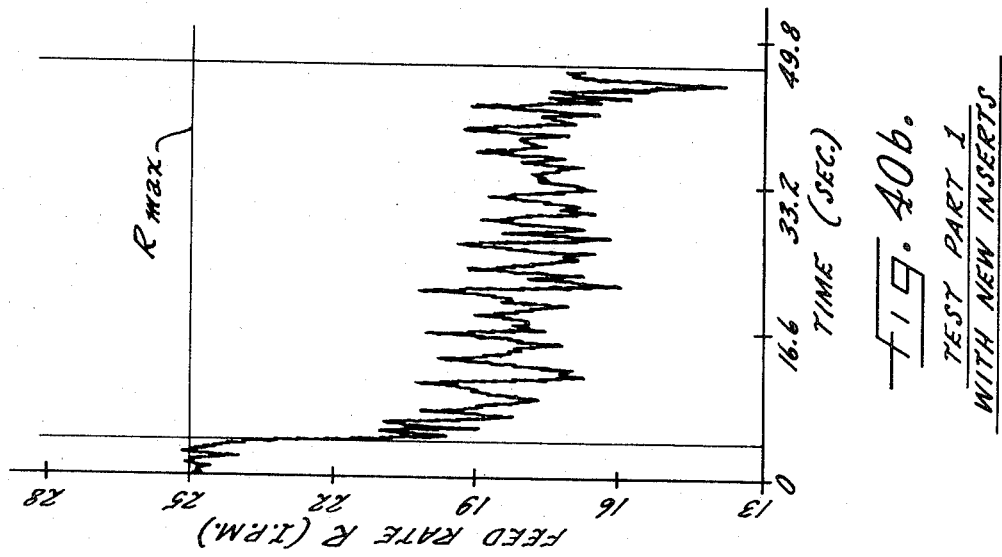
Figure 40A:
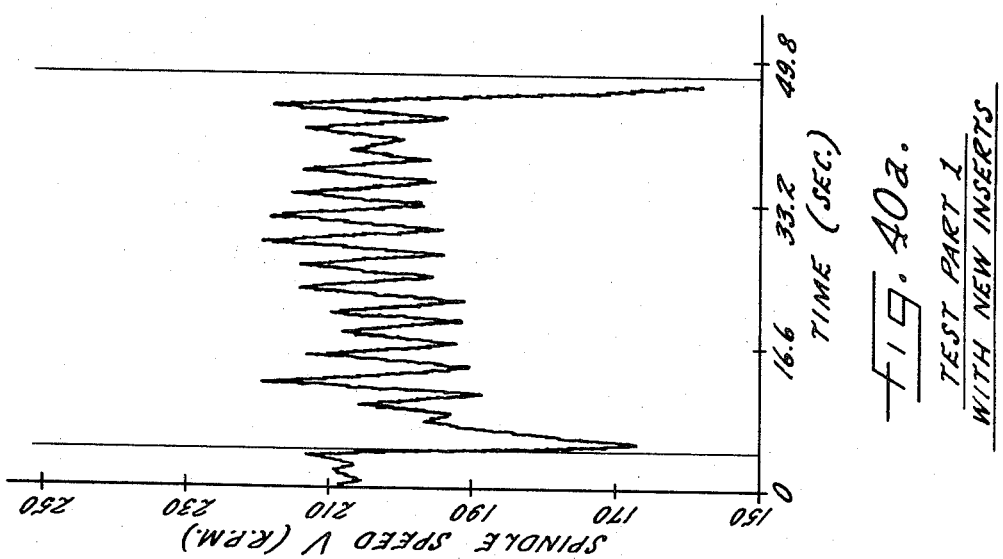
Figure 40F:
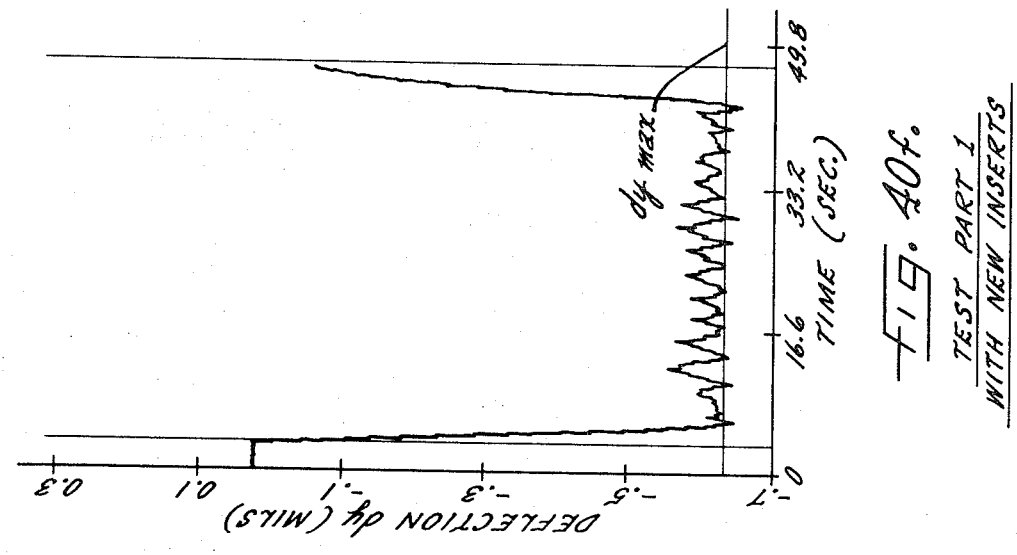
Figure 40E:
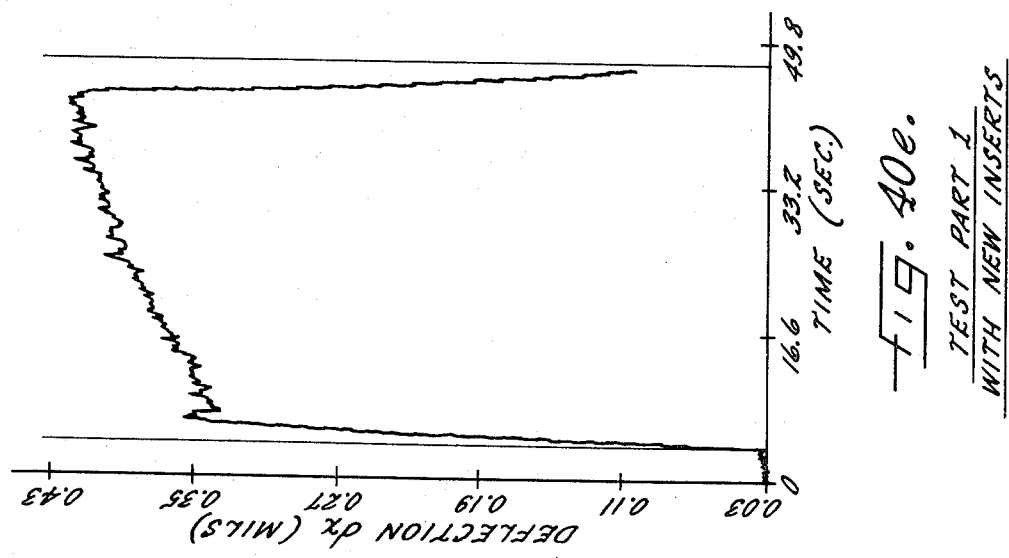
Figure 40D:
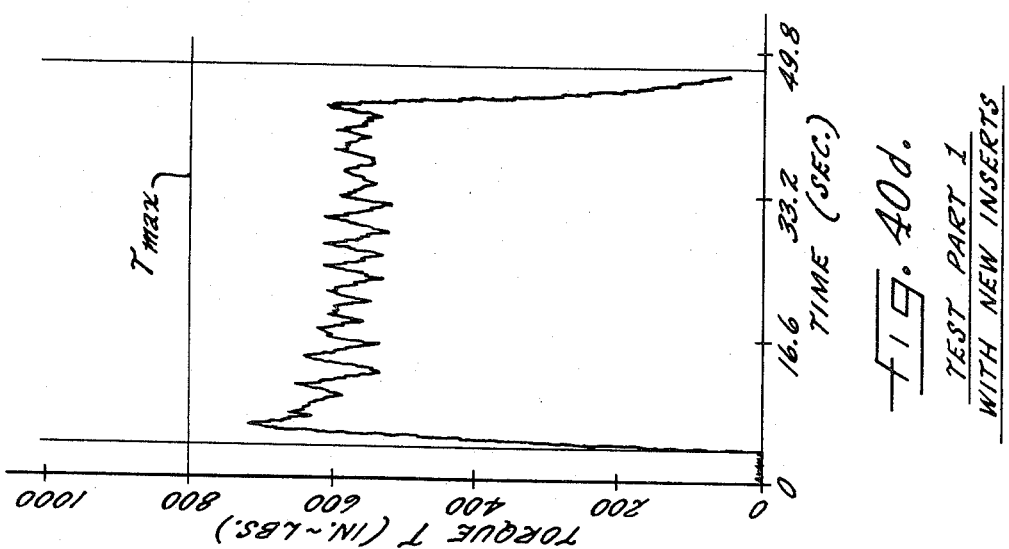

The cutter engaged the workpiece at the 3 second point on these figures. The time of engagement is indicated by a vertical line on each graph. Prior to encountering the part, the table feed rate and chipload were at their constraint limits as shown in FIGS. 40b and 40c. This resulted in a spindle speed of about 208 RPM. During the approach to the workpiece, the $Vf^q$ constraint shown in FIG. 40i exceeded the set limit but this produced no effect due to the low torque level, shown in FIG. 40d, and the skipping action produced at program step 014. When the workpiece was encountered, the torque increased and the tool life constraint violation caused a decrease in spindle speed and table feed rate. The vibration constraint shown in FIG. 40h, and the power constraint shown in FIG. 40g also contributed to the decreases in spindle speed and table feed rate in the time interval from 3 seconds to 7 seconds on these graphs. During the first 4 seconds of engagement the chipload $f$ (FIG. 40c) remained near its limit. In the interval from 7 sec. to 43 sec. of this test, the chipload was controlled by the limit on the deflection $d_y$ as shown in FIG. 40f. The production rate was limited in this interval by the $Vf^q$ economic constraint. The generally decreasing trend apparent in the chipload graph resulted from a creeplike phenomenon associated with quill deflection on this machine tool. That is, in order to maintain a given quill deflection, it was necessary to decrease the force level on the quill with time.

As the cutter emerged from the workpiece, vibration due to intermittent blade contact with the part increased to the limit set. The result was a slowing of the spindle and the table. Further, the slowdown at the end of the part is consistent with general shop practices used to prevent tool damage at the beginning and end of milling operations.

The cutting of this part was completed at the 46 seconds point indicated by a vertical line on these figures. The total cutting time was 43 seconds. Imposing the same constraints on the metal removal process as were imposed for this test but requiring that the speeds and feeds be fixed throughout the cut as in conventional optimal machining, based upon the worst conditions encountered, would result in a feed rate selection of about 15 IPM. This value is the lowest table feed rate reached, as shown in FIG. 40b. Hence, conventional optimal machining would require about 51 seconds to complete this part. The time saving resulting from the use of adaptive control is in this case 8 seconds or 15.7 percent of the conventional machining time for the same part under identical conditions.

B. Second Test Cut

Figure 41F:
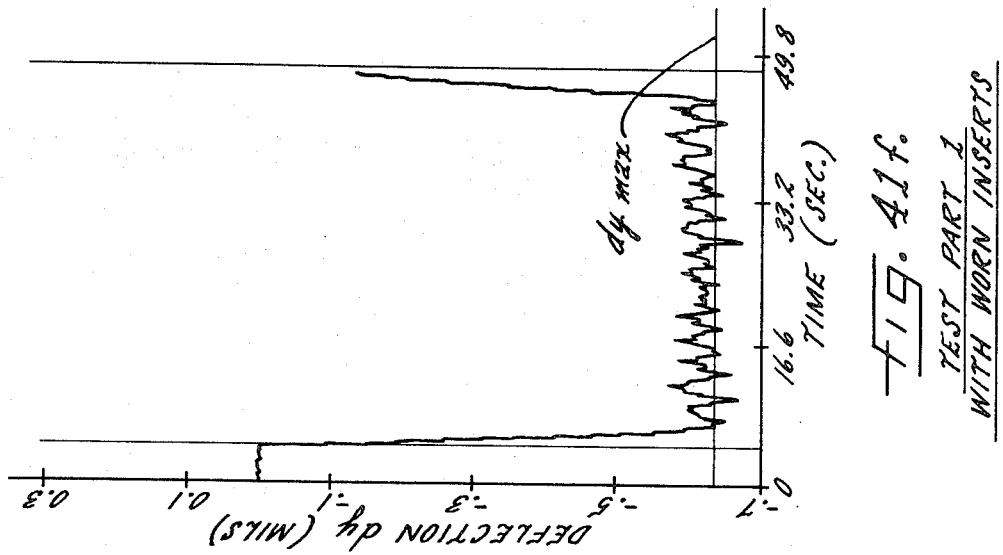
Figure 41E:
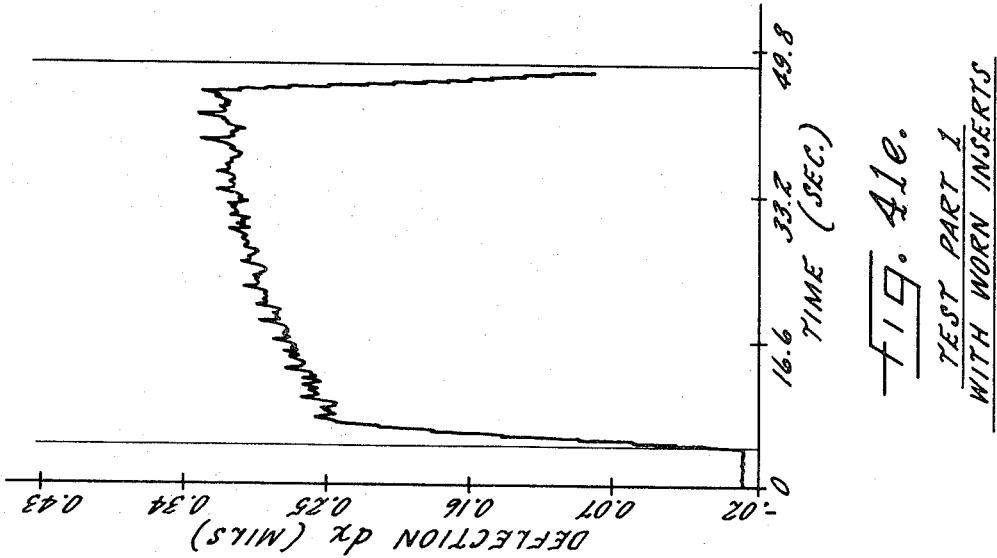
Figure 41D:
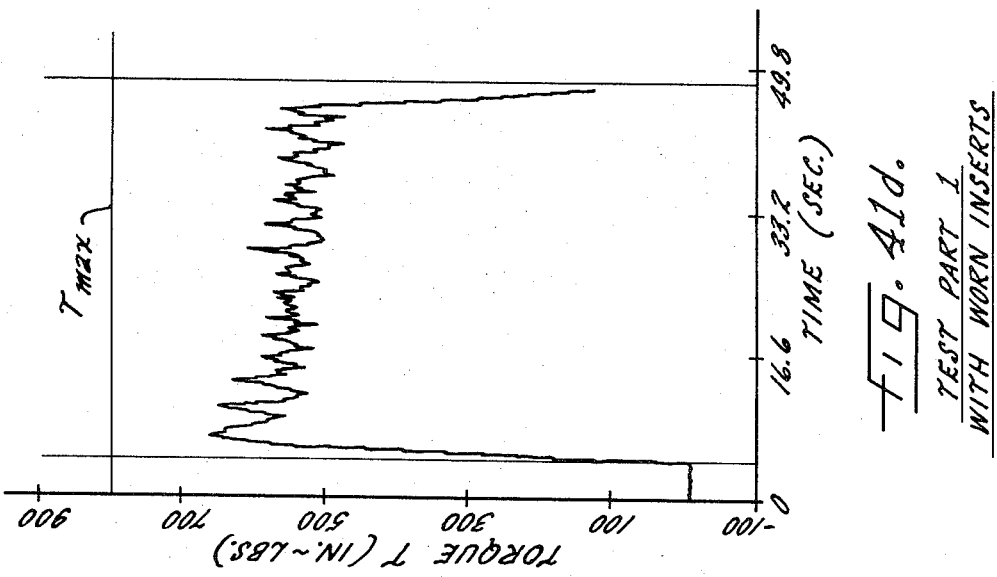

Test part 1 was also machined with insert blades which were worn. The average flank wear on the blades at the end of this test was 4.5 mils. The results of this test are shown in FIGS. 41a through 41i. As in the previous test, the chipload (shown in FIG. 41c) and the table feed rate (shown in FIG. 41b) limits were the controlling factors prior to engagement of the workpiece by the cutter at the 5 second point on the graphs. The engagement time is indicated by vertical lines in FIGS. 41a through 41i. Except for short intervals near the ends of the workpiece, production rate was determined by the tool life constraint $Vf^q$, as shown in FIG. 41i. At both ends of the workpiece the production rate was limited by vibration level, as shown in FIG. 41h. The primary factor determining the chipload for this cut was the deflection $d_y$, shown in FIG. 41f. Comparing this test with the previous test reveals that generally lighter chiploads were caused by adaptive action with the worn tool. Hence, the spindle speeds encountered were higher than those of the preceding test; the table feed rates were lower in general. The machining of the part was finished at the 49.5 second point which is designated on these figures by vertical lines. The total machining time for the cut was 44.5 seconds. This is 1.5 seconds greater than the time for adaptive machining of the part with new inserts. The minimum table feed rate encountered during the cutting test was about 11 IPM. Using this as the worst condition for optimal fixed speed cutting of this part subject to the same tool wear and constraints as used for this test gives a projected time for conventional milling of this workpiece of 69.5 seconds. In this test the adaptive control time saving is 25 seconds or 36 percent of the time required for conventional machining of the part.

C. Third Test Cut

Test part 2 (FIG. 37) is a 4 inch wide rectangular workpiece with two 1 inch long air gaps evenly spaced on its 12.75 inch length. Since the gaps are short and the cutter diameter relatively large, the effect of their presence is to emphasize the trends encountered during engagement and disengagement of the workpiece. FIGS. 42a through 42i show the results of face milling this piece to a depth of 0.022 inches.

Prior to engagement of the workpiece by the cutter at the 3 second point of these figures, the spindle speed and table feed rate were controlled by the chipload limit (FIG. 42c) and the feed rate limit (FIG. 42b). When cutting started, shown by vertical lines on the figures of this test, the speed and feed rate were reduced to levels consistent with the power (FIG. 42g) and tool life (FIG. 42i) limits. For this workpiece, the power limit controlled the production rate except near the gaps and the end of the part where it was reduced by the high vibration U (FIG. 42h) associated with cutter disengagement from the workpiece. The chipload remained at or near its limit except near the end of the workpiece where it was reduced due to the limit on deflection $d_y$ (FIG. 42f).

Machining of the part under adaptive control required 42 seconds. The lowest feed rate encountered during the test was about 12 IPM as the cutter passed through the region of the second air gap. This worst condition feed rate would result in an optimal conventional machining time of 64 seconds under the same constraints. The time saving attributed to the use of adaptive control here is 22 seconds or 34.5 percent of the conventional machining time.

It should be recalled here that the gaps are short. The cutter starts engaging the workpiece at the far end of the gap just as it disengages from the workpiece at the leading edge. Hence, the effect on speed and feed noted is that apparent during entry and exit from the part. If the gaps were longer, the speed and feed rate in the gap would approach those in the interval prior to the start of cutting for this test. That is, the speed would go to 208 RPM and the feed rate to 25 IPM in long air gaps.

D. Fourth Test Cut

Test part 3 (FIG. 38) was a 12.75 inch long, with the width varying linearly from 2 inches at the leading edge to 4 inches at the trailing end. The depth of the cut for this test was 0.025 inches. The results of the test are shown in FIGS. 43a through 43i.

Prior to the start of the cut, the spindle speed was 208 RPM, and the table feed rate was 25 IPM as in the previously described tests. During the first two thirds of the cut, the chipload was at its limit as shown in FIG. 43c, and the production rate was limited by vibration, shown in FIG. 43h. The high vibration is a result of the short interval of tooth contact with the workpiece associated with the small width of the part in this region. During the last third of this test the chipload was limited by the deflection $d_y$ shown in FIG. 43f. Production rate during the last third of this cut was limited by the tool life or $Vf^q$ constraint as shown in FIG. 43i. The slowdown as the tool emerged from the workpiece was due to violation of the vibration constraint as in previously described tests.

The time required to machine this part under the present adaptive control method was 39 seconds. The lowest feed rate encountered was 14 IPM. This feed rate would result in an optimal conventional machining time with fixed speed and feed of 54.4 seconds. The time saving from adaptive control over the conventional machining time was 15.5 seconds or 29.4 percent of the conventional machining time.

E. Fifth Test cut

Test part 4 is 4.0 inches wide by 12.75 inches long. The depth of cut for this test varied linearly from 0.010 inches at the start to 0.025 inches at the end of the cut. The results of this test are shown in FIGS. 44a through 44i.

Prior to actual cutting, the table feed rate (FIG. 44b) was at its limit and the spindle speed was determined from the feed rate and the chipload limit (FIG. 44c). During the first three quarters of this test the chipload remained at its limit and the tool life constraint $Vf^q$ (FIG. 44i) limited production rate. During the last quarter of the cut the chipload was decreased due to violation of the deflection constraint $d_y$ as shown in FIG. 44f. The power, vibration and tool life constraints all contributed to production rate limitation in this interval.

The machining time for this part under adaptive control was 38 seconds. Worst condition optimal machining with these constraints and fixed speed and feed would result in a feed rate of 14 IPM and a machining time of 55 seconds. The time saving attributed to adaptive control here is 17 seconds or 31 percent of the conventional machining time.

F. Summary of Test Results

The times required to machine four test pieces, subject to the assumed constraints, were all lower than would have been required if "safe" values of V and R were chosen and maintained constant. Typical worst condition machining times for these workpieces and the same constraints and condition of tool wear were used for determining the values of speed and feed assumed for conventional, non-adaptive operation in each case. The time saving attributed to the present invention, as shown by these tests, ranged from 15 percent to 36 percent of the conventional machining time.

During these tests the constraints on maximum spindle speed, minimum spindle speed, minimum chipload, torque and deflection $d_x$, were never violated. The primary factor limiting chipload when the cut was at full width of the part and 0.025 inches deep was the deflection $d_y$. Both power and tool life constraints limited production rates during the tests. Production rate was limited by vibration level during entry to and departure from the workpiece, as might be expected, but the system then moved to a higher production rate consistent with economic tool life and the other limiting factors.

We claim as our invention:

1. The method of machining a workpiece in a machine tool having a cutter rotatable at a controllable speed V and having means to bodily move the cutter at a controllable feed rate R relative to the workpiece, said method comprising
   a. signaling from variables sensed at the machine tool a plurality of actual values of operating parameters while the cutter is operatively acting on the workpiece with existing values of speed V and rate R,
   b. signaling predetermined limit values of parameter constraint boundaries which define a permissible operating region within the V, R plane,
      (b1) at least one of said limit values representing a constraint boundary beyond which the economic performance of the machining operation is unacceptably degraded,
   c. utilizing said signaled actual and limit values to determine if the then existing values of speed V and rate R define a point in the V, R plane which lies outside said region,
   d. in response to such determination, changing the one or both of the speed V and rate R values in a sense to restore the V, R operating point to within said region, and
   e. in the absence of such determination, increasing one of the speed V and rate R values.

2. The method set forth in claim 1, further characterized in that said step (d) comprises
   (d1) in response to a determination that a constraint boundary, which in the V, R plane is a line of generally positive slope, is violated, increasing speed V and decreasing rate R, and
   (d2) in response to a determination that a constraint boundary, which in the V, R plane is a line of generally negative or infinite slope, is violated, decreasing both speed V and rate R.

3. The method set forth in claim 1, further characterized in that said at least one limit value named at (b1) is a constant $K_1$ derived from economic relationships and which represents the limit of the quantity $Vf^q$ as the speed V and rate R take on different values; q being a predetermined constant and f representing feed per tooth.

4. The method set forth in claim 1, further characterized in that said sensed variables are selected from the group consisting of speed V, rate R, deflection $d_y$ normal to the direction of cutting, deflection $d_x$ parallel to the direction of cutting, torque T exerted to rotate the cutter and workpiece relative to each other, and vibration U of the cutter.

5. The method set forth in claim 4, further characterized in that said signaled actual values represent operating parameters selected from the group consisting of chipload f, deflection $d_y$, deflection $d_x$, torque T, power P, feed rate R, vibration U, the modified Taylor quantity $Vf^q$ and speed V.

6. The method set forth in claim 1, further characterized in that said signaled limit values represent parameters selected from the group consisting of maximum chipload ($f_{max}$), maximum deflection ($d_{y\,max}$) normal to direction of feed, maximum deflection ($d_{x\,max}$) parallel to direction of feed, maximum torque ($T_{max}$), maximum power ($P_{max}$), maximum feed rate ($R_{max}$), maximum cutter vibration ($U_{max}$), minimum cost or minimum time per unit length of cutting ($Vf^q_{max}$), minimum chipload ($f_{min}$), maximum speed ($V_{max}$), and minimum speed ($V_{min}$).

7. The method of machining a workpiece in a machine tool having a cutter rotatable at a controllable speed V and translatable at a controllable feed rate R relative to the workpiece, said method comprising
   a. signaling the actual values of selected operating parameters of the machine tool while the cutter is operatively acting on the workpiece with existing values of speed V and rate R,
   b. signaling the limit values of a plurality of parameters which define constraint boundaries of a satisfactory operating region in the V, R plane, where at least one of said constraint boundaries represents the locus of the values of speed V and rate R which will result in substantially optimized cost or time for machining a unit length along the workpiece,
   c. measuring off successive iterating time periods of short duration while machining is in progress,
   d. signaling during each time period whether the signaled actual value exceeds the signaled limit value with respect to one or more of said parameters,
   e. in response to such signaling, correctively changing the value of either or both the feed rate R and the speed V by an incremental amount and in a direction tending to restore the excessive actual value back toward equality with the limit value, and
   f. in the absence of such signaling during any of said time periods, increasing the value of the feed rate R by a predetermined incremental amount.

8. The method set forth in claim 7 further characterized in that the signaling of said limit value of said one constraint, as recited in phrase (b), in the signaling of a constant $K_1$; one of the signaled actual values of operating parameters is $Vf^q$ where V is cutter speed, f is chipload and q is a constant associated with the modified Taylor equation; and said value $Vf^q$ is compared with said constant $K_1$ to determine when the former exceeds the latter.

9. The method set forth in claim 7 wherein the signaled actual values of operating parameters are selected from the group consisting of speed V, rate R, chipload f, deflections $d_y$ and $d_x$, torque T, power P, vibration U, and specifically includes the value $Vf^q$ where q is an exponent in the applicable modified Taylor equation.

10. The combination set forth in claim 9 wherein the signaled limit values are all constants which are empirically or experimentally determined and represent limit values of variables selected from the group consisting of maximum and minimum chipload, maximum and minimum speed V, maximum deflections $d_y$ and $d_x$, maximum torque T, maximum power P, maximum feed rate R, maximum vibration U, and maximum $Vf^q$.

11. In a system for controlling a machine tool having means for rotating a cutter and moving it bodily relative to a workpiece respectively at a controllable speed V and a controllable feed rate R, the combination comprising
   a. means for sensing variables at the machine tool and dynamically signaling from such variables the actual values of a plurality of operating parameters while the cutter is acting on the workpiece with existing values of speed V and rate R,
   means for signaling limit values of a plurality of parameters which define constraint boundaries defining a satisfactory operating region in the V, R plane, and wherein one of said constraint boundaries defines the locus of conjoint values of speed V and rate R which will result in substantially minimum cost or minimum time for per unit length machined along the workpiece,
   c. means for comparing parameter actual value signals with the respective ones of said limit value signals to produce violation signals indicative of the fact when any actual value violates the limit value,
   d. means responsive to said violation signals for changing either or both speed V or rate R in a sense to remove the violation, and
   e. means responsive to the absence of any violation signal for increasing the feed rate R.

12. The combination set forth in claim 11, further characterized in that said one constraint boundary lies along the line $Vf^q = K_1$ in the V, R plane, where $f$ represents chipload, $q$ is a constant from the applicable modified Taylor equation, and $K_1$ is a constant having a value determined from economic relationships.

13. The combination set forth in claim 12, further characterized in that said constant $K_1$ is proportional to the quantity $[1/T]^n$, where T is the tool life and n is one of the exponents in the modified Taylor equation $VT^n f^q = K$.

14. The combination set forth in claim 12 wherein the constant $K_1$ is equal to $[n\ M_1/(1-n)\ M_2]^n$ where n and q are the constants in the applicable modified Taylor equation $VT_n f^q = K$ and the constants $M_1$ and $M_2$ are derived from economic and Taylor relationships.

15. The combination set forth in claim 11 further characterized in that said means (a) includes means for sensing variables selected from the group consisting of speed V, rate R, deflections $d_x$ and $d_y$, torque T and vibration U.

16. The combination set forth in claim 11, further characterized in that the operating parameters for which actual values are signaled are selected from the group consisting of chipload $f$, deflections $d_y$ and $d_x$, torque T, power P, feed rate R, vibration U, the modified Taylor quantity $Vf^q$, and the speed V.

17. The combination set forth in claim 16, further characterized in that said signaled limit values include limits selected from the group consisting of maximum chipload ($f_{max}$), maximum deflections ($d_{y\ max}$ and $d_x$ ), maximum torque (Tmax), maximum power ($P_{max}$), maximum feed rate ($R_{max}$), maximum vibration ($U_{max}$), maximum value of the function $Vf^q_{max}$), minimum chipload ($f_{min}$), maximum speed ($V_{max}$) and minimum speed ($V_{min}$).

18. In a system for controlling a machine tool having a cutter rotatable and bodily movable relative to a workpiece respectively at a controllable speed V and feed rate R, the combination comprising
   a. means for measuring off successive short time intervals,
   b. means for sensing a plurality of operational variables at the machine tool while the cutter is operatively acting upon the workpiece and signaling during each time interval the then existing actual values of a plurality of operating parameters one of which is a conjoint function of the speed V and chipload $f$,
   c. means for signaling a plurality of limit values for said parameters and which define a plurality of boundary constraints bounding an area in the V, R plane for permissible operation,
   d. means for comparing the actual value signals with the corresponding limit value signals during each time interval to produce violation signals in each case where the actual value of a parameter falls outside its boundary constraint,
   e. means responsive to any violation signal during any time interval for changing during the time interval one or both of speed V and rate R in a sense to lessen the violation, and
   f. means responsive to the absence of any violation signal during any time interval for increasing the feed rate R by a predetermined increment.

19. The combination set forth in claim 18 further characterized in that said conjoint function is $Vf^q$, where q is a constant from the applicable modified Taylor equation.

20. The combination set forth in claim 18 further characterized in that the said conjoint function parameter is compared by said means (d) with a corresponding limit value $K_1$, where $K_1$ is a constant derived from economic factors and constants from the applicable modified Taylor equation.

21. The combination set forther in claim 20 further characterized in that $K_1$ is equal to $K\ [(R_L + R_{OH})/C_T \cdot n/1-n]^n$
where K and n are constants from the applicable modified Taylor equation $VT^n f^q = K$, $R_L$ and $R_{OH}$ are the labor and overhead cost rates for operation of the machine tool, and $C_T$ is the cost associated with changing of the cutter in the machine tool.

22. The combination set forth in claim 18 further characterized in that said means (e) includes means, responsive to violation of a constraint boundary which in the V, R plane is of generally positive slope, for incrementally increasing V and decreasing R; and means responsive to violation of a constraint boundary which in the V, R plane is of generally negative or infinite slope, for incrementally decreasing V and decreasing R.

23. The method of machining a workpiece in a machine tool having a cutter rotatable and bodily movable relative to a workpiece respectively at a controllable speed V and a controllable feed rate R, said method comprising
   a. sensing operating variables at the machine tool and signaling the actual values of a plurality of operating parameters while the cutter is operative upon the workpiece,
   b. signaling the limit values of a first plurality (Class I) of operating parameters, each such parameter having values of V and R, when the limit is reached, which reside on a line of generally positive slope in the V, R plane, c. signaling the limit values of a second plurality (Class II) of operating parameters, each such parameter having values of V and R, when the limit is reached, which reside on a line of generally negative or infinite slope in the V, R plane, d. comparing the signaled actual values with the corresponding ones of said limit values for said first plurality of operating parameters and producing a first control signal when any one or more of such actual values exceeds the corresponding limit value, e. comparing the signaled actual values for said second plurality of operating parameters and producing a second control signal when any one or more of such actual values exceeds the corresponding limit value, f. decreasing said feed rate R in response to either the first or second control signal, g. decreasing said speed V in response to said second control signal, h. increasing said speed V in response to said first control signal and the absence of said second control signal, and i. increasing said feed rate R in the absence of both said first and second control signals.

24. The method of machining a workpiece in a machine tool having a cutter rotatable and bodily movable relative to a workpiece respectively at a controllable speed V and a controllable feed rate R, said method comprising a. sensing operating variables at the machine tool and signaling the actual values of a plurality of operating parameters while the cutter is operative upon the workpiece;

b. signaling the limit values of a first plurality (Class I) of operating parameters which vary with V and R such that the values of V and R lie, when the limit is reached, along lines in the V, R plane representable by the equation $AV^\beta f^\alpha = A_1 V^{\beta-\alpha} R^{\alpha} = 1$ where $A, A_1, \alpha, \beta$ are constants unique to each parameter but such that $\alpha > 0$ and $\beta/\alpha << 1$ for all the parameters, c. signaling the limit values of a second plurality of operating parameters which vary with V and R such that the values of V and R lie, when the limit is reached, along lines in the V, R plane representable by the equation $AV^\beta f^\alpha = A_1 V^{\beta-\alpha} R^{\alpha} = 1$ where $A, A_1, \alpha, \beta$ are constants unique to each parameter but such that $\alpha > 0$ and $\beta \geq \alpha$ for all the parameters, d. decreasing the rate R when any signaled actual value exceeds the corresponding signaled limit value of any of the first or second pluralities of parameters, e. decreasing said speed V when any signaled actual value exceeds the corresponding signaled limit value of any parameter in said second plurality but only if no signaled actual value exceeds the corresponding limit value for a parameter in said first plurality, f. increasing said speed V when any signaled actual value exceeds the corresponding signaled limit value of any parameter in said first plurality but only if no signaled actual value exceeds the corresponding limit value for a parameter in said second plurality, and g. increasing said rate R when none of said signaled actual values exceeds the corresponding signaled limit value.

25. The method of machining a workpiece in a machine tool having a cutter rotatable and bodily movable relative to a workpiece respectively at a controllable speed V and a controllable feed rate R, said method comprising a. sensing a plurality of variables at the machine tool and signaling the actual values of a plurality of operating parameters, b. said parameters having ascertainable limit values which due to machine tool capabilities or work quality standards or production economics desirably are not to be violated, c. the locus of the V and R values in the V, R plane when each of said parameters is at its limit value being representable by a boundary line of the family $AV^\beta f^\alpha = A_1 V^{\beta-\alpha} R^{\alpha} = 1$, where $A, A_1, \beta$ and $\alpha$ are constants unique to each line corresponding to each of said parameters, said lines falling into a Class I having generally positive slopes, a Class II having generally negative or infinite slopes, and a Class III representing lower and upper bounds with zero slopes, d. signaling said limit values for each of said parameters, e. comparing the limit signals with the corresponding actual value signals to produce a violation signal in any case where the limit is violated, f. increasing or decreasing the speed V to eliminate the violation in response to any violation of a Class III restraint, g. decreasing the speed V and decreasing the rate R in response to any signaled violation of a Class II restraint unaccompanied by a signaled violation of a Class III or Class I restraint, h. increasing the speed V and decreasing the rate R in response to a signaled violation of any Class I restraint unaccompanied by violation of a Class II or Class III restraint, an i. increasing the rate R in response to the absence of all violation signals.

26. The combination set forth in claim 23 further characterized in that one of said first plurality of parameters is $Vf^q$ where $f$ is the chipload of the cutter and $q$ is a constant from the applicable modified Taylor equation.

27. The combination set forth in claim 26 further characterized in that the limit value of said one parameter is a constant equal to $K/T^n$ where K and n are constants and T is useful cutter life in the applicable modified Taylor equation $VT^n f^q = K$.

28. The combination set forth in claim 26 further characterized in that the limit value of said one parameter is a constant $K_1$ equal to $$K [n (R_L + R_{OH})/(1-n) C_T]^n$$

where $K$ and $n$ are constants from the applicable modifier Taylor equation, $C_T$ is the cost of a tool change, and $R_L$ and $R_{OH}$ are the labor and overhead cost rates for operation of the machine tool.

29. The method of machining a workpiece in a machine tool having a cutter rotatable and bodily movable relative to a workpiece respectively at a controllable speed V and a controllable feed rate R, said method comprising
  a. sensing operating variables at the machine tool and signaling the actual values of a plurality of operating parameters while the cutter is operative upon the workpiece,
  b. signaling the limit values of a first plurality (Class I) of operating parameters, each such parameter having values of V and R, when the limit is reached, which reside on lines represented in the V, R plane by the equation $A_1 V^{(\beta - \alpha)} R^\alpha = 1$ where $A_1$, $\beta$ and $\alpha$ are constants unique to each such parameter and where for all such parameters $\alpha > 0$ and $\beta\alpha << 1$,
  c. signaling the limit values of a second plurality (Class II) of operating parameters having values of V and R which reside, when the limit is reached on lines as aforesaid but where for all such parameters $\alpha > 0$, and $\beta \geq \alpha$,
  d. signaling the limit values of two (Class III) operating parameters having values of V and R which reside, when the limit is reached, on lines as aforesaid but where for all such parameters $\beta = 0$ and $\beta = 1$;
  e. reducing the speed V when
    i. the higher one of said two signaled limit values for Class III parameters is exceeded by the corresponding signaled actual value, or
    ii. any one of said signaled Class II limit values is exceeded by the corresponding signaled actual value while none of the signaled Class I limit values is exceeded by the corresponding signaled actual value;
  f. increasing the speed V when
    i. the lower one of said two signaled limit values for Class III parameters is greater than the corresponding signaled actual value, or
    ii. any one of said Class I signaled limit values is exceeded by the corresponding signaled actual values, while none of the Class II signaled limit values is exceeded by the corresponding signaled actual value;
  g. decreasing the feed rate R when
    i. any one of the Class I or Class II signaled limit values is exceeded by the corresponding signaled actual value; and
  h. increasing the feed rate R when the condition recited at (g) (i) above does not exist.

30. The method of machining a workpiece in a machine tool having a cutter rotatable and bodily movable relative to a workpiece respectively at a controllable speed V and at a controllable feed rate R, said method comprising
  a. sensing a plurality of operating variables at the machine tool and signaling actual values of a plurality of parameters which the cutter is operative on the workpiece,
  b. signaling the limit values of a first plurality (Class I) of operating parameters having values of V and R which, when the limit is reached, lie along lines representable in the V, R plane by the general equation $A_1 V^{(\beta - \alpha)} R^\alpha = 1$ where $A_1$ is a constant unique to each such parameter and $\alpha$ $\beta$ constants which may differ for the different parameters but which in all cases $\alpha > 0$ and $\beta\alpha << 1$,
  c. signaling the limit values of a second plurality (Class II) of operating parameters having values of V and R where, when the limit is reached, lie along lines representable in the V, R plane by said equation, but for which $\alpha > 0$ and $\beta \geq \alpha$;
  d. measuring off successive equal short time periods;
  e. decreasing the existing feed rate R by a predetermined increment $\Delta R_1$ during each time period when any of said signaled limits is exceeded by the corresponding signaled actual value;
  f. decreasing the speed V by a predetermined increment $\Delta V_1$ during each time period when any of said Class II limits is exceeded by the corresponding signaled actual value;
  g. increasing the speed V by a predetermined increment $\Delta V_2$ during each time period when any of said Class I limits is exceeded by the corresponding signaled actual value; and
  h. increasing the feed rate R by a predetermined increment $\Delta R_2$ during each time period when the decreasing recited at (e) above is not effected.

31. The method of machining a workpiece in a machine tool having a cutter rotatable and bodily movable relative to a workpiece respectively at a controllable speed V and a controllable feed rate R, said method comprising
  a. sensing certain operating variables at the machine tool and signaling the actual values of a plurality of parameters while the cutter is operative on the workpiece, said parameters including at least the modified Taylor equation quantity $Vf^n$ and one other parameter $P_a$ which is desirably constrained during operation of the machine tool,
  b. said parameter $P_a$ being representable in the V, R plane when the constraint limit is reached by a line corresponding to the equation $AV^\beta f^\alpha = A_1 V^{(\beta - \alpha)} R^\alpha = 1$ where A and $A_1$ are predetermined constants and $\alpha$ and $\beta$ are constants whose magnitudes and relative magnitudes are only generally known,
  c. signaling limit values for the parameters $Vf^n$ and $P_a$;
  d. decreasing the speed V and decreasing the feed rate R whenever the $Vf^n$ actual value signal exceeds the $Vf^n$ limit value signal,
  e. correctively changing the speed V and/or rate R whenever the $P_a$ actual value signal exceeds the $P_a$ limit value signal, and
  f. increasing the rate R when neither the $Vf^n$ nor $P_a$ actual value signals exceed their corresponding limit values.

32. The method set forth in claim 31 wherein the limit value of the $Vf^n$ parameter is a constant substantially equal to $$K_1 = [n(\alpha - \beta) (R_L + R_{OH})/C_T \{\alpha - \beta q + n (\beta - \alpha)\}^n\}$$

where $R_L$ and $R_{OH}$ are the labor and overhead cost rates for operation of the machine too; $C_T$ is the cost of a tool change; $K$, $q$ and $n$ are the constants for the applicable modified Taylor equation and $\alpha$ and $\beta$ are constants empirically and intuitively determined as applicable in the aforesaid equation $AV\beta f\alpha = 1$ as defining the limit of the parameter $P_a$.

33. The method set forth in claim 31 further characterized in that the signaled limit value of the parameter $Vf^n$ is numerically equal to $$K [n (R_L + R_{OH})/(1-n) C_T]^n$$

where $R_L$ and $R_{OH}$ are the labor and overhead cost rates for operation of the machine tool; $C_T$ is the cost of a tool change, $K$ and $n$ are constants for the applicable modified Taylor equation; and also characterized in that the constraint limit for the operating parameter $P_a$ is defined by the aforesaid equation $AV^\beta f^\alpha = 1$ when $\beta$ is approximately zero and $\alpha$ is approximately 1.

34. The method set forth in claim 31 further characterized in that the signaled limit value of the parameter $Vf^q$ is numerically proportional to $$1/T^n$$

where $T$ is a specified, desired tool life and $n$ is a constant from the applicable modified Taylor equation.

35. The method of machining a workpiece in a machine tool having a cutter rotatable at a controllable speed and having means to bodily move the cutter at a controllable feed rate relative to the workpiece, said method comprising sensing the values of selected operating parameters of the machine tool while the cutter is operatively acting on the workpiece with existing values of speed and feed rate, deriving from said sensed values signals representing a plurality of constraints in the feed versus speed plane which represent boundary limits upon operation of the machine tool, at least one of said constraints representing a boundary of feeds and speeds required for operation with an optimized economic (e.g., minimum cost per part or minimum time per part) performance, measuring off successive iterating time periods of short duration, signaling during each time period whether the actual values of cutter speed and feed rate define a point in the speed versus feed plane which violates the boundary represented by each of the signaled constraints, correctively changing the existing value of the cutter speed or feed by an incremental amount in the direction to eliminate the violation in response to signaling that said point violates at least one boundary during any of said time periods, and increasing said feed rate by an incremental amount in response to signaling that said point does not violate any boundary during any of said time periods.

36. The method set forth in claim 35 further characterized in that when two boundary violations are signaled during the same time period and the corrective actions to eliminate such two violations involved respectively increasing and decreasing the spindle speed, making no incremental change in speed during that time period.

37. The method set forth in claim 35 further characterized in that when two boundary violations are signaled during the same time period and the respective corrective actions therefore are in the same direction upon speed or feed, making a single incremental corrective change in the speed or feed.

38. The method set forth in claim 35 further characterized in that said constraint representing a boundary for opitmized economic performance is of the nature $$Vf^q \leq [n/1-n \cdot M_1/M_2]^n$$

where
$V$ represents cutter speed
$f$ represents chipload
$q$ represents an empirically determined exponent
$n$ represents a predetermined constant
$M_1$ and $M_2$ represent cost coefficients.

39. The method set forth in claim 35 wherein at least one of said constraints is of the type exemplified by "maximum power" and the corrective action taken in response to a signaled violation of the constraint boundary is to incrementally decrease both the cutter speed and feed rate.

40. The method set forth in claim 35 wherein at least one of said constraints is of the type exemplified by "maximum chipload" and the corrective action taken in response to a signaled violation is to incrementally increase cutter speed and incrementally decrease feed rate.

41. The method set forth in claim 35 wherein at least one of said constraints is of the type exemplified by a machine parameter limit (such as maximum cutter speed), and the corrective action taken in response to a signaled violation is to incrementally change the parameter value in a direction to restore it to the limit value.

* * * * *

PO-1050
(5/69)

UNITED STATES PATENT OFFICE
CERTIFICATE OF CORRECTION

Patent No. 3,784,798  Dated January 8, 1974

Inventor(s) Bruce R. Beadle and John G. Bollinger  page 1 of 3

It is certified that error appears in the above-identified patent and that said Letters Patent are hereby corrected as shown below:

In the ABSTRACT, column 2, line 14, "contants" is changed to ---constants---.

Column 1, line 50, "to" is changed to --for--.

Column 3, line 58, "cutter" is changed to --cutting--.

Column 4, line 19, "in" is changed to --by--.

Column 7, line 64, "-8)/An($\alpha$" is erased.

Column 8, line 62, "considered" is changed to --constrained--.

Column 9, line 39, "ine" is changed to --line--.

Column 11, line 33, "prmanently" is changed to --permanently--.

Column 12, line 9, "or" is changed to --of--.

Column 17, line 44, "$\beta$" (last occurrence) is changed to --$\alpha$--.

Column 18, line 34, "or" is changed to --and--.

Column 27, line 23, "boudnary" is changed to --boundary--.

Line 28, "constnts" is changed to --constants--.

Line 30, "constants" is changed to --constant--.

UNITED STATES PATENT OFFICE
CERTIFICATE OF CORRECTION

Patent No. 3,784,798          Dated January 8, 1974

Inventor(s) Bruce R. Beadle and John G. Bollinger     page 2 of 3

It is certified that error appears in the above-identified patent and that said Letters Patent are hereby corrected as shown below:

Column 28, line 28, "boudnary" is changed to --boundary--.

Line 66, "boudnary" is changed to --boundary--.

Column 29, line 18 (Equation (82), after "$M_2$" insert the mark --$\{$--. After "$(\beta - \alpha)$" the mark --$\}$-- is inserted.

Column 31, line 7, after "proportionality" the mark --)-- is inserted.

Column 38, line 6, "$d_y$" is changed to --$d_{y_{max}}$--.

Line 8, "$d_x$" is changed to --$d_{x_{max}}$--.

Line 56 (Equation (92), after "$1-n$" the mark --)-- is inserted.

Column 39, line 12, "$d_y$" is changed to --$d_{y_{max}}$--.

Line 13, "$d_y$" is changed to --$d_{y_{max}}$--.

Column 40, line 48, "to" is changed to --the--.

Column 42, line 11, "$\Sigma \Delta V_{i-}$" is changed to --$\Sigma \Delta V_{i-1}$--.

Column 43, line 6, "valve" is changed to --value--.

Line 10, "RD = 2" is changed to --RD = 1--.

Line 45, "p1" (second occurrence) is changed to --p2--.

PO-1050
(5/69)

UNITED STATES PATENT OFFICE
CERTIFICATE OF CORRECTION

Patent No. 3,784,798            Dated January 8, 1974

Inventor(s) Bruce R. Beadle and John G. Bollinger    page 3 of 3

It is certified that error appears in the above-identified patent and that said Letters Patent are hereby corrected as shown below:

Column 51, line 23, after "comparing", --said-- is inserted.

Column 54, line 46, "an" is changed to --and--.

Column 55, line 17, "$\beta\alpha$" is changed to --$\beta/\alpha$--.

Line 26, "$\beta = 0$" is changed to --$\alpha = 0$--.

Line 64, after "$\alpha$", --and-- is inserted.

Line 66, "$\beta\alpha$" is changed to --$\beta/\alpha$--.

Signed and sealed this 5th day of November 1974.

(SEAL)
Attest:

McCOY M. GIBSON JR.          C. MARSHALL DANN
Attesting Officer              Commissioner of Patents